(12) United States Patent
White et al.

(10) Patent No.: US 11,808,637 B2
(45) Date of Patent: *Nov. 7, 2023

(54) STIMULUS INDICATING DEVICE EMPLOYING THERMOREVERSIBLE AMPHIPHILIC GELS

(71) Applicant: Prasidiux, LLC, Arlington, VA (US)

(72) Inventors: Joseph C. White, Wakefield, MA (US); Bani H. Cipriano, Rockville, MD (US); Kevin K. Diehn, Towson, MD (US); Rei S. Ambrozy, Arlington, VA (US)

(73) Assignee: Prasidiux, LLC, Arlington, VA (US)

( * ) Notice: Subject to any disclaimer, the term of this patent is extended or adjusted under 35 U.S.C. 154(b) by 41 days.

This patent is subject to a terminal disclaimer.

(21) Appl. No.: 17/329,410

(22) Filed: May 25, 2021

(65) Prior Publication Data
US 2021/0285828 A1 Sep. 16, 2021

Related U.S. Application Data

(63) Continuation of application No. 16/050,638, filed on Jul. 31, 2018, now Pat. No. 11,035,740.

(60) Provisional application No. 62/593,972, filed on Dec. 3, 2017, provisional application No. 62/584,000, filed on Nov. 9, 2017, provisional application No. 62/539,185, filed on Jul. 31, 2017.

(51) Int. Cl.
*G01K 11/06* (2006.01)

(52) U.S. Cl.
CPC ................... *G01K 11/06* (2013.01)

(58) Field of Classification Search
CPC ...................................................... G01K 11/06
See application file for complete search history.

(56) References Cited

U.S. PATENT DOCUMENTS

| | | | | | |
|---|---|---|---|---|---|
| 4,028,944 | A | * | 6/1977 | Erb | G01K 11/06 374/E11.006 |
| 4,057,029 | A | * | 11/1977 | Seiter | G01K 3/04 374/E11.006 |
| 4,825,447 | A | * | 4/1989 | Bramhall | G01K 11/06 264/4.1 |
| 5,964,181 | A | * | 10/1999 | Pereyra | G01K 11/06 374/E11.006 |
| 7,036,452 | B1 | * | 5/2006 | Tester | G01K 3/04 374/E11.006 |
| 8,166,906 | B2 | * | 5/2012 | Ambrozy | G01K 5/48 374/106 |
| 11,035,740 | B1 | * | 6/2021 | White | G01K 11/06 |
| 2005/0002552 | A1 | * | 1/2005 | Dunn | G01N 15/1475 382/133 |
| 2008/0008657 | A1 | * | 1/2008 | Bussat | A61K 49/223 424/9.52 |

(Continued)

*Primary Examiner* — Nathaniel T Woodward
*Assistant Examiner* — Philip L Cotey
(74) *Attorney, Agent, or Firm* — Fox Rothschild LLP

(57) ABSTRACT

A stimulus indicating device is disclosed. The stimulus indicating device includes a stimulus sensitive amphiphilic gel; and an assembly having a first end and a second end. The assembly may include a top layer, a middle layer comprised of a porous polymer membrane, and a bottom layer. The top layer and the bottom layer may be sealed together on opposing sides of the assembly, and the top layer and the bottom layer may be sealed at the width of the second end of the assembly.

16 Claims, 8 Drawing Sheets

(56) References Cited

U.S. PATENT DOCUMENTS

| | | | | |
|---|---|---|---|---|
| 2008/0182287 | A1* | 7/2008 | Smith | G01N 33/545 |
| | | | | 506/13 |
| 2008/0295761 | A1* | 12/2008 | Ambrozy | G04F 1/00 |
| | | | | 374/E11.006 |
| 2009/0010803 | A1* | 1/2009 | Ambrozy | G01K 5/00 |
| | | | | 374/E11.006 |
| 2010/0086490 | A1* | 4/2010 | Allemann | A61P 43/00 |
| | | | | 424/9.1 |
| 2012/0027647 | A1* | 2/2012 | Ambrozy | G01K 3/04 |
| | | | | 422/401 |
| 2012/0079981 | A1* | 4/2012 | Huffman | G01K 11/06 |
| | | | | 116/207 |
| 2016/0297175 | A1* | 10/2016 | Deng | G01K 11/12 |
| 2017/0009194 | A1* | 1/2017 | Golway | C12N 5/0691 |
| 2018/0080834 | A1* | 3/2018 | Misumi | G01K 3/04 |
| 2018/0372700 | A1* | 12/2018 | Andersen | G01K 1/02 |

\* cited by examiner

STIMULUS INDICATING DEVICE EMPLOYING THERMOREVERSIBLE AMPHIPHILIC GELS

CROSS-REFERENCE TO RELATED APPLICATIONS

This patent application is a continuation of U.S. patent application Ser. No. 16/050,638, filed Jul. 31, 2018, which is related to and claims priority to U.S. Provisional Patent Application Nos. 62/539,185, 62/584,000, and 62/593,972 all of which are entitled "Stimulus Indicating Device Employing Thermoreversible Amphiphilic Gels" filed on Jul. 31, 2017, Nov. 9, 2017, and Dec. 3, 2017, respectively. The entire disclosures of which are hereby incorporated by reference in their entirety.

STATEMENT REGARDING FEDERALLY SPONSORED RESEARCH

Certain embodiments of the disclosed inventions were made with support under Grant No. NSF-1431014 awarded by the National Science Foundation. The government may have rights in certain embodiments of the invention disclosed herein. The additional matter added to this patent application document is not subject to support by Federal sponsorship.

FIELD OF THE INVENTION

The disclosure relates, for example, to a stimulus-indicating device. More particularly, the present disclosure describes an apparatus that evidences when a stimulus sensitive product has been exposed to a designated or predetermined stimulus, and may evidence when a stimulus sensitive product has been exposed to a designated or predetermined stimulus for a designated or predetermined period of time. Additionally, the disclosure describes a method for manufacturing aspects of that apparatus.

BACKGROUND

The useful life of a perishable product is a function of its cumulative exposure to a harmful stimulus over a period of time.

The useful life of a temperature sensitive product is a function of its cumulative time-temperature exposure, which is the combination of the temperature to which a product is exposed combined with the duration of that exposure. For stimulus sensitive products, degradation generally occurs faster at a higher stimulus (i.e., high temperature) than at a lower stimulus (i.e., lower temperature). For example, often a temperature-perishable product will typically have a longer useful life if it is exposed to lower temperatures than if it is exposed to higher temperatures. In particular, prepackaged chicken will spoil if it is exposed to a temperature of 40° F.-41° F. or above for an extended period of time. However, exposure to high temperatures is not always the cause of the problem because certain stimulus sensitive products will degrade sooner at a lower stimulus (especially freezing temperatures) than at a higher stimulus. For example, a malaria vaccine will degrade faster below 2° C. than if stored in the range of 2° C. to 8° C. Thus, the rate of degradation is often stimulus and product specific. More specifically, vaccines contain colloidal Alumina particles, which promote a response of the patient to the vaccine antigen, thus improving the efficacy of the vaccine. When exposed to freezing temperatures (0° C. or lower), the colloidal Alumina particles are destabilized. As a result, the desired patient response is not achieved when the vaccine is administered to the patient.

Thus, there is a need for stimulus indicators that can show whether it and the product to which the indicator is attached have been exposed to a stimulus that lies below a point at which the reaction to the stimulus is triggered. By way of example only, if the stimulus were temperature, then the stimulus indicating device would indicate to the user that it and the product attached to it were exposed to a temperature below the temperature at which the temperature sensitive product is damaged.

Stimulus perishable products susceptible to degradation due to cumulative time-stimulus exposure include, but are not limited to, food, food additives, chemicals, biological materials, drugs, cosmetics, photographic supplies and vaccines. Many manufacturers mark their products with printed expiration dates in an attempt to provide an indication of when the useful life of a perishable product lapses. These dates, however, are only estimates and are likely unreliable to indicate whether the perishable product is still viable because those indication dates are based on assumptions about the stimulus history of the product that may not be true with respect to the particular unit or product in the package on which the expiration date appears. Specifically, manufacturers compute expiration dates by assuming that the product will be kept within a specified stimulus range during the product's useful life. The manufacturer cannot always predict or control, however, the stimulus exposure of a product through each step of the supply chain that delivers the product to the consumer. If the product is actually exposed to a stimulus higher than those on which the expiration date is based, the perishable product may degrade or spoil before the printed expiration date. When this happens, the expiration date may mislead the consumer into believing that the perishable product is still usable when, in fact, its useful life has lapsed.

Thus, there is a need for an indicator that indicates when a stimulus sensitive product has been exposed to a deleterious stimulus extreme, which is also referred to herein as a predetermined stimulus. There is also a need for an indicator that indicates when a stimulus sensitive product has been exposed to the deleterious stimulus extreme (i.e., a predetermined stimulus), for a predetermined amount of time because as discussed herein, simply exposing a temperature sensitive product to ten minutes of a deleterious temperature extreme may not be long enough to cause the product to degrade and be rendered non-viable or useless. In fact, some products would require one or more hours of exposure to a deleterious temperature for the temperature sensitive product to degrade to the point where it is non-viable. Thus, there is also a need for an indicator that indicates not only when a stimulus sensitive product has been exposed to the deleterious stimulus extreme, but has been exposed to that deleterious stimulus extreme for a predetermined amount of time, and preferably that indicator would also indicate multiple periods of exposure or multiple durations of exposure.

Solutions of amphiphilic molecules can be engineered to undergo a reversible transition between a gel state and a liquid state upon being exposed to its corresponding predetermined stimulus, such as a decreasing temperature, or an increasing temperature. Amphiphilic molecules are molecules that have both hydrophobic and hydrophilic portions present in the molecule, wherein it is known by one of ordinary skill in the art that hydrophobic portions are the portion of an amphiphilic molecule that consists of atoms and even groups of atoms that do not readily dissolve in water. Conversely, hydrophilic portions are the portions of a molecule that consists of atoms and even groups of atoms that readily dissolve in water.

When the amphiphilic molecules are dissolved in water, the preference of the hydrophilic portion of the molecule to dissolve in water is counterbalanced by the preference of the hydrophobic portion of the amphiphilic molecule to remain undissolved in water. As a result of this interplay between the hydrophilic portion and the hydrophobic portion of the amphiphilic molecule, when, for example, the concentration of these amphiphilic molecules exceeds a critical concentration, the amphiphilic molecules organize into micelles. Micelles are spherical structures containing a number of amphiphilic molecules and as a distinguishing feature possesses a core and a shell, wherein the hydrophobic portion of the amphiphilic molecules form the core and the hydrophilic portion form the shell of each micelle. More specifically, in micelles, the hydrophobic portions of the amphiphilic molecules come together and aggregate to shield themselves from the surrounding water (thereby forming the core of the micelle) while the hydrophilic portions seek to maximize their contact with water (thereby forming the shell of the micelle). These spherical micelles can organize further depending on the environmental conditions. For instance, the spherical micelles may grow in length from a spherical structure to a cylindrical structure; or the micelles may organize to form a crystalline array. Also, in the special case of amphiphilic polymers, as a result of their large molecular weight and the fact that these polymers contain many hydrophobic portions, the amphiphilic polymers do not participate in the formation of just one micelle, but rather can participate in the formation of many micelles. The result of such participation is the formation of one or more micelle cross-linked network(s). This transition from a spherical micelle to either a cylindrical micelle or a crystal of micelles, or from a spherical micelle to the formation of a polymer network cross-linked by micelles, is accompanied by a transition of the micelle structure transitioning from its liquid state to its gel state.

One type of amphiphilic molecules that forms spherical micelles and shows a transition between spherical micelles and a crystal of spherical micelles are poloxamer molecules. Accordingly, stimulus sensitive solutions can result from dissolving poloxamer molecules in water, wherein depending on the temperature of the dissolved poloxamer molecules, they will undergo a transition from a liquid state to a gel state, or visa verse. Poloxamer molecules are triblock copolymers consisting of two polyethylene oxide (PEO) blocks joined together by a polypropylene oxide (PPO) block. In the case of poloxamer molecules, the PPO block is the hydrophobic portion and the PEO blocks correspond to the hydrophilic portions. Poloxamer molecules are also known by their trade name Pluronic, manufactured by BASF.

As described in Paschalis Alexandridis and T. Alan Hatton, "Poly(ethylene oxide)-Poly(propylene oxide)-Poly(ethylene oxide) Block Copolymer Surfactants in Aqueous Solutions and at Interfaces: Thermodynamics, Structure, Dynamics, and Modeling", Colloids and Surface A: Physicochemical and Engineering Aspects, Volume 96, at Pages 1-46 (1995), there are many factors that influence the temperature at which stimulus sensitive poloxamer solutions undergo a transition from its liquid state to its gel state (or vice versa). Such factors include by way of example only, the concentration of poloxamer; whether any electrolyte is added to the solution and if so, the concentration of electrolyte added; the length or formula weight of the PPO block; and the molecular weights of the PEO and PPO blocks forming the poloxamer molecule. The relationship between these temperature influencing factors, and the temperature at which the user desires the indication to occur, can be used to tune the stimulus sensitive poloxamer solution to trigger at its predetermined stimulus (or its trigger stimulus), so as to control the transition of the stimulus sensitive poloxamer solution between its liquid state and its gel state.

Certain stimulus sensitive poloxamer solutions exhibit multiple transitions between gel states and liquid states, which occur at different temperatures. The general trend of phase behavior for these stimulus sensitive poloxamer solutions is as follows: at a low temperature that is below its first or lower transition temperature (by way of example only, 0° C.), the stimulus sensitive poloxamer solution is in its liquid state. And when this stimulus sensitive poloxamer solution is heated above that lower or first transition temperature, the stimulus sensitive poloxamer solution undergoes a first transition from a liquid state to a gel state. Thereafter, if this stimulus sensitive poloxamer solution that is in its gel state, is then heated above a second or higher transition temperature (by way of example only, 44° C.), the stimulus sensitive poloxamer solution will then undergo a second transition from its gel state to a second liquid state. Having a stimulus indicating device that contains a single stimulus sensitive solution such as a stimulus sensitive poloxamer solution, that can indicate exposure to not only two separate trigger stimuli such as temperature, but wherein one of those indications evidences exposure to a decreasing temperature (e.g., an indication of exposure to a decreasing temperature of 10° C. to 0° C.) and the other of those indications evidences exposure to an increasing temperature (e.g., an indication of exposure to an increasing temperature of 10° C. to 50° C.), would be very advantageous because of the obvious reduction in cost and expense of needing to use two stimulus indicating devices that indicate exposure to two separate stimuli or temperatures.

Additionally, certain stimulus sensitive poloxamer solutions exhibit a reversible transition, in that they reversibly switch between their gel state and their liquid states upon exposure to and removal of predetermined stimuli. This means that if a stimulus sensitive poloxamer solution that is initially held below its higher transition temperature so that it remains in its gels state, by way of example only it is held at 40° C., which is below its 44° C. transition temperature), is cooled below its lower transition temperature (by way of example only it is cooled to 0° C. given its lower transition temperature is 10° C.), that stimulus sensitive poloxamer solution will undergo a transition from its gel state to its liquid state. Furthermore, if that same stimulus sensitive poloxamer solution that is now in its liquid state (because it is being held at a temperature lower than its lower transition temperature, (by way of example only, it is held at 0° C.)), is heated back above the same lower transition temperature (by way of example only it is heated back to 40° C.), then the stimulus sensitive poloxamer solution will undergo another transition from its liquid state back to its gel state. Essentially, once the stimulus sensitive poloxamer solution initially drops in temperature and undergoes its initial phase transition and turns from a gel state to the liquid state, the liquid state stimulus sensitive poloxamer solution can be made to return to its gel state by removing the predetermined stimulus (i.e., increasing the temperature of the liquid stimulus sensitive poloxamer solution to above the temperature that caused it to become a liquid (i.e., increasing the temperature above that lower transition temperature)). This reverse transition is also possible if the transition occurs at the stimulus sensitive poloxamer solution's higher transition temperature, in that it can transition from a gel state to a liquid state if the predetermined stimulus, such as a predetermined temperature, is impacting the stimulus sensitive poloxamer solution by rising above the higher transition temperature (by way of example only, 44° C.); and then can transition back to the gel state once that predetermined stimulus is removed and the temperature of the stimulus sensitive poloxamer solution drops below that same higher transition temperature. Although this reversibility between the gel state and the liquid states is beneficial in certain instances, in the case of stimulus indication, and more particularly in the case of temperature indication, such reversibility is undesirable because there is no permanence to the indication from any of the transitions between the gel state and the liquid states. Instead the stimulus sensitive poloxamer solution is free to revert to its original state once the stimulus is removed, because there is no mechanism to record or evidence that it was ever in a different state, in which such record would indicate exposure to a deleterious stimulus, such as exposure to a deleterious temperature.

Accordingly, it is desired, for example, to develop indicating devices with irreversibility built into the stimulus sensitive or stimulus indicating or stimulus reactive operation of the indicator. Such irreversibility would provide a permanent indication of exposure of the stimulus sensitive product (and by default the stimulus indicating device), to a predetermined stimulus, regardless of whether the predetermined stimulus is later removed.

In order to prepare an indicator with a desired indication temperature, one should, preferably, for example find and use a second liquid with a crystallization temperature equal to the indication temperature. Typically, for the second liquid one would choose from molecules such as alkanes, fatty acids or fatty acid methyl esters. The crystallization point varies depending on the type of molecules and the number of carbon atoms in the molecule. However, one should note that the melting point of these compounds does not vary continuously but instead varies discretely. For instance, the melting points of the dodecane, tridecane, and tetradecane are −10° C., −5° C., and 5° C., respectively. While these molecules can be blended, they are not always miscible in the crystalline phase, and if miscible, the blends still may not result in the desired crystallization point. Since the melting points of the second liquid are usually discrete and cannot be adjusted along a continuum, the indication temperatures of the resulting Timestrip devices are limited.

Therefore there is not only a need for indicator that can eliminate the need for a three-part indicator, and/or an indicator that contains a chemical that should crystallize at a specific temperature so as to allow the device to operate, but there is also a need for a stimulus indication device that harnesses the transitional properties of a poloxamer solution from a gel state to its liquid state as a result of being exposed to a temperature below a predetermined threshold, so as to provide both an indication of such exposure, and provide the duration of that exposure.

SUMMARY

The present disclosure describes, by way of example only, a stimulus indicating device containing a stimulus sensitive amphiphilic molecule solution, which substantially overcomes one or more of the above-mentioned problems arising from limitations and disadvantages of the related art to provide a permanent indication of exposure.

By way of example, one aspect of this disclosure includes a stimulus indicating device including an assembly with a first end and a second end, and a stimulus sensitive amphiphilic gel, where the assembly may include a top layer, a middle layer comprised of a porous polymer member, and a bottom layer, where the top layer and bottom layer can be sealed together on opposing sides of the assembly, and the top layer and the bottom layer can be sealed at the width of the second end of the assembly.

One embodiment, by way of example, includes a stimulus indicating device with a top layer containing a cover that contains a window, and at least one reservoir formed between the top layer and middle layer, where the stimulus sensitive amphiphilic gel may be contained in said reservoir, and the stimulus sensitive amphiphilic gel can be in fluid communication with the middle layer.

Another embodiment, by way of example, includes a stimulus indicating device with a top layer containing a cover that contains a window, a first reservoir formed between the top layer and middle layer, and a second reservoir for initially containing the stimulus sensitive amphiphilic gel and for keeping the stimulus sensitive amphiphilic gel separated from the first reservoir by the use of a frangible seal. In this embodiment, for example, the stimulus sensitive amphiphilic gel can be moved into the first reservoir by applying force to the first reservoir so that it results in the breaking of the frangible seal and the stimulus sensitive amphiphilic gel moving into the first reservoir.

Another embodiment, by way of example, includes a stimulus indicating device that also includes a first reservoir that can be positioned in the first end of the assembly, and a window that can be positioned away from the first reservoir and toward the second assembly.

Another embodiment, by way of example, includes a stimulus indicating device that also includes an indicator spot located on the middle layer and positioned beneath the window.

Another embodiment includes, by way of example, a stimulus indicating device that also includes a pouch that contains the assembly.

Another embodiment of the disclosed stimulus indicating device includes a stimulus sensitive amphiphilic gel that transitions between its liquid state and its gel state in response to two different stimuli.

Another embodiment of the disclosed stimulus indicating device includes, by way of example, a stimulus sensitive amphiphilic gel that contains additives that aid in the stabilization of the transition temperature of the stimulus sensitive amphiphilic gel to its liquid state.

Another embodiment of the disclosed stimulus indicating device includes, by way of example, a stimulus sensitive amphiphilic gel that has been fractionated into one or more fractions, in which each fraction has a narrower temperature transition range than a portion of stimulus sensitive amphiphilic gel that has not been fractionated.

Another embodiment of the disclosed stimulus indicating device includes, by way of example, a moisture reservoir for maintaining enough moisture in the device so as to prevent a film from forming on the stimulus sensitive amphiphilic gel when it is in its liquid state.

Another embodiment, by way of example, includes a stimulus indicating device that also includes a second reservoir formed between said top layer and said middle layer, in which the second reservoir is positioned away from the end, the second reservoir can accept air displaced from the middle layer by movement of the stimulus sensitive amphiphilic gel through the middle layer, and the top and bottom layers may be sealed at the width of the first end of the assembly Another embodiment, by way of example, includes a stimulus indicating device that also includes a one or more ventilation channels formed between said top layer and said middle layer, in which the ventilation channel is positioned so that it allows air to be displaced out of the porous membrane as the stimulus sensitive amphiphilic gel moves from the first reservoir into the porous membrane, and allows that displaced air to return to the first reservoir.

Another embodiment, by way of example, includes a stimulus indicating device that also includes a first reservoir that can be positioned in a first end of the assembly, and a window that can be positioned between the first reservoir and the second reservoir.

Another embodiment includes, by way of example, a stimulus indicating device that further includes an indicator spot that can be located on the middle layer and positioned beneath the window.

Another embodiment includes, by way of example, a stimulus indicating device that further includes stimulus sensitive amphiphilic get that can transition between its liquid state and gel state in response to two different stimuli.

Another embodiment includes, by way of example, a stimulus indication device further comprising a first stimulus sensitive amphiphilic gel in said first solution reservoir that can transition between its liquid state and its gel state in response to a first stimulus, and a second stimulus sensitive amphiphilic gel in the second solution reservoir that can transition between its liquid state and its gel state in response to second stimulus.

Another aspect of this disclosure includes a stimulus indicating device including an assembly with a first end and a second end, and a stimulus sensitive amphiphilic gel, where the assembly includes a top layer, a middle layer including a porous polymer membrane, and a bottom layer. The top layer and the bottom layer can be sealed together on opposing sides of the assembly, the top layer and bottom layer can be sealed at the width of the second end of the assembly, and the top and middle layers can be joined together along the length of the assembly and toward the center of the assembly.

An embodiment of this aspect includes a stimulus indicating device where, by way of example, the top layer contains a cover which has a window, and the device further comprises at least two solution reservoirs formed at the second end of the assembly between the top layer and the middle layer, and between the longitudinal seal and the center seal, where the stimulus sensitive amphiphilic gel can be contained in both solution reservoirs, and the stimulus sensitive amphiphilic gel can be in fluid communication with its corresponding middle layer. The stimulus indicating device of this embodiment also can further comprise two air reservoirs that can be formed at the second end of the assembly between the top and middle layers, and between the longitudinal and center seals, where the air reservoirs can be positions away from the second end, and the air reservoirs can accept air displaced from the middle layer by movement of the stimulus sensitive amphiphilic gel through the middle layer.

An embodiment includes, by way of example, a stimulus indicating device further comprising an indicator spot located on the middle layer and positioned beneath the window.

BRIEF DESCRIPTION OF THE DRAWINGS

The foregoing and other objects, aspects and advantages will be better understood from the following detailed description of an exemplary preferred embodiment of the invention with reference to the drawings.

Figure 2A:
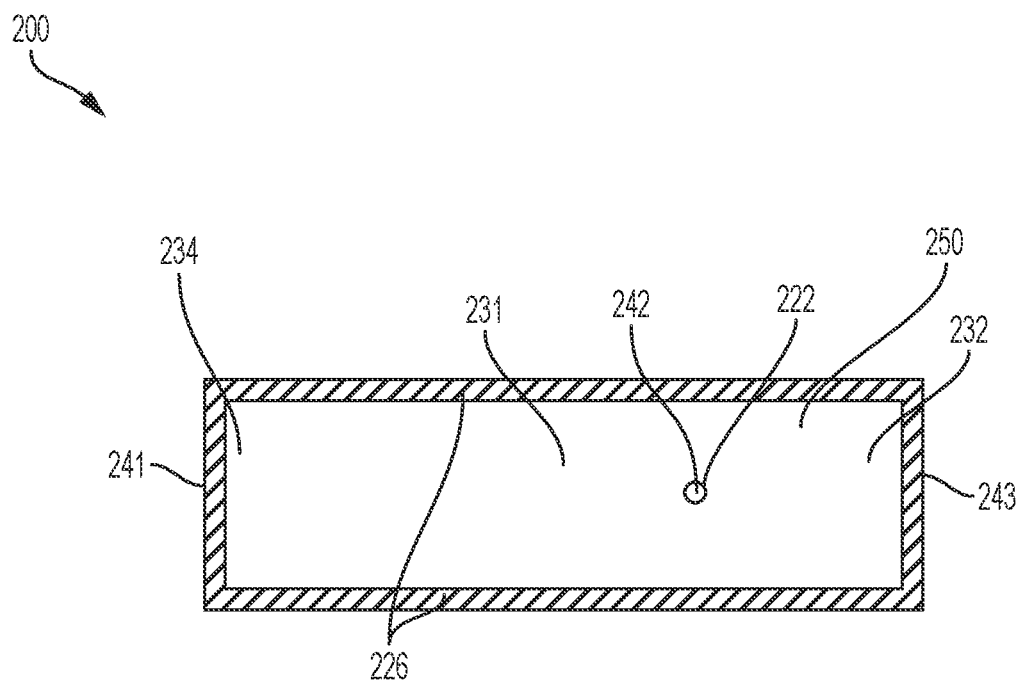
FIG. 2A is a top down view of a stimulus indicating device before exposure to a predetermined stimulus.
Figure 2B:
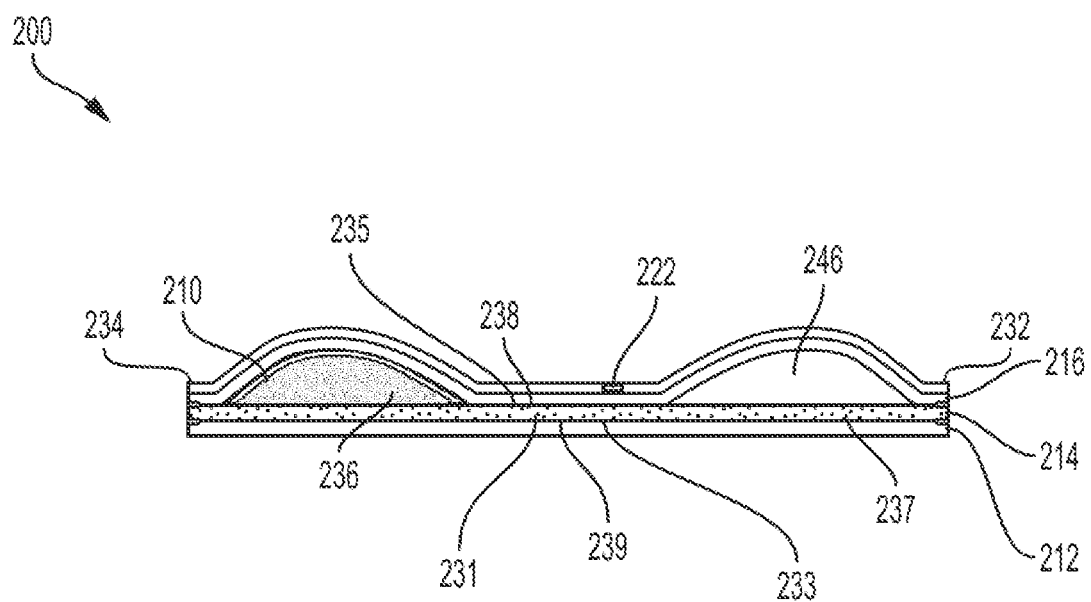
FIG. 2B is a side view of the stimulus indicating device in FIG. 2A.
Figure 2C:
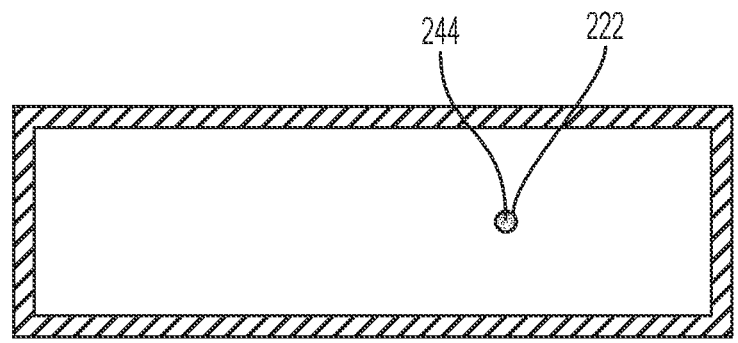
FIG. 2C is a top down view of the stimulus indicating device in FIG. 2A after exposure to a predetermined stimulus.
Figure 2D:
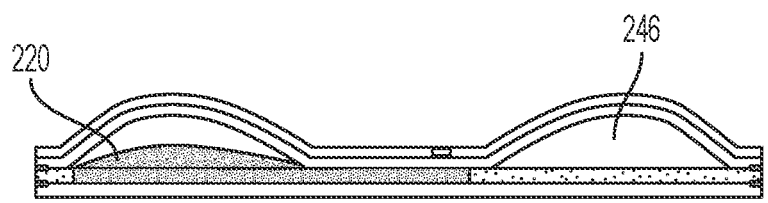
FIG. 2D is a side view of FIG. 2C.
Figure 2E:
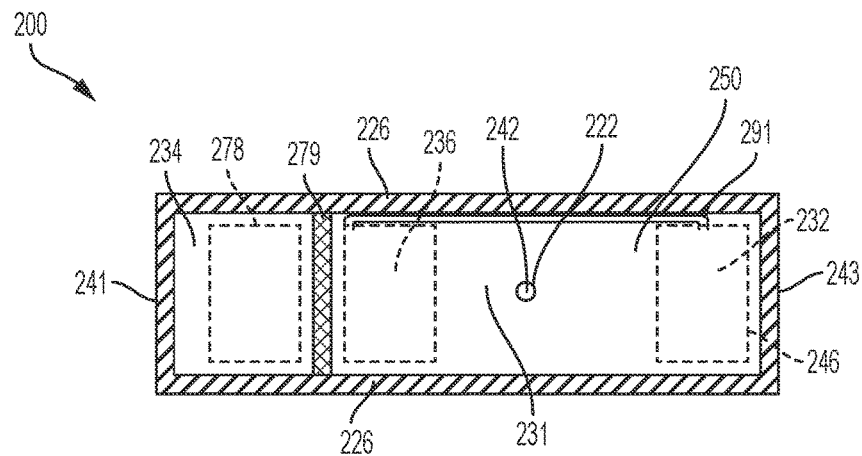
FIG. 2E is a top down view of a stimulus indicating device before exposure to a predetermined stimulus.

2F is a side view of the stimulus indicating device in FIG. 2E.

Figure 3A:
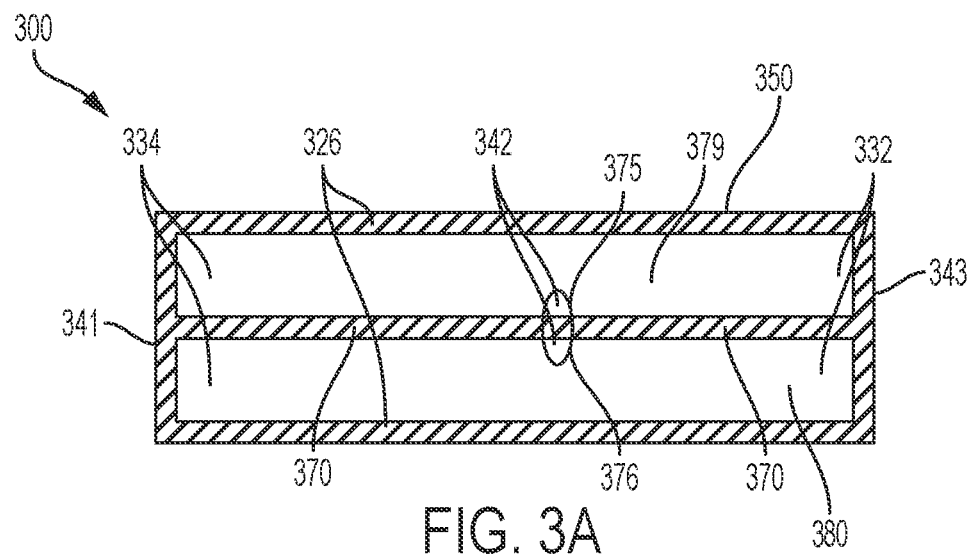

FIG. 3A is a top down view of a stimulus indicating device containing two reservoirs before exposure to a predetermined stimulus.

Figure 3B:
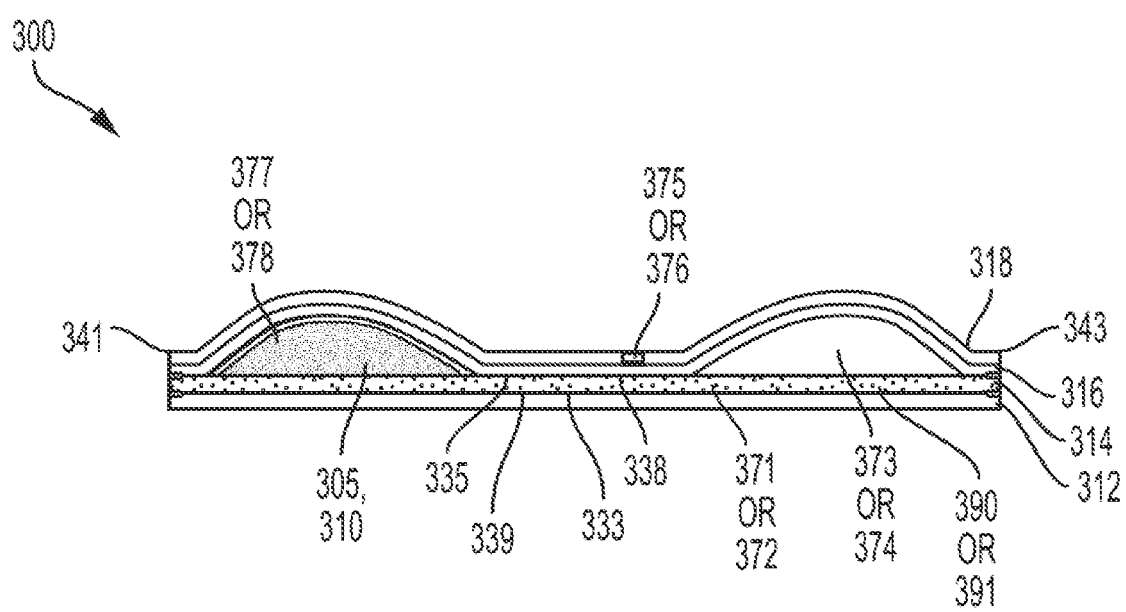

FIG. 3B is a side view of the stimulus indicating device in FIG. 3A.

Figure 3C:
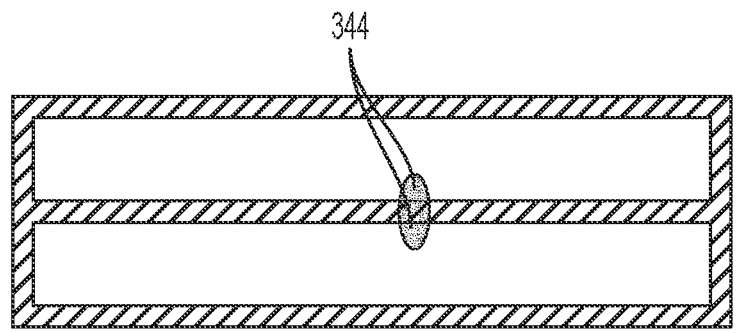

FIG. 3C is a top down view of the stimulus indicating device in FIG. 3A after exposure to a predetermined stimulus.

Figure 3D:
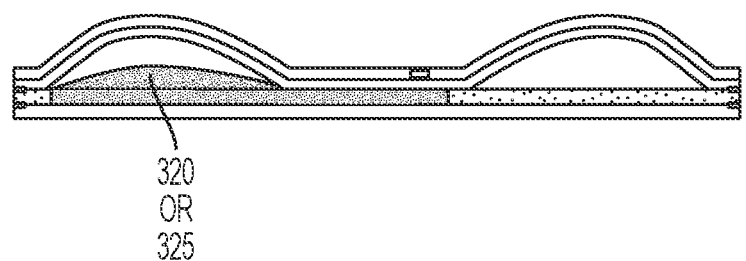

FIG. 3D is a side view of FIG. 4C.

Figure 4A:
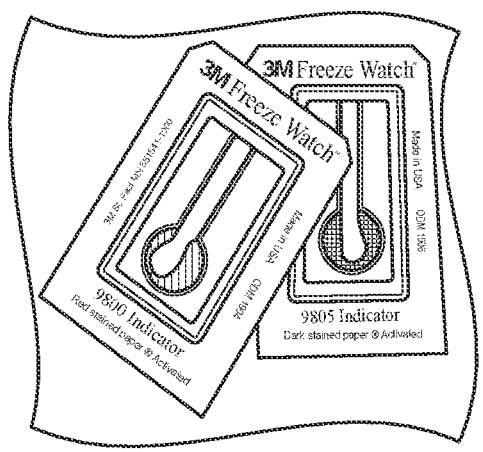

FIG. 4A shows a 3M FreezeWatch®.

Figure 4B:
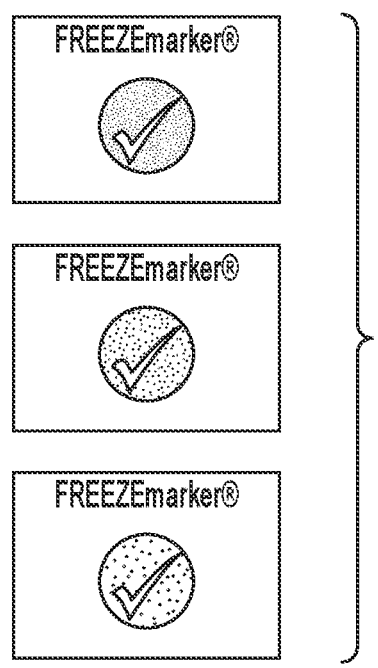

FIG. 4B shows a TempTime FREEZEmarker®.

DETAILED DESCRIPTION

I. Embodiments Having a Layered Assembly Including a Porous Polymer Membrane Strip and Plastic Layers Inside a Moisture Vapor Barrier Pouch To achieve these and other advantages and in accordance with the purpose of certain embodiments of the disclosure described herein, as embodied and broadly described herein and as shown in FIG. 1A, FIG. 1B, FIG. 1C, and FIG. 1D, some embodiments may include a porous polymer membrane layer, which may be, for example, rectangular-shaped, sandwiched between a top layer and a bottom layer that are constructed of a flexible transparent material, such as a transparent plastic, in which these two layers of plastic material can be similar to the porous polymer membrane strip in terms of shape, but may be, by way of example, the same size or slightly larger, along both the width and length if the porous polymer membrane strip is rectangular in shape. The joining of a top layer, porous polymer membrane strip, and bottom layer is referred to herein as the assembly.

Prior to positioning the porous polymer membrane strip between the top layer and the bottom layer, by way of example, the top layer may have a mask printed on it. The mask can be printed on either the top side or the bottom side of the top layer, but can also be printed on the upper side of the top layer. Those of ordinary skill in the art may recognize that a separate cover can also be affixed to the top layer, in which, by way of example, the separate cover can have a mask printed on it that may be similar to the mask printed on the top layer, or it can be a label that is affixed to the top layer. For purposes of this application, both the mask printed on the top layer, and the separate cover, as well as their variations, will be referred to collectively herein as the cover. The cover can be preferably divided into two portions, in which the first portion may be opaque enough so as to obscure a portion of the porous polymer membrane strip positioned below it, and the second portion may be transparent so as to form a window within the cover. By way of example, the cover can be positioned on the top layer such that the window may be located over the first end of the top layer. Any reference to the top layer after this point may be understood to include the cover unless otherwise distinguished.

By way of example, when assembling or constructing the stimulus indicating device, particularly the assembly, the upper side of the bottom layer may be completely adhered to the bottom side of the porous polymer membrane strip, preferably by heat stamping or heat lamination. It should be appreciated that in adhering the bottom layer to the bottom side of the porous polymer membrane strip, the polymer membrane aspect of the porous polymer membrane strip can be altered locally at the interface with the bottom layer so that it may be sealed and can be incapable of wicking or transporting any liquid that that portion of the porous polymer membrane strip portion may come in contact with. Similarly, the bottom side of the top layer may be adhered, for example, by heat stamping or heat lamination, to the upper side of the porous polymer membrane strip, but more particularly, only the first end of the porous polymer membrane strip can possibly be adhered to the first end of the top layer. Such adhering can act to seal locally at the interface with the top layer that portion of the porous polymer membrane strip from being able to wick or transport liquid.

By way of example, the objective of permanently adhering the upper side of the bottom layer to the bottom side of the porous polymer membrane strip, and the objective of permanently adhering a portion of the bottom side of the top layer to the corresponding portion of the upper side of the porous polymer membrane strip, may be to force the stimulus sensitive poloxamer solution to wick through the portion of the porous polymer membrane strip that has not been adhered to either the top layer or the bottom layer. More particularly, to encourage proper operation of the embodiments of the stimulus sensitive devices described herein, the stimulus sensitive poloxamer solution may be forced to wick through the unaltered portions of the porous polymer membrane strip because the stimulus sensitive poloxamer solution in its liquid state may readily wick through any small gap, channel or space exists between the porous polymer membrane strip and the top layer, or that can exists between the porous polymer membrane strip and the bottom layer, or that may be uncrushed or unaltered or that may not be adhered to the top layer or to the bottom layer. For this reason, the adhesion of the top layer and the bottom layer to the porous polymer membrane strip should be complete in the intended areas so that no small gaps or spaces can be allowed to form that would allow wicking of the stimulus sensitive poloxamer solution outside of the intended area. By ensuring the stimulus sensitive poloxamer solution does not leak into gaps or spaces, the wicking of the stimulus sensitive poloxamer solution through the porous polymer membrane strip can be better controlled, and therefore the temperature and indication time of the time-temperature indicating device, may be consistent among devices made of the same lot.

By way of example, after the top layer and bottom layer are adhered to the porous polymer membrane strip, two seals can then be made along the long edges of the assembly. These seals can be created in different manners. For instance, by way of example, if the bottom layer and top layer are sized identically to the porous polymer membrane strip, sufficient pressure and temperature can be applied along the edge of the porous polymer membrane strip such that the porous structure of the porous polymer membrane strip may be melted to such a degree that it may form a seal that prevents the stimulus sensitive poloxamer solution from moving through that sealed portion of the porous polymer membrane strip, and consequently can ensure that the stimulus sensitive poloxamer solution, in its liquid state, only moves through the intended portions of the assembly. Alternatively, by way of example, if the bottom layer and the top layer are larger in length and width than the porous polymer membrane strip, the two seals formed along the long edges of the top layer and bottom layer may be made just outside the porous polymer membrane strip by applying sufficient pressure and temperature to melt the bottom and top layers together, so as to ensure that the stimulus sensitive poloxamer solution, in its liquid state, only moved through the intended portions of the assembly.

As discussed above in regard to adhering the top layer and the bottom layer to the porous polymer membrane strip, by way of example, when creating the longitudinal seals, the seals may be created to not only impede the stimulus sensitive poloxamer solution from wicking out through the longitudinal edges of the assembly, but also may be created such that the longitudinal seals not result in the creation of a gap, space, or channel that would otherwise allow the stimulus sensitive poloxamer solution to wick through said gap, space or channel so as to ensure consistency in terms of the desired liquid traveling though the porous polymer membrane strip.

It should be appreciated that at this point, by way of example, only the longitudinal sides of the assembly may be sealed, and there are no seals at the width of the first end or at the width of the second end of the assembly in this example.

The combination of the entirety of the bottom layer being adhered to the bottom side of the porous polymer membrane strip, with the two seals along the longitudinal edges of the assembly, and only the first end of the top layer being adhered to the upper side of the porous polymer membrane strip at its first end, may result in a portion of the porous polymer membrane strip forming an open ended reservoir at the second end of the assembly, which is referred to herein as the solution reservoir. Once formed, by way of example, a stimulus sensitive poloxamer solution, that may be dyed a color different than the cover, may be placed inside that solution reservoir by injecting the dyed stimulus sensitive poloxamer solution through the opening on the second end of the assembly. A consistent amount of the dyed stimulus sensitive poloxamer solution can be injected into the solution reservoir each time a stimulus sensitive device is manufactured so as to ensure consistency of operation. After placing the stimulus sensitive poloxamer solution into the solution reservoir, by way of example, the solution reservoir can be sealed along the width of the second end of the assembly, for example by heat stamping or heat lamination. The structure created as described above and resulting in the top layer and the bottom layer being adhered to the porous polymer membrane strip, with the longitudinal seals and the seal at the width of the second end of the assembly being formed as described herein, and the dyed stimulus sensitive poloxamer solution being loaded and contained in the now sealed solution reservoir, is referred to herein as the loaded assembly.

By way of example, the internal portion of the porous polymer membrane strip, through which the stimulus sensitive poloxamer solution can move when it is in its liquid state, is referred to herein as the runway, and that runway portion may be formed by being bounded on its outer sides by the two longitudinal edge seals, by being bounded on the bottom side of the porous polymer membrane strip by the bottom layer being adhered to the porous polymer membrane strip, and being bounded by the upper side of the first end of the porous polymer membrane strip by it being adhered to just the first side of the bottom side of the top layer. While the loaded assembly may be sealed on the width of the second end after the solution reservoir is loaded with the stimulus sensitive poloxamer solution, the width of the first end of the assembly can remain unsealed. The reason for leaving the first end of the loaded assembly unsealed is that, without wishing to be bound by theory, the stimulus the sensitive poloxamer solution may be only able to wick through the runway if the stimulus sensitive poloxamer solution can be also able to push the air that lies in front of it inside the porous polymer membrane strip out the open front end of the assembly. More specifically, by way of example, if the first end of the assembly is sealed, when the stimulus sensitive poloxamer solution is in its liquid state it may be unable to wick through the runway of the porous polymer membrane strip, because sealing the runway on all four of its boundaries can possibly prevent the air contained in the runway from being able to move out of the way of the advancing stimulus sensitive poloxamer solution in its liquid state.

Because the stimulus sensitive poloxamer solution may evaporate if exposed to circulating air, and because the loaded assembly described above should preferably maintain an unsealed first end, the loaded assembly may be isolated from circulating air by being inserted into a pouch that is made out of a material that has a low permeability to moisture. Once the loaded assembly is inserted into the pouch, the open end of the pouch can be sealed, for example by heat stamping. The pouch containing the loaded assembly is referred to herein as the pouched assembly.

As one of ordinary skill in the art will appreciate, a stimulus sensitive poloxamer solution that shows a transition from the gel state to the liquid state as a result of decreasing its temperature below its predetermined stimulus or predetermined transition temperature, may be used to provide indication of exposure to a predetermined temperature. By way of example, this may be done by initially loading a stimulus sensitive poloxamer solution that is in its gel state, and that has been dyed a certain color, into the solution reservoir located on the second end of the assembly as described above. Because the stimulus sensitive poloxamer solution, when it is in its gel state can be unable to wick through the porous polymer membrane the stimulus sensitive poloxamer solution in its gel state may remain completely in the second side of the assembly. However, once the loaded assembly, preferably containing a dyed stimulus sensitive poloxamer solution, is exposed to a temperature below the transition temperature of the stimulus sensitive poloxamer solution, the dyed stimulus sensitive poloxamer solution can undergo a transition from its gel state to its liquid state. While the dyed stimulus sensitive poloxamer solution is in its liquid state, the solution may wick through the runway portion of the porous polymer membrane strip in a direction that moves away from the second end of the assembly, and towards the first end of the assembly. As the liquid poloxamer wicks through the runway portion of the porous polymer membrane strip, the wicking may be initially hidden from the view of the end user by the cover. However, after the pouched device has been exposed to the predetermined temperature for the predetermined amount of time, the dyed stimulus sensitive poloxamer solution may wick through the portion of the runway that is positioned directly beneath the window and at least partially, or more fully, wick through the window, thereby providing an indication that the temperature sensitive indicator, and the temperature sensitive product attached to it, has been exposed to a harmful temperature, and more particularly, has been exposed to a harmful temperature for a determinable amount of time. The time it takes for the stimulus sensitive poloxamer solution to migrate through different lengths of the porous polymer membrane strip may be attributed to corresponding, but different, periods of time.

As discussed herein, by way of example, the window in the cover may allow the user to view the indication of exposure to a deleterious stimulus by allowing the user to view the dyed stimulus sensitive poloxamer solution in its liquid state wicking through the runway positioned directly below the window. Such an indication of exposure to a deleterious stimulus may take the form of: the dyed stimulus sensitive poloxamer solution not being visible in the window prior to exposure to a predetermined stimulus because it is covered by the opaque portion of the cover; and/or the dyed stimulus sensitive poloxamer solution being visible in the window after exposure to a predetermined stimulus. More specifically, and by way of example only, prior to the exposure to the predetermined stimulus the user can view the porous polymer membrane strip, and can either note the color of the porous polymer membrane strip, or the user can note the glyph, symbol, alphanumeric characters, or other types of indicator spots printed on the porous polymer membrane strip which are positioned below the window.

By way of example, this indication of exposure in the form of a partial, or preferably a full, wicking of the dyed stimulus sensitive poloxamer solution through the porous polymer membrane directly under the window portion may be visible to the end user as either a change in color or a change in indication, by way of example only, obscuring an indicator spot on the porous polymer membrane strip visible through the viewing window. Taking each separately, the indication of exposure occurring via a change in color can occur, by way of example, if the porous polymer membrane strip is colored a first color, and the dyed stimulus sensitive poloxamer solution is colored a second color, and when the stimulus sensitive poloxamer solution at least partially wicks through the portion of the micro porous polymer membrane strip visible in the window, the user views a change from a first color to a second color. By way of example, there may be a stark contrast between the color of the porous polymer membrane strip and the color of the stimulus sensitive poloxamer solution.

Similarly, the indication of exposure taking the form of a change in indication visible through the window can occur, by way of example only, if the indicator spot is comprised of or contained a glyph of some sort, and the stimulus sensitive poloxamer solution is colored the same color as the indicator spot or glyph, so that the user no longer can discern a portion if not the entire indicator spot through the window because the coloring of the stimulus sensitive poloxamer solution in its liquid state matches the coloring of the indicator spot, and thus the indicator spot is obscured from view. Although either the coloring or dyeing of at least a portion of the porous polymer membrane strip or the indicator spot visible through the window can provide the indication to the user that the stimulus sensitive object attached to the stimulus sensitive indicator has been exposed to the predetermined stimulus, both options may be understood to be applicable even if only one such embodiment is referred to in a description herein. Moreover, the interchangeability of the use of an indicator spot and coloring of a portion of the porous polymer membrane strip is applicable to all embodiments discussed herein that employ an indicator spot for providing the indication of exposure to the predetermined stimulus.

In one example of the disclosed invention, the wicking of the stimulus sensitive poloxamer solution occurs in one direction only, from the second end to the first end of the assembly. This may be a result of capillary forces exerted by the fibers of the porous polymer membrane strip on the stimulus sensitive poloxamer solution. The magnitude of the capillary forces can depend on several factors including the porosity of the porous polymer membrane, the viscosity of the stimulus sensitive poloxamer solution, and the surface tension of the stimulus sensitive poloxamer solution. However, in some embodiments, while the level or strength of the capillary forces driving the wicking of the stimulus sensitive poloxamer solution through the fibers of the porous polymer membrane can change, the direction in which the wicking occurs cannot. The implication for such irreversibility in direction of the wicking of the stimulus sensitive poloxamer solution in its liquid state, means that once the solution has wicked through the runway of the porous polymer membrane strip, it may not be possible for the stimulus sensitive poloxamer solution to wick in reverse from the first end to the second end of the assembly. In this example, once the stimulus sensitive solution has wicked to such an extent that it at least partially, and possibly fully, colors or dyes the portion of the porous polymer membrane strip that may be visible through the viewing window, the irreversibility of the wicking permanently can cause the stimulus sensitive poloxamer solution to permanently color or dye at least that portion of the porous polymer membrane strip because the stimulus sensitive solution possibly cannot retreat from and re-reveal that same portion of the previously uncolored portion of the porous polymer membrane strip when the predetermined stimulus is removed. Similarly, in another embodiment, by way of example, once the stimulus sensitive solution has wicked to such an extent that it at least partially and possibly fully colors the portion of the porous polymer membrane strip visible through the window, thereby obscuring the indicator spot previously visible through the window, the irreversibility of the wicking permanently can cause the stimulus sensitive poloxamer solution to permanently obscure the indicator spot because the stimulus sensitive poloxamer solution cannot retreat from and re-reveal the previously unobscured indicator spot when the predetermined stimulus is removed. In this way the stimulus indicating device permanently evidences that it, and the stimulus sensitive product attached to it, had been exposed to a predetermined stimulus, and if the indicator spot is fully obscured, that exposure may likely have lasted for a predetermined amount of time.

As discussed herein, by way of example, it is possible to formulate stimulus sensitive poloxamer solutions that exhibit multiple transitions between the gel state and the liquid state as a function of temperature, and embodiments of the inventive stimulus indicating devices described herein can be prepared to indicate exposure to one or more predetermined temperatures with the same stimulus indicating device. Such a device is advantageous given the reduction in cost of only employing one stimulus indicating device instead of two stimulus indicating devices to indicate a stimulus sensitive products exposure to one of two predetermined stimuli, such as two different temperatures. This advantageous situation can be accomplished by incorporating a stimulus sensitive poloxamer solution that possesses the ability to transition between multiple states into the solution reservoir created within a single assembly contained in a single stimulus sensitive device. By way of example only, a stimulus sensitive poloxamer solution that has two transitions points can be prepared so as to have its lower transition temperature (e.g., the point where it transitions from its gel state to its liquid state as the temperature drops) at 0° C. (by way of example only), and have its higher transition temperature (e.g., the point where it transitions from its gel state to its liquid state as the temperature rises) at 44° C. (by way of example only). Such a stimulus sensitive poloxamer solution may exist in its gel state when held at a temperature above the lower transition temperature but below the higher transition temperature, by way of example only, the stimulus sensitive poloxamer solution is held at 30° C. When the stimulus sensitive poloxamer solution with two transition points exists in its gel state and is placed in the solution reservoir of a single stimulus sensitive device, so that it is in contact with the porous polymer membrane strip, it may be unable to wick through the porous polymer membrane strip as a result of being in its gel state. However, the stimulus sensitive poloxamer solution can turn into a liquid and wick through the porous polymer membrane if either of the following two scenarios occurs: the device and the stimulus sensitive poloxamer solution in its gel state is exposed to a temperature below the lower transition temperature (e.g., 0° C. or below), or the device and the stimulus sensitive solution in its gel state is exposed to a temperature above the higher transition temperature (e.g., 44° C. or above). In this manner, in one example, a single stimulus indicating device containing a single porous polymer membrane strip in contact with a single stimulus sensitive poloxamer solution can be made to indicate exposure to two predetermined temperatures.

Similarly, by way of example, it is possible to achieve close to the same economies of scale of using a single stimulus sensitive device to indicate exposure to two different predetermined temperatures, by using an assembly that contains two solution reservoirs instead of the single solution reservoir disclosed in regard to the assembly discussed herein, wherein each of the two solution reservoirs would contain a separate stimulus sensitive poloxamer solution, wherein the first stimulus sensitive poloxamer solution would be formulated to respond to a lower transition temperature (e.g., the point where it transitions from its gel state to its liquid state as the temperature drops) at 0° C. (by way of example only), and the second stimulus sensitive poloxamer solution would be formulated to respond to a higher transition temperature (e.g., the point where it transitions from its gel state to its liquid state as the temperature rises) at 44° C. (by way of example only). The two solution reservoir assembly may also contain two stimulus sensitive poloxamer solutions that transition from the gel to the liquid state upon cooling but each do so at a different transition temperature (by way of example, 15° C. for the first stimulus sensitive poloxamer solution and 2° C. for the second stimulus sensitive poloxamer solution). The two solution reservoir assembly may also contain two stimulus sensitive poloxamer solutions that transition from the gel to the liquid state upon heating albeit each at a different transition temperature (by way of example, 8° C. for the first stimulus sensitive poloxamer solution and 25° C. for the second stimulus sensitive poloxamer solution). By way of example, the two solution reservoir assembly may be constructed as described above for the single solution reservoir assembly, except that an additional seal can be made longitudinally along the center of the top layer, wherein this center seal can start at the second end of the porous polymer membrane strip, at the seal positioned at the second end of the assembly, and can continue at least through the window positioned in the first end of the assembly thereby bisecting the runway and the solution reservoir. As with the other seals discussed herein, when applying this longitudinal center seal to the assembly so that it bisects the runway and the solution reservoir, sufficient pressure and temperature may be applied so that the top layer melts into the porous polymer membrane strip such that the porous structure of the porous polymer membrane strip can be also melted by the combination of temperature and pressure, so as to form two channels wherein each channel in the loaded assembly may be comprised of at least one of the sealed solution reservoirs, in fluid connection with the corresponding portion of the runway, and then in fluid connection of the unsealed width of the first end of the loaded assembly, and that channel may be sealed by the longitudinal edge seal, the single longitudinal center seal, and the seal at the width of the second end of the loaded assembly. These two channels can ensure that the two stimulus sensitive poloxamer solutions, once each is in its liquid state, may only travel down its corresponding runway within the porous polymer membrane strip. If a two solution reservoir assembly is made, by way of example, two window portions or indicator windows may be added, one for each channel, but such dual windows are not necessarily needed. Once constructed, this two solution reservoir assembly may be able to indicate exposure to two different transition temperatures.

As discussed herein, the pouched assembly embodiment of the stimulus indicating device described herein may, for example, be formed by the top layer and the bottom layer sandwiching the porous polymer membrane strip, the cover atop the top layer, all of which may be contained inside the moisture barrier pouch, and may contain at least one stimulus sensitive poloxamer solution. It should be noted that the bottom layer may be made from plastic such as polyethylene or polyester, either unfilled or filled with certain additives, although it is not necessary that it be transparent. The entire upper surface of the bottom layer may be adhered to the underside of the porous polymer membrane strip, for example by heat laminating the entire bottom layer to the entirety of the underside of the porous polymer membrane. More specifically, by way of example, by selecting the proper plastic material, upon heating the entire bottom layer, the heating may cause the entire bottom layer to melt slightly and permanently stick to the underside of the porous polymer membrane strip. Optionally, other techniques may be used in lieu of or in combination with heat lamination, for instance, an adhesive layer may be used to adhere the upper surface of the plastic layer to the underside of the porous polymer membrane. It should be further noted that the top layer may be made from a transparent plastic such as polyethylene or polyester, either unfilled or filled with certain additives. If the plastic of the top layer contains additives, the quantity and type of additives may be such that the top layer remains largely transparent. By way of example, the underside of the entire first end of the top layer can be attached to the upper side of the first end of the porous polymer membrane strip, for example, by heat lamination. Furthermore, the seals along the longitudinal edges of the assembly may be created in the same step as the adhesion of the first end of the top layer by heat lamination or heat stamping, by not only applying heat and pressure at the first end of the top layer but also along the longitudinal edges of the assembly. More specifically, by way of example, by selecting the proper plastic material, upon heating the entire first end of the top layer, the heating can cause this portion of the top layer to melt slightly and permanently stick to the corresponding portion of the upper side of the porous polymer membrane strip. Furthermore, for example, by selectively applying heat and pressure along the long edges of the assembly, the two seals along the longitudinal edges of the assembly may be created at the same time as the lamination of the first end is created. Optionally, other techniques may be used in lieu of or in combination with heat lamination, for instance, an adhesive layer may be used to adhere those portions of the top layer to the corresponding portions of the porous polymer membrane.

The porous polymer membrane strip can be constructed of several materials. For example, the porous polymer membrane strip may be made from polyester, and may be constructed similarly to polyester filter paper, such as UT-300 that can be purchased from Midwest Filtration LLC (Cincinnati, Ohio). The moisture barrier pouch can be constructed, by way of example, of a strong, resilient leak-proof material, such as plastic or other polymer material, so as to allow for the twisting or bending that might occur during transportation of or application to the stimulus sensitive device without tearing, breaking or leaking. The pouch may be prepared by heat sealing two plastic films together. By way of example, the top plastic film of the pouch, which is the plastic film of the pouch that is nearest the top layer of the assembly, may be transparent, while the bottom film of the pouch may or may not be transparent. The moisture barrier pouch may include any of a number of materials that have a high moisture vapor retention including polyesters doped with aluminum oxide, such as TPF-0599B available from Oliver Tolas (Feasterville, Pa.). Other materials that have high moisture vapor retention include film laminates containing polyvinylidene chloride available for instance, from Tekni-Plex (Wayne, Pa.). For example, the cover may be formed by applying an opaque layer, such as paint or ink, to most of the upper or lower surface of the top layer, while leaving a portion of the top layer free from paint or ink, so as to form the viewing window or indicator window or window (collectively all are referred to herein as the window). Alternately, the cover may be constructed of a separate plastic sheet that has a window formed from paint or ink and that is then adhered to the top layer. Alternately, the cover can also be formed as a label which has a portion cut out to form the window, in which the label could be glued to the upper side of the top layer.

The window in the cover may remain free from ink or coloring so that the user of the stimulus indicating device may observe or view the first side of the assembly through the window as explained herein. The moisture barrier pouch may, for example, also be able to accept paste, glue or other suitable adhesive on its underside side (i.e., the surface of the assembly opposite the window), so as to allow the pouched assembly to be attached to a stimulus sensitive product if so desired.

Further to the descriptions herein which state that a stimulus sensitive poloxamer solution may have a particular transition temperature of one or two degrees Celsius, in practice, commercially available polomaxer solutions may generally undergo a gel to liquid transition that spans several degrees of temperature. For example, a stimulus sensitive poloxamer solution which has been identified as transforming from gel to liquid at 2° C., can start its transformation anywhere from 2° C. plus-or-minus one degree Celsius to plus-or-minus five degrees Celsius. One reason stimulus sensitive poloxamer solution may have such a wide transition temperature range is the presence of particular byproducts that can be generated by the synthesis of the polymer (i.e., the stimulus sensitive poloxamer solution). These byproducts can include polyethylene oxide homopolymer ("PEO") and/or polyethylene oxide/polypropylene oxide diblock copolymers ("PPO") that result from synthesizing the desired triblock copolymer. These byproducts may account for approximately 15% to 50% of the total mass of the stimulus sensitive poloxamer solution obtained from commercial vendors. Likewise, the wide transition temperature range can also result from variations of the length of the PEO and/or PPO blocks that make up the triblock copolymer. The block co-polymer synthesis process for poloxamers can be the result of many sequential reactions; and thus, the final length of certain resulting polymers, and/or the final molecular weight of the resulting polymers, may form a statistical distribution around an average length of the polymer, which results in an average molecular value for that polymer.

In the case of a temperature indicating device that contains a stimulus responsive poloxamer solution as the component that will provide the indication of exposure to the transition temperature, a poloxamer solution that undergoes its change in viscosity over as narrow a range of transition temperatures as possible may be used, compared to a poloxamer solution that undergoes its change in viscosity over a broad range of transition temperatures. The narrow transition temperature range arises from several factors. For example, because commercially available poloxamers contain several different molecular weights, the poloxamers may exhibit a heterogeneity in transition temperatures, and thus, may exhibit a heterogeneity in their corresponding local viscosity (i.e. small portions of the gel will become liquid while other portions remain gelled, or small portions of the solution remain gelled even after most of it has become liquid). In some cases, the viscosity change from one point of the gel to another point can be very small; local viscosity might be higher in some portions of the gel than in other portions. In any of these cases, the heterogeneity in solution viscosity can induce variability in the transition temperature and/or wicking time of the solution through the porous membrane, thus decreasing the overall time-temperature measurement accuracy of the device.

Thus, it can be useful, for example, to both limit the distribution of poloxamer molecular weights in the gel and eliminate the aforementioned byproduct species in order to limit the heterogeneity of the solution. In order to achieve this, a variety of filtration methods exist. U.S. Pat. No. 5,800,711 uses the addition of salt to separate their desired poloxamers from the byproducts. However, this method requires substantial washing steps and produces very low yields. Likewise, WO/9216484 suggests the use of a gel permeation chromatography. In the case of the instant disclosure, each of these fractionation methods, while very selective, can, for example, produce low yields, require some specialized laboratory equipment, and lack the scalability to produce high quality poloxamer at a low cost.

The embodiments of the disclosure improves upon the references cited above by, for example, achieving the fractionation of a poloxamer via a simple physical filtration method that is low-cost, may not require the use of organic solvents (which can be toxic and difficult to dispose of), scalability, and may only require the control of ambient temperature. For example, to fractionate the stimulus sensitive poloxamer solution, a certain amount of poloxamer that has a desired transition temperature of 2° C. can be dissolved in water to form a solution at a high enough concentration that it may not flow through a pre-selected porous membrane via the force of its own weight at the initial temperature of 4° C. and normal pressure (this example may be set up in an environmental chamber, refrigerator, cold room or oven with humidity control). The porous membrane can be secured under the solution and positioned such that the stimulus sensitive poloxamer solution can flow through the paper if its viscosity is lowered to a sufficient level. By way of example, one way of achieving this positioning is to use a conical porous membrane placed inside of a cone shaped funnel with the stimulus sensitive poloxamer solution in its gel state resting inside of the porous membrane cone. Likewise, by way of example, the stimulus sensitive poloxamer solution being fractionated is covered in a plastic membrane, for example Parafilm, so as to minimize evaporation of the sample, which may impact the transition temperature of the stimulus sensitive poloxamer solution during either the fractionation step or during its use in the temperature indication device. Once this system is set, the temperature of the system is lowered slowly and in small increments from 4.0° C. until the stimulus sensitive poloxamer solution reaches 3.0° C. Once the system drops below 4.0° C., the stimulus sensitive poloxamer solution can begin to partially transition from its gel state to its liquid state, and the first amount of liquid passes through the bottom of the porous membrane and into a collection vial. The temperature of the system is held at 3.0° C. until there is no more stimulus sensitive poloxamer solution in its liquid state flowing through the porous membrane. The portion of the stimulus sensitive poloxamer solution contained in the vial now, in certain embodiments, has a transition temperature of between 4.0° C. and 3.0° C.

In order to reduce the width of the transition temperature range of the remaining in the conical filter, the temperature of the system can again be lowered slowly and in small increments from 3.0° C. until the stimulus sensitive poloxamer solution reaches 2.0° C. so that all portions of the stimulus sensitive poloxamer solution that transitioned prior to reaching 2.0° C. turns to its liquid state and flows through the porous membrane and into a second vial. At the point where the system is held at 2.0° C. for a long enough period that the liquid portion of the stimulus sensitive poloxamer solution stops flowing, the fraction of the stimulus sensitive poloxamer solution remaining in the conical filter has a transition temperature of less than 2.0° C., and the fraction of the stimulus sensitive poloxamer solution captured by the second vial has a transition temperature of between 3.0° C. and 2.0° C.

In addition to the benchtop embodiment described here, this process may be scaled up to a much larger scale through making the cone funnel and filter larger. In another embodiment, this fraction may also be accomplished through the use of common industrial equipment, such as a filter press. Briefly, the filter press can operate in the same fashion as the invention above, except that the user may apply a specific pressure gradient to drive the solution through the filter media instead of gravity. The process may be performed in a controlled environment, such an environmental chamber, refrigerator, cold room, or oven etc. so that temperature may be varied in controlled fashion.

Once the different fractions of the stimulus sensitive poloxamer solution is generated, the fraction specific to the desired transition temperature can be inserted into reservoir of the stimulus indicating device as taught herein.

II. Embodiments Having a Layered Assembly Including a Porous Polymer Membrane Strip and Plastic Layers without a Moisture Barrier Pouch To achieve these and other advantages and in accordance with the purpose of the embodiments disclosed herein, as embodied and broadly described herein and as shown in FIG. 2A, FIG. 2B, FIG. 2C, and FIG. 2D, a second embodiment may include a loaded assembly that is similar to the loaded embodiment of the first embodiment described above, but that contains a sealed first end, contains an additional reservoir that collects the air that is pushed out of the runway by the stimulus sensitive poloxamer solution in its liquid state as it moves through the runway, and may not contain a pouch. The second embodiment, for example, may be constructed of a porous polymer membrane layer, for example, in a rectangular-shaped, sandwiched between a top layer and a bottom layer that may be constructed of a flexible transparent material, such as a transparent plastic, in which these two layers of plastic material can be similar to the porous polymer membrane strip in terms of shape, but may be the same size or slightly larger, by way of example only, along both the width and length if the porous polymer membrane strip is rectangular in shape. The joining of a top layer, porous polymer membrane strip, and bottom layer is referred to herein as the assembly.

By way of example, prior to positioning the porous polymer membrane strip between the top layer and the bottom layer, the top layer may have a mask printed on it, in which the mask could be printed on either the top side or the bottom side of the top layer, but may be printed on the upper side of the top layer. Those of ordinary skill in the art may recognize that a separate cover can also be affixed to the top layer, and can have a mask printed on it that is similar to the mask printed on the top layer, or the separate cover may be a label that is affixed to the top layer. For purposes of this application, both the mask printed on the top layer, and the separate cover (as well as their variations) can be referred to collectively herein as the cover. The cover may be divided into two portions, in which the first portion can be opaque enough so as to obscure a portion of the porous polymer membrane strip positioned below it, and the second portion may be transparent so as to form a window within the cover. The cover can be positioned on the top layer such that the window can be located over the middle section of the top layer. Any reference to the top layer after this point may be understood to include the cover unless otherwise distinguished.

By way of example, when assembling or constructing the stimulus indicating device, particularly the assembly, the upper side of the bottom layer is completely adhered to the bottom side of the porous polymer membrane strip, for example, by heat stamping or heat lamination. When adhering the bottom layer to the bottom side of the porous polymer membrane strip, the polymer membrane aspect of the porous polymer membrane strip may be altered locally at the interface with the bottom layer so that it can be sealed and can be then incapable of wicking or transporting any liquid that that portion of the porous polymer membrane strip portion may come in contact with. Similarly, the middle portion of the bottom side of the top layer may be adhered, for example by heat stamping or heat lamination, to the upper side of the porous polymer membrane strip, but more particularly, for example, only the middle portion of the porous polymer membrane strip may be adhered to the middle portion of the top layer. Such adhering can act to seal locally at the interface with the top player that portion of the porous polymer membrane strip from being able to wick or transport liquid.

In some embodiments, the objective of permanently adhering the upper side of the bottom layer to the bottom side of the porous polymer membrane strip, and the objective of permanently adhering a middle portion of the bottom side of the top layer to the corresponding middle portion of the upper side of the porous polymer membrane strip, may be to force the stimulus sensitive poloxamer solution to wick through the portion of the porous polymer membrane strip that has not been adhered to either the top layer or the bottom layer. More particularly, to encourage proper operation of the embodiments of the stimulus sensitive devices described herein, the stimulus sensitive poloxamer solution may be forced to wick through the unaltered portions of the porous polymer membrane strip because the stimulus sensitive poloxamer solution in its liquid state may readily wick through any small gap, channel or space that exists between the porous polymer membrane strip and the top layer, or that exists between the porous polymer membrane strip and the bottom layer, or that is uncrushed or unaltered or that is not adhered to the top layer or to the bottom layer. For this reason, in some embodiments, the adhesion of the top layer and the bottom layer to the porous polymer membrane strip as described herein may be complete in the intended areas so that no small gaps or spaces are allowed to form that would allow wicking of the stimulus sensitive poloxamer solution in its liquid state outside of the intended area. By ensuring the stimulus sensitive poloxamer solution does not leak into gaps or spaces, the wicking of the stimulus sensitive poloxamer solution through the porous polymer membrane strip can be better controlled, and therefore the temperature and indication time of the time-temperature indicating device, is consistent among devices made of the same lot.

In some embodiments, after the top layer and bottom layer has been adhered to the porous polymer membrane strip, two seals are then made along the long edges of the assembly. These seals can be created in different manners. For example, if the bottom layer and top layer are sized identically to the porous polymer membrane strip, sufficient pressure and temperature are applied along the edge of the porous polymer membrane strip such that the porous structure of the porous polymer membrane strip is melted to such a degree that it forms a seal that prevents the stimulus sensitive poloxamer solution from moving through that sealed portion of the porous polymer membrane strip, and consequently ensures that the stimulus sensitive poloxamer solution, in its liquid state, only moves through the intended portions of the assembly. Alternatively, in some embodiments, if the bottom layer and the top layer are larger in length and width than the porous polymer membrane strip, the two seals formed along the long edges of the top layer and bottom layer may be made just outside the porous polymer membrane strip by applying sufficient pressure and temperature to melt the bottom and top layers together, so as to ensure that the stimulus sensitive poloxamer solution, in its liquid state, only moves through the intended portions of the assembly.

As discussed above in regard to adhering the top layer and the bottom layer to the porous polymer membrane strip, in some embodiments, when creating the longitudinal seals, the seals may not only impede the stimulus sensitive poloxamer solution from wicking out through the longitudinal edges of the assembly, but that the longitudinal seals may not have a gap, space, or channel that would otherwise allow the stimulus sensitive poloxamer solution to wick through said gap, space or channel so as to ensure consistency in terms of the desired liquid traveling though the porous polymer membrane strip.

It should be appreciated that, in some embodiments, only the longitudinal sides of the assembly are sealed, and there are no seals at the width of the first end or the width of the second end of the assembly.

By way of example, the combination of the entirety of the bottom layer being adhered to the bottom side of the porous polymer membrane strip, with the two seals along the longitudinal edges of the assembly, and only the middle portion of the top layer being adhered to the middle portion of the upper side of the porous polymer membrane strip, can result in the formation of two open ended reservoirs, with the reservoir that may initially contain the stimulus sensitive poloxamer solution in its gel state (i.e., the solution reservoir) being positioned at the second end of the assembly, and the reservoir that may subsequently collect the air as it is pushed out of the runway (i.e., the air reservoir) being positioned at the first end of the assembly.

Once the solution reservoir is formed, a stimulus sensitive poloxamer solution, that is dyed a color different than the cover, may be placed inside that solution reservoir by injecting the dyed stimulus sensitive poloxamer solution through the opening on the second end of the assembly. A consistent amount of the dyed stimulus sensitive poloxamer solution is injected into the solution reservoir each time a stimulus sensitive device is manufactured so as to ensure consistency of operation. After placing the stimulus sensitive poloxamer solution into the solution reservoir, the solution reservoir can be sealed along the width of the second end of the assembly, in which the seal may be made by heat stamping or heat lamination.

Although one embodiment described herein maintained the first end of the loaded assembly as unsealed so as to allow the stimulus sensitive poloxamer solution in its liquid state to flow through the runway, that embodiment required the use of a pouch to prevent the stimulus sensitive poloxamer solution in the second reservoir from evaporating. In another embodiment, the first end of the loaded assembly can be sealed along its width so as to prevent circulating air from evaporating the stimulus sensitive poloxamer solution, and thereby eliminating the need for the pouch. However, without wishing to be bound by theory, the stimulus sensitive poloxamer solution may be only able to wick through the runway if the stimulus sensitive poloxamer solution may be able to push the air that lies in front of it inside the porous polymer membrane strip, out of its way and into the first end of the loaded assembly. More specifically, for example, if the stimulus sensitive poloxamer solution in its liquid state is unable to push the air contained in the runway out of the way as the stimulus sensitive poloxamer solution moves or wicks through the runway, the stimulus sensitive poloxamer solution may not be able to move into the window and provide the indication of exposure to a predetermined stimulus. Accordingly, there is the need for the air reservoir located in the first end of the loaded assembly, to absorb the volume of air being pushed out of the way of the stimulus sensitive poloxamer solution in its liquid state as it moves through the runway, and so the air reservoir is formed in that first end of the loaded assembly. As one of ordinary skill in the art can appreciate, the air reservoir can be formed by thermoforming the top layer so that there is a bubble formed on the first side of the top layer, in which the top of the bubble may be positioned away from the micro porous polymer strip, or the air reservoir can be injected with air so as to stretch the size of the air reservoir, or the top layer can be left as described above in that it is formed by the two longitudinal seals, the bottom side of the first end of the top layer and the upper side of the first end of the micro porous polymer strip. The air reservoir may be sealed along the width of the first end, in which the seal can be made, for example, by heat stamping or heat lamination as described herein. The sealing of the air reservoir has the benefit of helping prevent the stimulus sensitive poloxamer solution from being evaporated by circulating air, and eliminating the need for the moisture retention pouch.

In some embodiments, the structure created as described above and resulting in the top layer and the bottom layer being adhered to the porous polymer membrane strip, with the longitudinal seals, the seal at the width of the first end of the assembly, and the seal at the width of the second end of the assembly being formed as described herein, and the dyed stimulus sensitive poloxamer solution being loaded and contained in the now sealed solution reservoir, is referred to herein as the pouchless assembly.

In some embodiments, the internal portion of the porous polymer membrane strip, through which the stimulus sensitive poloxamer solution moves when it is in its liquid state, is referred to herein as the sealed runway, and that sealed runway portion may be formed by being bounded on its outer sides by the two longitudinal edge seals, by being bounded on the bottom side of the porous polymer membrane strip by the bottom layer being adhered to the underside of the porous polymer membrane strip, and being bounded by the upper side of the middle portion of the porous polymer membrane strip being adhered to just the middle portion of the bottom side of the top layer.

As one of ordinary skill in the art may appreciate, a stimulus sensitive poloxamer solution that shows a transition from the gel state to the liquid state as a result of decreasing its temperature below its predetermined stimulus or predetermined transition temperature, may be used to provide indication of exposure to a predetermined temperature. This may be done by initially loading a stimulus sensitive poloxamer solution that is in its gel state, and that has been dyed a certain color, into the solution reservoir as described above. Because the stimulus sensitive poloxamer solution, when it is in its gel state is unable to wick through the porous polymer membrane the stimulus sensitive poloxamer solution in its gel state remains completely in the second side of the assembly. However, once the pouchless assembly, which may contain, for example, a dyed stimulus sensitive poloxamer solution, is exposed to a temperature below the transition temperature of the stimulus sensitive poloxamer solution, the dyed stimulus sensitive poloxamer solution can undergo a transition from its gel state to its liquid state. While the dyed stimulus sensitive poloxamer solution is in its liquid state, the solution can wick through the sealed runway portion of the porous polymer membrane strip in a direction that moves away from the solution reservoir and towards the air reservoir. As the liquid poloxamer wicks through the sealed runway portion of the porous polymer membrane strip, the wicking may be initially hidden from the view of the end user by the cover. However, after the pouchless assembly has been exposed to the predetermined temperature for the predetermined amount of time, the dyed stimulus sensitive poloxamer solution may wick through the portion of the sealed runway that is positioned directly beneath the window and at least partially, or more preferably fully, wick through the window, thereby providing an indication that the temperature sensitive indicator, and the temperature sensitive product attached to it, have been exposed to a harmful temperature, and more particularly, have been exposed to a harmful temperature for a determinable amount of time, in which the time it takes for the stimulus sensitive poloxamer solution to migrate through different lengths of the porous polymer membrane strip can be attributed to corresponding, but different, periods of time.

As discussed herein, in some embodiments, the window in the cover allows the user to view the indication of exposure to a deleterious stimulus by allowing the user to view the dyed stimulus sensitive poloxamer solution in its liquid state wicking through the sealed runway positioned directly below the window. Such an indication of exposure to a deleterious stimulus may take the form of: the dyed stimulus sensitive poloxamer solution not being visible in the window prior to exposure to a predetermined stimulus because it is covered by the opaque portion of the cover; and/or the dyed stimulus sensitive poloxamer solution being visible in the window after exposure to a predetermined stimulus. More specifically, and by way of example only, prior to the exposure to the predetermined stimulus the user can view the porous polymer membrane strip, and can either note the color of the porous polymer membrane strip, or the user can note the glyph, symbol, alphanumeric characters, or other types of indicator spots printed on the porous polymer membrane strip which are positioned below the window.

In some embodiments, this indication of exposure in the form of a partial or a full wicking of the dyed stimulus sensitive poloxamer solution through the porous polymer membrane directly under the window would be visible to the end user as either a change in color or a change in indication, by way of example, obscuring an indicator spot on the porous polymer membrane strip visible through the viewing window. Taking each separately, the indication of exposure occurring via a change in color can occur by way of example, if the porous polymer membrane strip were colored a first color, and the dyed stimulus sensitive poloxamer solution were colored a second color, and when the stimulus sensitive poloxamer solution at least partially wicks through the portion of the micro porous polymer membrane strip visible in the window, the user views a change from a first color to a second color. In some embodiments, there is stark contrast between the color of the porous polymer membrane strip and the color of the stimulus sensitive poloxamer solution.

Similarly, the indication of exposure taking the form of a change in indication visible through the window can occur, by way of example, if the indicator spot was comprised of or contained a glyph of some sort, and the stimulus sensitive poloxamer solution were colored the same color as the indicator spot or glyph, so that the user no longer can discern a portion if not the entire indicator spot through the window because the coloring of the stimulus sensitive poloxamer solution in its liquid state matched the coloring of the indicator spot, and thus the indicator spot was obscured from view. Although either the coloring or dyeing of at least a portion of the porous polymer membrane strip or the indicator spot visible through the window can provide the indication to the user that the stimulus sensitive object attached to the stimulus sensitive indicator had been exposed to the predetermined stimulus, both options may be understood to be applicable even if only one such embodiment is referred to in a description herein. Moreover, the interchangeability of the use of an indicator spot and coloring of a portion of the porous polymer membrane strip is applicable to all embodiments discussed herein that employ an indicator spot for providing the indication of exposure to the predetermined stimulus.

The wicking of the stimulus sensitive poloxamer solution may occur in one direction only, from the second end to the first end of the pouchless assembly. This is a result of capillary forces exerted by the fibers of the porous polymer membrane strip on the stimulus sensitive poloxamer solution. The magnitude of the capillary forces depends on several factors including, for example, but not limited to, the porosity of the porous polymer membrane, the viscosity of the stimulus sensitive poloxamer solution, and the surface tension of the stimulus sensitive poloxamer solution. However, while the level or strength of the capillary forces driving the wicking of the stimulus sensitive poloxamer solution through the fibers of the porous polymer membrane can change, the direction in which the wicking occurs cannot. The implication for such irreversibility in direction of the wicking of the stimulus sensitive poloxamer solution in its liquid state, means that once the solution has wicked through the runway of the porous polymer membrane strip, it may not be possible for the stimulus sensitive poloxamer solution to wick in reverse from the first end to the second end of the pouchless assembly. Once the stimulus sensitive solution has wicked to such an extent that it at least partially and possibly fully colors or dyes the portion of the porous polymer membrane strip that is visible through the viewing window, the irreversibility of the wicking may permanently cause the stimulus sensitive poloxamer solution to permanently color or dye at least that portion of the porous polymer membrane strip because the stimulus sensitive solution cannot retreat from and re-reveal that same portion of the previously uncolored portion of the porous polymer membrane strip when the predetermined stimulus is removed. Similarly, once the stimulus sensitive solution has wicked to such an extent that it at least partially and possibly fully colors the portion of the porous polymer membrane strip visible through the window, thereby obscuring the indicator spot previously visible through the window, the irreversibility of the wicking permanently causes the stimulus sensitive poloxamer solution to permanently obscure the indicator spot because the stimulus sensitive poloxamer solution cannot retreat from and re-reveal the previously unobscured indicator spot when the predetermined stimulus is removed. In this way the stimulus indicating device permanently evidences that it, and the stimulus sensitive product attached to it, had been exposed to a predetermined stimulus, and if the indicator spot is fully obscured, that exposure would likely have lasted for a predetermined amount of time.

As discussed herein, it is possible to formulate stimulus sensitive poloxamer solutions that exhibit multiple transitions between the gel state and the liquid state as a function of temperature, and an embodiment of the inventive stimulus indicating devices described herein can be prepared to indicate exposure to one or more predetermined temperatures with the same stimulus indicating device. Such a device is advantageous given the reduction in cost of only employing one stimulus indicating device instead of two stimulus indicating devices to indicate a stimulus sensitive products exposure to one of two predetermined stimuli, such as two different temperatures. This advantageous situation can be accomplished by incorporating a stimulus sensitive poloxamer solution that possesses the ability to transition between multiple states into the solution reservoir created within the pouchless assembly contained in a single stimulus sensitive device. By way of example only, a stimulus sensitive poloxamer solution that has two transitions points can be prepared so as to have its lower transition temperature (e.g., the point where it transitions from its gel state to its liquid state as the temperature drops) at 0° C. (by way of example), and have its higher transition temperature (e.g., the point where it transitions from its gel state to its liquid state as the temperature rises) at 44° C. (by way of example). Such a stimulus sensitive poloxamer solution may exist in its gel state when held at a temperature above the lower transition temperature but below the higher transition temperature (by way of example, the stimulus sensitive poloxamer solution is held at 30° C.). When the stimulus sensitive poloxamer solution with two transition points exists in its gel state and is placed in the solution reservoir of a single stimulus sensitive device, so that it is in contact with the porous polymer membrane strip, it is unable to wick through the porous polymer membrane strip as a result of being in its gel state. However, the stimulus sensitive poloxamer solution can turn into a liquid state and wick through the porous polymer membrane if either of the following two scenarios occurs: the device and the stimulus sensitive poloxamer solution in its gel state is exposed to a temperature below the lower transition temperature (e.g., 0° C. or below), or the device and the stimulus sensitive solution in its gel state is exposed to a temperature above the higher transition temperature (e.g., 44° C. or above). In this manner, a single stimulus indicating device containing a single porous polymer membrane strip in contact with a single stimulus sensitive poloxamer solution can be made to indicate exposure to two predetermined temperatures.

Similarly, it is possible to achieve close to the same economies of scale of using a single stimulus sensitive device to indicate exposure to two different predetermined temperatures, by using a pouchless assembly that contains two solution reservoirs instead of the single solution reservoir disclosed in regard to the assembly discussed herein, in which each of the two solution reservoirs would contain a separate stimulus sensitive poloxamer solution, in which the first stimulus sensitive poloxamer solution can be formulated to respond to a lower transition temperature (e.g., the point where it transitions from its gel state to its liquid state as the temperature drops) at 0° C. (by way of example only), and the second stimulus sensitive poloxamer solution can be formulated to respond to a higher transition temperature (e.g., the point where it transitions from its gel state to its liquid state as the temperature rises) at 44° C. (by way of example only). The two solution reservoir assembly may also contain two stimulus sensitive poloxamer solutions that transition from the gel to the liquid state upon cooling but each do so at a different transition temperature (by way of example, 15° C. for the first stimulus sensitive poloxamer solution and 2° C. for the second stimulus sensitive poloxamer solution). The two solution reservoir assembly may also contain two stimulus sensitive poloxamer solutions that transition from the gel to the liquid state upon heating albeit each at a different transition temperature (by way of example, 8° C. for the first stimulus sensitive poloxamer solution and 25° C. for the second stimulus sensitive poloxamer solution).

The two solution reservoir assembly may be constructed as described above for the single solution reservoir pouchless assembly, except that an additional seal would be made longitudinally along the center of the top layer, in which the center seal may start at the second end of the porous polymer membrane strip, at the seal positioned at the width of the second end of the assembly and may end at the seal positioned at the first end of the assembly, bisecting the single air reservoir into two distinct air reservoirs and bisecting the solution reservoir into two distinct solution reservoirs. As with the other seals discussed herein, when applying this longitudinal center seal to the pouchless assembly so that it bisects the pouchless assembly into two distinct mirror portions, sufficient pressure and temperature may be applied so that the top layer melts into the porous polymer membrane strip such that the porous structure of the porous polymer membrane strip is also melted by the combination of temperature and pressure, so as to form two channels in which each channel in the pouchless assembly is comprised of at least one of the sealed solution reservoirs, in fluid connection with the corresponding portion of the runway, and then in fluid connection of the corresponding air reservoir, and that channel is sealed by the longitudinal edge seal, the seal at the width of the first end of the pouchless assembly, the single longitudinal center seal, and the seal at the width of the second end of the pouchless assembly. These two channels may ensure that the two stimulus sensitive poloxamer solutions, once each is in its liquid state, only travels down its corresponding runway within the porous polymer membrane strip. If a two solution reservoir pouchless assembly is made, two window portions or indicator windows may be added, one for each channel, but such dual windows are not necessarily needed. Once constructed, this two solution reservoir pouchless assembly may indicate exposure to two different transition temperatures.

As discussed herein, the pouchless assembly embodiment of the stimulus indicating device described herein may, for example, be formed by the top layer and the bottom layer sandwiching the porous polymer membrane strip, the cover atop the top layer, all of which are protected from evaporation caused by circulating air by the existence of the two longitudinal edge seals, and the seal at the width of the second end of the pouchless assembly, and the seal at the width of the first end of the pouchless assembly, and may contain at least one stimulus sensitive poloxamer solution. The entire upper surface of the bottom layer may be adhered to the underside of the porous polymer membrane strip, for example, by heat laminating the entire bottom layer to the entirety of the underside of the porous polymer membrane. More specifically, by selecting the proper plastic material, upon heating the entire bottom layer, the heating may cause that entire bottom layer to melt slightly and permanently stick to the underside of the porous polymer membrane strip. Optionally, other techniques may be used in lieu of or in combination with heat lamination, for example, an adhesive layer may be used to adhere the upper surface of the plastic layer to the underside of the porous polymer membrane. It should be further noted that the top layer may be made from a transparent plastic such as polyethylene or polyester, either unfilled or filled with certain additives. If the plastic of the top layer contains additives, the quantity and type of additives is such that the top layer remains largely transparent. The underside of the middle section of the top layer is attached to the upper side of the middle portion of the porous polymer membrane strip, for example by heat lamination. Furthermore, the seals along the longitudinal edges of the pouchless assembly may be created in the same step as the adhesion of the first end of the top layer by heat lamination or heat stamping by not only applying heat and pressure at the first end of the top layer but also along the longitudinal edges of the assembly. More specifically, by selecting the proper plastic material, upon heating the middle section of the top layer, the heating may cause this portion of the top layer to melt slightly and permanently stick to the corresponding portion of the upper side of the porous polymer membrane strip. Furthermore, by selectively applying heat and pressure along the long edges of the assembly, the two seals along the longitudinal edges of the assembly may be created at the same time as the lamination of the first end is created. Optionally, other techniques may be used in lieu of or in combination with heat lamination, for example, an adhesive layer may be used to adhere those portions of the top layer to the corresponding portions of the porous polymer membrane.

The porous polymer membrane strip can be constructed of several materials. For example. The porous polymer membrane strip may be made from polyester, and may be constructed similarly to polyester filter paper such as UT-300 that can be purchased from Midwest Filtration LLC (Cincinnati, Ohio). Because this pouchless embodiment lacks the pouch discussed herein in regard to a different embodiment, the top layer and the bottom layer may be constructed of a plastic that is constructed of, by way of example, a strong, resilient leak-proof material, such as plastic or other polymer material, so as to allow for the twisting or bending that might occur during transportation of or application to the stimulus sensitive device without tearing, breaking or leaking. The top layer and the bottom layer may include any of a number of materials that have a high moisture vapor retention including polyesters doped with aluminum oxide, such as TPF-0599B available from Oliver Tolas (Feasterville, Pa.). Other materials that have high moisture vapor retention include film laminates containing polyvinylidene chloride available for instance, from Tekni-Plex (Wayne, Pa.). The top layer and the bottom layer may be formed by applying an opaque layer, such as paint or ink, to most of the upper or lower surface of the top layer, while leaving a portion of the top layer free from paint or ink, so as to form the viewing window or indicator window or window (collectively all are referred to herein as the window). Alternately, the cover may be constructed of a separate plastic sheet that has a window formed from paint or ink and that is adhered to the top layer. Alternately, the cover may also be formed as a label, which has a portion cut out to form the window, in which the label can be glued to the upper side of the top layer.

The window in the cover may remain free from ink or coloring so that the user of the stimulus indicating device may observe or view the first side of the assembly through the window as explained herein. The bottom layer may, for example, also be able to accept paste, glue or other suitable adhesive (i.e., the surface of the pouchless assembly opposite the window), so as to allow the pouchless assembly to be attached to a stimulus sensitive product if so desired.

III. Time Lapse Function of the Stimulus Indicator and its Tuning

Advantages of using any of the various embodiments of the stimulus indicating device described herein is that the embodiments may allow for tuning of the stimulus indicating device such that a predetermined stimulus (by way of example only, a predetermined temperature) can occur for just less than a predetermined period of time, and no indication of exposure may occur in or on the stimulus indicating device. After the stimulus indicating device remained at the predetermined stimulus, such as a predetermined temperature or below, for the entire required predetermined period of time, the stimulus indicating device may provide a permanent indication that exposure to that predetermined stimulus occurred. The tuning for a time lapse function can be done by adjusting at least one of an attribute of the stimulus sensitive solution, the length/distance for the liquid stimulus sensitive solution to wick, the porosity of the porous polymer membrane, and the alignment of the fibers making up the porous polymer membrane. This time lapse function capability of the stimulus indicating device prior to showing a permanent indication of exposure to a predetermined stimulus reduces the possibility for false indications of exposure.

For example, a vaccine may spoil at 1° C. (the predetermined stimulus). However, the vaccine may not spoil immediately upon exposure at 1° C. but only if the exposure, by way of example, lasts three or more hours. Thus, if a given predetermined stimulus stops or ceases prior to the three hour mark, there would not be a false positive (i.e., a false indication of exposure), because the vaccine had in fact not spoiled as a result of exposure to the temperature of 1° C. for less than three hours. Providing the stimulus indicating device with the time lapse function/capability can be useful in that the stimulus indicating device does not display to the user an indication of exposure to the predetermined stimulus unless the exposure to the predetermined stimulus occurred both at a predetermined temperature (by way of example only, 1° C.) for at least a predetermined time period (by way of example only, three hours). By way of example, if the time lapse function capability of the stimulus indicating device is set to be 1° C. at least for three hours of exposure, the stimulus indicating device embodiments discussed herein may not provide a permanent indication of exposure if that predetermined stimulus of 1° C. only lasted ninety minutes.

Embodiments described herein may not provide an indication of exposure until after the predetermined stimulus lasted for a predetermined amount of time. For example, embodiments can be tuned to provide an indication of exposure to ≤1° C. for a period of time as small as 20 minutes, or as large as several hours. Thus, until the predetermined amount of time had been reached while at or beyond the pre-determined temperature, the embodiments may not provide an indication of exposure; and an indication of exposure may only occur after the full time at the predetermined temperature had been satisfied.

This "non-indication" by embodiments until the exposure to the predetermined temperature occurs for the predetermined amount of time, is an aspect not found in other prior art stimulus indicating devices. Currently available stimulus indicating devices can be simply characterized as "spike indicators", in that an indication of an exposure to a temperature excursion begins immediately upon being exposed to the predetermined temperature. Such an immediate indication upon exposure to the predetermined temperature, is what cause these spike indicators to provide a "false positive." Such false positives can indicate that temperature sensitive pharma has been rendered ineffective, when in fact the temperature sensitive pharma is still viable because the time of temperature exposure had not lasted long enough to negatively impact the temperature sensitive pharma. For example, as shown in FIG. 4A, the 3M FreezeWatch® indicator provides an indication immediately upon exposure to the predetermined temperature. There is no mechanism to engineer a "time element" into the device because once the liquid inside the indicator reaches 0° C., the chemical properties of the liquid cause it to freeze and break the glass tube (thereby providing the indication).

Similarly, the TempTime FREEZEmarker®, as shown in FIG. 4B, starts to provide the indication of exposure as soon as a temperature stimulus excursion begins below a predetermined temperature. The indication of exposure is caused by the chemical reaction of the liquid contained in the indicator. Specifically, as the chemical is chilled, the colloidal dispersion contained in that liquid begins to precipitate. As the precipitation continues, the precipitate blocks the view of the green circle containing the white check mark (shown on the left). This precipitation and blocking of the green circle begins immediately upon exposure to the pre-determined temperature, and hence there is no time element to the indication. Due to the chemical operation of that colloidal suspension precipitating out immediately, it is impossible to prevent the precipitation from occurring for any amount of time.

The same is true of the TempTime HEATmarker® indicator, in that the chemical composition of that indicator starts darkening immediately upon exposure to the predetermined temperature. Because of its chemical composition, the HEATmarker® is unable to prevent the start of the indication of exposure to a temperature excursion for any amount of time once the HEATmarker® indicator is exposed to a stimulus temperature above its pre-determined temperature. The HEATmarker® indicator can start changing color before a stimulus temperature reaches the pre-determined "trigger" temperature.

In some embodiments, it is possible to introduce a time lapse function. In the embodiments, the indication is carried out when the liquid stimulus sensitive solution wicks enough to dye or color the porous polymer membrane and/or obscure an indicator spot in the window portion of the cover or mask printed onto the top layer of the assembly. In order for the liquid stimulus sensitive solution to wick through the porous polymer membrane and cover the indication spot completely, it may, in some embodiments, wick a certain length. This length can be manipulated by how far the indicator spot is positioned from the reservoir containing the initially gelled stimulus sensitive poloxamer solution.

As discussed herein, by manipulating and/or varying the length of wicking required for the liquid stimulus sensitive solution to wick and fully color the indicator spot, the "time lapse function" can be calculated. Such manipulation of the wicking length required may be done by changing the distance between the window and indicator spot visible through the window and the solution reservoir holding the stimulus sensitive poloxamer solution.

While changing the length that the stimulus sensitive solution may wick is the primary mode to change the time lapse functions, there are other modes that can be varied to achieve variations in the time mode. These modes include changing the type of porous polymer membrane and the pore size of said membrane. Use of membranes of larger pore size tend to result in decreased indication time relative to membranes with smaller pore size because, all other things being equal, it is easier for the stimulus sensitive poloxamer solution to wick through membranes of larger pore size.

Another mode used to tune the time indication of the stimulus indicating device is changing the alignment of the fibers making up the porous polymer membrane with respect to the long axis of the assembly used in the indicator. When the fibers are aligned to the long axis of the assembly, the rate of wicking of the stimulus sensitive poloxamer solution increases compared to when the fibers are aligned orthogonally to the long axis of the loaded assembly or pouchless assembly. Thus, a stimulus indicating device prepared with the fibers of the porous polymer membrane aligned with the long axis of the loaded assembly or pouchless assembly may result in shorter indication times compared to a device in which the fibers are aligned orthogonally to the long axis of the loaded assembly or pouchless assembly.

A final mode used to tune the time indication of the stimulus indicating device is changing the viscosity of the liquid stimulus sensitive poloxamer solution in the liquid state. It is possible to formulate different stimulus sensitive poloxamer solutions, for instance by using a different type of poloxamer or by adding an electrolyte such as sodium chloride, that are responsive to the same predetermined stimulus but yet have a different viscosity. When a lower viscosity liquid stimulus sensitive solution is used, the rate of wicking of the stimulus sensitive solution increases compared to when a higher viscosity liquid stimulus sensitive solution is used. Thus, a stimulus indicating device prepared with a lower viscosity liquid stimulus sensitive solution may result in shorter indication times compared to a stimulus indicating device wherein a higher viscosity liquid stimulus sensitive solution.

In some embodiments, the transition observed in stimulus sensitive poloxamer solutions of moving between their liquid state and its solid state, and vice versa, is dictated by equilibrium thermodynamics and is reversible. Therefore, a stimulus sensitive poloxamer solution in its gel state that transitions to its liquid state when undergoing its phase transition in reaction to a predetermined stimulus may again transition into its gel state if that predetermined stimulus is removed. The reverse is also true in that a stimulus sensitive poloxamer solution in its liquid state transitions into its gel state when undergoing its phase transition in reaction to a predetermined trigger stimulus will transition again into its liquid state if that predetermined trigger stimulus is removed. When the predetermined stimulus is removed, the stimulus sensitive poloxamer solution now in its gel state will undergo the reverse phase transition and transition into its liquid state.

A problem with the known stimulus sensitive poloxamer solutions is that they are reversible. Accordingly, the development of stimulus indicating devices that are irreversible is desirable. Disclosed herein are embodiments that may provide irreversible, reliable visual indication of a stimulus sensitive poloxamer solution that undergoes a phase transition in response to a predetermined stimulus, and permanently indicate that exposure to a predetermined stimulus occurred. The predetermined stimulus can be exposure of the stimulus sensitive poloxamer solution to a predetermined temperature.

Furthermore, it is to be understood that both the general descriptions above and the following detailed descriptions below are exemplary only, and as such are intended to provide further explanation of the embodiments as claimed. As such it is understood that any and/or all of the aspects or portions of the various and alternative embodiments described herein are able to be combined, mixed and matched, etc., so that although an embodiment is not described herein, it is understood to be included in the descriptions in this disclosure.

In accordance with the purpose of the embodiments, as embodied and broadly described herein, there are multiple categories of embodiments of the stimulus indicating device that provide an irreversible and permanent indication of exposure to a predetermined stimulus and/or that harness the transition from the gel state to the liquid state of stimulus sensitive poloxamer solutions to provide that indication.

One such category of the embodiments disclosed herein pertains to a stimulus indicating device that, as embodied and broadly described herein and in conjunction with FIG. 1A, FIG. 1B, FIG. 1C, and FIG. 1D, may employ a dyed stimulus sensitive poloxamer solution in its gel state placed inside a solution reservoir formed into the second end of a pouched assembly including a porous polymer membrane strip sandwiched between two plastic layers. The entire assembly may be placed inside a moisture barrier pouch made from a material with a high barrier to moisture vapor. The stimulus sensitive poloxamer solution is initially in the gel state and in contact with the porous polymer membrane. In the gel state, the stimulus sensitive poloxamer solution is unable to wick through the porous polymer membrane strip but when it turns into its liquid state in response to a predetermined stimulus it wicks through the porous polymer membrane strip in a direction away from the solution reservoir at the second end of the pouched assembly and towards the first end of the pouched assembly. The stimulus sensitive poloxamer solution in the liquid state can wick a sufficient length so as to ensure that the indicator spot or the portion of porous polymer membrane strip visible to the user through the viewing window is covered only after a predetermined amount of time. In an aspect, the pouched assembly may be sealed at three edges: the two longitudinal ends and the width of the second end. The width of the first end of the pouched assembly remains unsealed so that as the stimulus sensitive poloxamer solution in its liquid state wicks through the porous polymer membrane strip, the air contained inside the porous polymer membrane strip can be displaced out the open end (i.e., the unsealed first end of the pouched assembly) and into the moisture barrier pouch. In another aspect, the seals are created to prevent wicking of the stimulus sensitive poloxamer in its liquid state in any direction other than from the second end of the pouched assembly to its first end. The top layer and bottom layer are well adhered to the porous polymer membrane strip such that no spaces or gaps are created along which the stimulus sensitive poloxamer solution in its liquid state can unintentionally wick. The wicking and coloring of the porous polymer membrane strip by the dyed stimulus sensitive poloxamer solution is permanent and irreversible, thereby permanently indicating to a user that the product attached to or associated with the stimulus indicating device had been exposed to a predetermined stimulus.

Another category of the embodiments pertains to a stimulus indicating device that, as embodied and broadly described herein and in conjunction with FIG. 2A, FIG. 2B, FIG. 2C, and FIG. 2D, may employ a stimulus sensitive poloxamer solution, preferably dyed, in its gel state placed inside the solution reservoir formed into the pouchless assembly including a porous polymer membrane strip sandwiched between two plastic layers made from a material with a high barrier to moisture vapor, in which the first end of the pouchless assembly is sealed, for example at the width of the first end, so as to eliminate the need for the pouch, and in which the first end of the pouchless assembly also contains an air reservoir for collecting the air displaced out of the runway of the porous polymer membrane strip as the stimulus sensitive poloxamer solution in its liquid state wicks through the runway. Upon assembly, the stimulus sensitive poloxamer solution is in a gel state and is in contact with the porous polymer membrane, and as such, may be unable to wick through the porous polymer membrane strip. When the stimulus sensitive poloxamer solution turns into its liquid state in response to a predetermined stimulus, the stimulus sensitive poloxamer solution wicks through the porous polymer membrane strip away from the solution reservoir and towards the air reservoir. The stimulus sensitive poloxamer solution in the liquid state can wick a sufficient length so as to ensure that the indicator spot or the portion of porous polymer membrane strip visible to the user through the viewing window is covered. In an aspect, the pouchless assembly may contain one reservoir: the air reservoir at the first end of the pouchless assembly being in contact with the porous polymer membrane strip. The air reservoir does not initially contain any stimulus sensitive poloxamer solution although it may contain air, but is otherwise empty. The air reservoir may collect the air displaced out of the runway of the porous polymer membrane strip as the stimulus sensitive poloxamer solution in its liquid state wicks through the runway, so as to eliminate the need for a pouch. In another aspect, the seals may be created to prevent wicking of the stimulus sensitive poloxamer in any direction other than from the second end of the pouchless assembly to its first end. The top and bottom layers and the porous polymer membrane strip may be well adhered such that no spaces or gaps are created along which the stimulus sensitive poloxamer solution can wick. The wicking and coloring of the membrane by the stimulus sensitive solution, that may be dyed, is permanent and irreversible thereby permanently indicating to a user that the product likely attached to the stimulus indicating device had been exposed to a predetermined stimulus.

Another category of the embodiments pertains to a stimulus indicating device that, as embodied and broadly described herein and in conjunction with FIG. 3A, FIG. 3B, FIG. 3C, and FIG. 3D, may be structured and assembled so as to resemble the embodiment disclosed herein pertaining to FIG. 1A through FIG. 1D, or can be structured and assembled so as to resemble the embodiment disclosed herein pertaining to FIG. 2A through FIG. 2D. For purposes of illustration only, this description is based on the pouchless assembly of the embodiment disclosed herein in regard to FIG. 2A through FIG. 2D, but with the difference that the dual-reservoir assembly employs two stimulus sensitive poloxamer solutions, which may be dyed, where upon construction of the assembly, are in their gel states, and each is placed inside its own respective solution reservoir that is formed into the pouchless assembly. More specifically, the dual-reservoir assembly consists of a porous polymer membrane strip sandwiched between the top layer and the bottom layer in which each layer is made from a material with a high barrier to moisture vapor. Moreover, each of the two solution reservoirs may be in contact with its respective channel that is formed as described herein by bisecting the pouchless assembly along its center line so as to form mirror images of the bisected stimulus indicating device along its center longitudinal line. Each of the stimulus sensitive poloxamer solutions in their gel state is in contact with the porous polymer membrane and is unable to wick through its runway portion of the porous polymer membrane strip, but when either of the stimulus sensitive poloxamer solutions turns into a liquid state in response to a predetermined stimulus, the solution wicks through the porous polymer membrane strip away from its assigned solution reservoir, moving toward its corresponding air reservoir. Either of the stimulus sensitive poloxamer solutions in their liquid state can wick a sufficient length so as to ensure that the indicator spot or the portion of porous polymer membrane strip visible to the user through the viewing window is at least partially covered. In another aspect, the seals may be created to prevent wicking of the stimulus sensitive poloxamer in any direction that is not from the second end of the dual-reservoir assembly to the first end of the dual-reservoir assembly. The top and bottom layers and the porous polymer membrane strip may be well adhered such that no spaces or gaps are created along which the stimulus sensitive poloxamer solution can wick. The wicking and coloring of the porous polymer membrane strip by the dyed stimulus sensitive solution is permanent and irreversible thereby permanently indicating to a user that the product likely attached to the stimulus indicating device may have been exposed to a predetermined stimulus.

The stimulus sensitive solutions employed in the embodiments discussed herein may be made from poloxamers. Poloxamer molecules are triblock copolymers consisting of two PEO blocks joined by one PPO block. By changing the number of ethylene oxide units in the PEO block or the number of polypropylene oxide units in the PPO block, different poloxamer molecules can be made that lead to solutions with different properties. Examples of poloxamer molecules that may be used include Pluronic F-68, F-88, F-98, F-105, F-127, and P-84. The stimulus sensitive poloxamer solution may be made using Pluronic F-127.

As discussed herein, stimulus sensitive poloxamer solutions in their gel states may transition to their liquid states when exposed to their predetermined stimulus. The predetermined stimulus may include cooling below a predetermined temperature or heating above a predetermined temperature since certain stimulus sensitive poloxamer solutions exhibit multiple gel to liquid transitions when exposed to different temperatures. Specifically, the general trend of phase behavior for these stimulus sensitive poloxamer solutions may be as follows: at a low temperature that is below its lower transition temperature, the stimulus sensitive poloxamer solution is in its liquid state. When the stimulus sensitive poloxamer solution is heated above that lower transition temperature, the stimulus sensitive poloxamer solution undergoes a first transition from a liquid state to a gel state. Alternatively, if the stimulus sensitive poloxamer solution, in its gel state, is then heated above a higher transition temperature, the solution may then undergo a transition from its gel state to its liquid state.

As a result of the stimulus sensitive poloxamer solution in its gel state transitioning to its liquid state, the indication of exposure to a predetermined stimulus occurs by at least the stimulus sensitive poloxamer solution in its liquid state wicking through the porous polymer membrane strip and partially or fully covering an indicator spot (or the portion of the porous polymer membrane strip visible to the user through the window) as described for the embodiments disclosed herein (by way of example, the embodiments employing a pouched assembly and a pouchless assembly).

The predetermined stimulus at which a stimulus sensitive poloxamer solution undergoes a transition from its liquid to its gel state can be tuned to different levels of the predetermined stimulus (by way of example, a higher or lower temperature). This tuning of the transition stimulus is accomplished, for example, by changing the concentration and type of poloxamer, or by adding an electrolyte such as Sodium Chloride, and/or by adding a buffering agent such as a sodium or potassium phosphate salt to the stimulus sensitive poloxamer solution As a result, the temperature at which the stimulus sensitive poloxamer solution may undergo its phase transition, which is referred to herein as the trigger temperature or as the predetermined stimulus, can be tuned to different values. Stimulus sensitive poloxamer solutions may have gel state to liquid state trigger temperatures upon cooling of 14.5° C. and 1.5° C. A stimulus sensitive poloxamer solution with a gel state to liquid state transition temperature of 14.5° C. upon cooling is prepared by combining 29 grams of Pluronic F127, 0.05 grams Erioglaucine disodium salt (FD&C Blue dye) and 0.001 grams of ascorbic acid in 70.95 grams of distilled water. A stimulus sensitive poloxamer solution with a gel state to liquid state transition temperature of 1.5° C. upon cooling is prepared by combining 39 grams of Pluronic F127, 0.05 grams Erioglaucine disodium salt (FD&C Blue dye) and 0.001 grams of ascorbic acid in 60.95 grams of distilled water. A stimulus sensitive poloxamer solution may have a gel state to liquid state transition upon cooling of ≤0° C. and a gel state to liquid state transition upon heating of ≥42° C. Such a stimulus sensitive poloxamer solution is prepared by combining 20 grams of Pluronic F127, 10 grams of sodium chloride, 0.05 grams Erioglaucine disodium salt (FD&C Blue dye) and 0.001 grams of ascorbic acid in 69.95 grams of distilled water.

It may be appreciated that the embodiments discussed herein employing stimulus sensitive solutions that contain poloxamer, salt, and water mixtures are illustrative only, and those constituent parts can be replaced by any other fluids that work for the same purpose, such as mixtures of solvents and water, or other non-polar solvents, polar solvents, etc.

IV. Embodiment Having a Layered Assembly Including a Porous Polymer Membrane Strip and Plastic Layers Inside a Moisture Vapor Barrier Pouch In accordance with the some embodiments, as embodied and broadly described herein and in conjunction with FIG. 1A, FIG. 1B, FIG. 1C, and FIG. 1D, an embodiment of the inventive stimulus indicating device 100 as described herein preferably contains an assembly consisting of a porous polymer membrane strip 114 sandwiched between a top layer 116 and a bottom layer 112. The shapes of the porous polymer membrane 114 and the top 116 and bottom layer 112 may be rectangular and may or may not be similarly sized, and it should be noted that variations in shape or size are within the scope of the invention. The underside 133 of the porous polymer membrane strip 114 is attached, for example in its entirety, to the upper side 139 of the bottom layer 112. The underside 135 of the top layer 116 is attached to the upper side 138 of the porous polymer membrane strip 114 but only in a section near the first end 132. The construction of the top layer 116, the porous polymer membrane 114, and the bottom layer 112 as described herein is referred to as the assembly 150. Two longitudinal seals 126 are made along each of the long edges of the assembly 150 and, as a result, a solution reservoir 136 is formed at the second end 134 of the assembly 150 between the top layer 116 and the porous polymer membrane 114. This solution reservoir 136 is initially open at the second end 134 of the assembly 150, which allows stimulus sensitive poloxamer solution in its gel state 110 to be injected into the solution reservoir 136. Once the stimulus sensitive poloxamer solution in its gel state 110 has been loaded into the solution reservoir 136, a third seal 141 is made on the width of the second end 134 of the assembly 150, thereby sealing the solution reservoir 136. No seal is made on the first end 132 of the assembly 150. A cover 118 that is opaque except for a window 122 is attached to the top layer 116. The construction of the top layer 116, the bottom layer 112, the porous polymer membrane strip 114, the solution reservoir 136, the stimulus sensitive solution in its gel state 110 placed inside the solution reservoir 136, and the cover 118 is referred to herein as the loaded assembly 150, which is then placed inside of a pouch 128 that has high barrier to moisture.

The two seals 126 made along the longitudinal edges of the assembly 150 can be created in different manners. For example, if the bottom layer 112 and top layer 116 are sized identically to the porous polymer membrane strip 114, sufficient pressure and temperature are applied along the edge of the porous polymer membrane strip 114 such that the porous structure of the porous polymer membrane strip 114 is melted by the combination of temperature and pressure. In another example, if the bottom layer 112 and top layer 116 are larger than the porous polymer membrane strip 114, the two seals 126 along the long edges may be made just outside the porous polymer membrane strip 114 by applying sufficient pressure and temperature to melt the bottom layer 112 to the top layer 116

In an aspect, when creating seals 126 and 141, the stimulus sensitive poloxamer solution is sealed in its liquid state 120 and is impeded from wicking out through the longitudinal edges of the assembly 150. Also, when creating seals 126 and 1141, in some embodiments, no gap, space, or channel is created such that the stimulus sensitive poloxamer solution in its liquid state 120 can wick through said gap, space or channel and avoid wicking through the porous polymer membrane strip 114.

The two seals along the long edges 126 of the assembly 150 in combination with the lower surface 135 of the top layer 116 at its second end 134 not being permanently adhered to the upper surface 138 of the porous polymer membrane strip 114 form an open ended solution reservoir 136 at the second end 134 of the assembly 150. A stimulus sensitive poloxamer solution in its gel state 110, which may be dyed, may then be placed inside the solution reservoir 136 by injecting it through the opening on that second end 134. After placing the stimulus sensitive poloxamer solution 110 into the solution reservoir 136, the solution reservoir 136 is sealed along the width of the outer edge of the second end 134, for example, by heat stamping or heat lamination resulting in the sealed second end 141. The assembly 150, once it is created as described above and resulting in the top layer 116 and the bottom layer 112 being adhered to the porous polymer membrane strip 114, and the dyed stimulus sensitive poloxamer solution in its gel state 110 being loaded into the solution reservoir 136, are referred to herein as the loaded assembly 150.

While the loaded assembly 150 is sealed 141 on the second end 134, and along both of the longitudinal edges 126, the first end 132 remains open and unsealed at its width 143. The opening 143 at the first end 132 of the assembly 150 may, for example, remain open in order to function properly. In some embodiments, the opening 143 may remain open because as a result, when the stimulus sensitive poloxamer solution in its liquid state 120 begins to wick through the runway 137 (which is a section of the porous polymer membrane strip 114 that is formed by being bounded on its outer sides by the two longitudinal edge seals 126, by being bounded on the bottom side 129 of the porous polymer membrane strip 114 by the upper side 139 of the bottom layer 112 being adhered to the underside 133 of the porous polymer membrane strip 114, and being bounded by the upper side 138 of the porous polymer membrane strip 114 at its first end 132 by it being adhered to just the first end 132 of the underside 135 of the top layer 116), the stimulus sensitive poloxamer solution is able to push any air contained inside the runway out the opening 143. In some embodiments, if the opening 143 is sealed, then the stimulus sensitive poloxamer solution in its liquid state 120 may be unable to wick through the runway portion 137 of the porous polymer membrane strip 114 because that air has nowhere to travel.

The cover 118 may be formed by applying an opaque layer, such as paint or ink, to most of the upper or lower surface of the top layer 116, while leaving a portion of the top layer 116 free from paint or ink, so as to form the window 122. Alternately, the cover 118 may be constructed of a separate plastic sheet that has a window 122 formed from paint or ink and that is then adhered to the top layer 116. Alternately, the cover 118 can also be formed as a label which has a portion cut out to form the window 122, in which the label can be glued to the upper side 117 of the top layer 116. The window 122 in the cover 118 may remain free from ink or coloring so that the user of the stimulus indicating device may observe or view the inside of the assembly through the window 122 as explained herein. The cover 118 is placed in such a manner that the window 122 is located above the first end 132 of the assembly 150, and since the window 122 is transparent or clear, a portion of porous polymer membrane strip 114, or more particularly the runway 137, may be visible to the end user through the window 122.

Figure 1A:
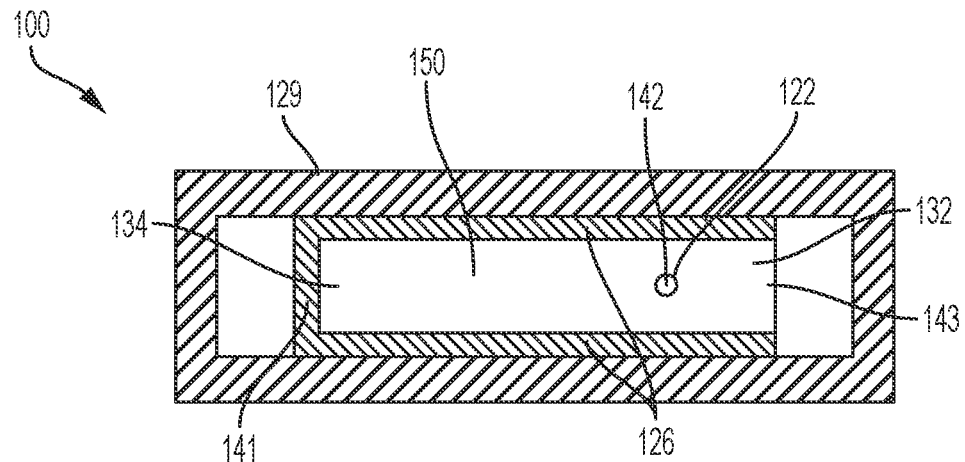
FIG. 1A is a top down view of a stimulus indicating device before exposure to a predetermined stimulus.
Figure 1B:
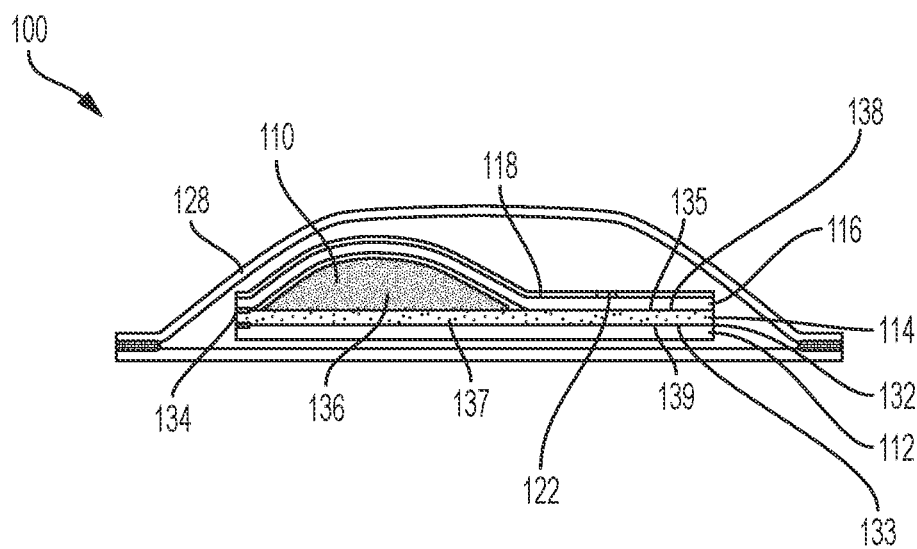
FIG. 1B is a side view of the stimulus indicating device in FIG. 1A.

An embodiment of the stimulus indicating device 100 prior to exposure to the predetermined stimulus is illustrated by FIG. 1A and FIG. 1B. As shown in at least FIG. 1A and FIG. 1B, prior to being exposed to a predetermined trigger stimulus, the stimulus sensitive poloxamer solution in its gel state 110 has not yet undergone a phase transition to reach its liquid state 120 and wick through the runway 137 section of the porous polymer membrane strip 114, and thus the section of the runway 137 section of the porous polymer membrane 114 directly under the window 122 has not been colored or dyed by the stimulus sensitive solution 110 and 120 and so the end user sees the undyed or uncolored porous polymer membrane 142.

Figure 1C:
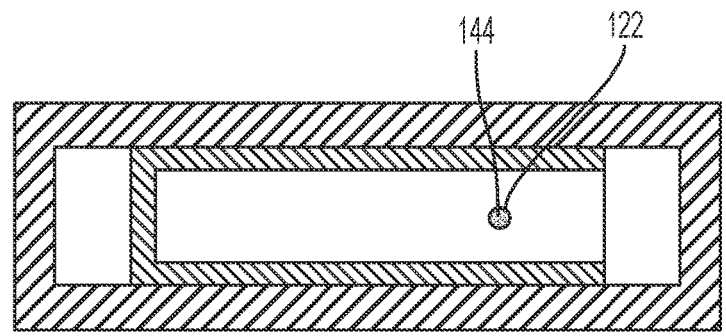
FIG. 1C is a top down view of the stimulus indicating device in FIG. 1A after exposure to a predetermined stimulus.
Figure 1D:
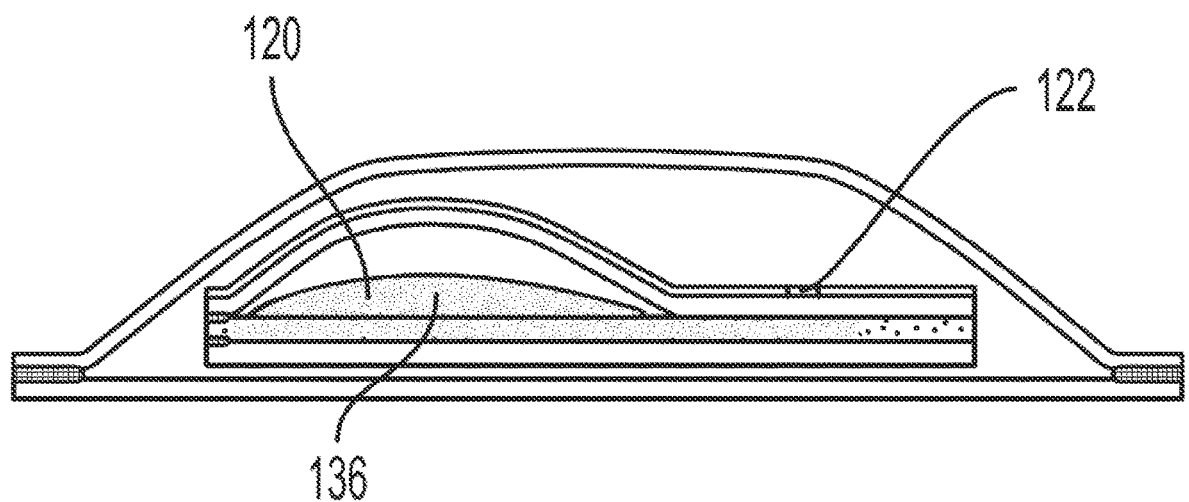
FIG. 1D is a side view of FIG. 1C.

In this embodiment as illustrated by FIG. 1C and FIG. 1D, after exposure to the predetermined stimulus, the stimulus sensitive poloxamer solution in its gel state 110 of FIG. 1A and FIG. 1B undergoes a phase transition and turns into its liquid state 120. After exposure to the predetermined stimulus, which, by way of example, can be the temperature of 2° C., as shown in FIG. 1C and FIG. 1D, the stimulus sensitive poloxamer solution in its gel state 110 transitions to the stimulus sensitive poloxamer solution in its liquid state 120 and wicks away from the solution reservoir 136 positioned on the second side 134 of the porous polymer membrane strip 114 towards the window portion 122 on the first end 132 of the stimulus indicating device 100. As the stimulus sensitive poloxamer solution in its liquid state 120 continues to wick through the runway 137 section of the porous polymer membrane strip 114 in response to the predetermined stimulus it reaches and wicks into and at least partially colors, and if required so as to achieve the predetermined amount of time to provide required indication of exposure, fully colors the porous polymer membrane strip 114 located under the window 122, so as to provide the indication of exposure to the predetermined stimulus. This indication of exposure appears to the end user as a colored or dyed porous polymer membrane strip 144 through the window 122 because the remainder of the porous polymer membrane strip 114 and the remainder of the top layer 116 are covered completely by the cover 118 of the device 100, and as described herein, except for the window 122 the cover 118 is completely opaque. Alternatively, a symbol or indicating spot may be printed on the portion of porous polymer membrane strip 114 visible through the window 122. In response to the predetermined stimulus, the stimulus sensitive poloxamer solution in its gel state 110 turns into the liquid state 120 and wicks and reaches into and at least partially colors or fully colors the porous polymer membrane strip 114 located under the window 122, thus hiding the symbol or indicator spot printed on the porous polymer membrane strip 114 so as to provide the indication of exposure to the predetermined stimulus. By way of example, the indication of exposure can take the form of the end user viewing through the window 122 a color change from white to blue, or a change from a "checkmark" or "✓" to completely colored such that the "checkmark" or "✓" can no longer be discerned.

The stimulus sensitive poloxamer solution 110 and 120, employed by the variations of this embodiment, as shown in FIG. 1A, FIG. 1B, FIG. 1C, and FIG. 1D, may be manufactured so as to contain a dye or colorant that is different from the color of the porous polymer membrane strip 114. Alternatively, if an indicator spot is printed on the porous polymer membrane strip 114 that is visible through the window 122, the stimulus sensitive solution 110 and 120 may be manufactured so as to contain a dye or colorant that is the same as or significantly darker than the indicator spot. In this way the color of the stimulus sensitive solution 110 and 120 in both its gel and liquid state is different from the color of the porous polymer membrane 114 and is the same as or darker than the indicator spot. Thus, when the stimulus sensitive poloxamer solution in its gel state 110 turns into its liquid state 120 in response to the predetermined stimulus, and for example after a predetermined amount of time, the wicking of the liquid 120 through the porous polymer membrane strip 114 may result in the stimulus indicating device 100 providing the indication of exposure by changing, even at least partially, from a first color to a second color, in which the color change is permanently visible to the user of the stimulus indicating device 100 through the indicator window 122.

The objective of permanently adhering the upper side 139 of the bottom layer 112 to the underside 133 of the porous polymer membrane strip 114, and of permanently adhering a portion of the lower side 135 of the top layer 116 to the upper side 138 of the porous polymer membrane strip 114 is to force the stimulus sensitive poloxamer solution in its liquid state 120 to wick through the porous polymer membrane strip 114. The stimulus sensitive poloxamer solution in its liquid state 120 readily wicks through any small gap, channel or space between the layers. For this reason, the adhesion of the top layer 116 and the adhesion of the bottom layer 112 to the porous polymer membrane strip 114 as taught herein is complete so that there are no small gaps. The wicking of the stimulus sensitive poloxamer solution in its liquid state 120, and therefore the temperature and indication time of the stimulus indicating device 100, may be consistent among indicators of the same batch when it occurs through the porous polymer membrane strip 114, but may be inconsistent among indicators of the same batch when it occurs through small gaps or space between the layers, thus the desire to eliminate such gaps, channels or spaces.

As discussed herein, by manipulating and/or varying the distance between the window portion 122 and the reservoir 136, the "time function" can be calculated. More specifically, the time function determines the amount of time required for the stimulus sensitive poloxamer solution in its gel state 110 to transition to its liquid state 120 and wick far enough through the porous polymer membrane strip 114 so that it wicks into and colors the section of porous polymer membrane strip 114 beneath the viewing window 122. As discussed herein, an indicator device 100 can be manufactured so as to not provide an indication of exposure (i.e., not completely or even partially color or dye the porous polymer membrane strip 114 underneath the window portion 122) until after a predetermined amount of time had passed, in which that predetermined amount of time equaled the amount of time required for the stimulus sensitive poloxamer solution in its gel state 110 to first transition to the stimulus sensitive poloxamer solution in its liquid state 120, and then wick into and color or dye the porous polymer membrane strip 114 underneath the viewing window 122. Such manipulation of the distance between the window portion 122 and the reservoir 136 includes moving the window portion 122 farther away from or nearer to the solution reservoir 136.

One of the many advantages of using a stimulus indicating device 100 that provides for or allows for a time function is that it eliminates the possibility for false indications of exposure. For example, a vaccine may spoil at 1° C. (the predetermined stimulus). However, the vaccine may only spoil if the exposure lasts three or more hours. If an indication is presented by a given stimulus indicating device prior to that three hour mark, it is properly termed a false positive or a false indication of exposure, because the vaccine had in fact not spoiled as a result of the exposure to the temperature of 1° C. Thus, it is useful that the stimulus indicating device 100 not display to the user an indication of exposure to the predetermined stimulus unless both the exposure to the predetermined stimulus occurred (by way of example, 1° C. or less), and that exposure occurred for the predetermined amount of time (by way of example, three or more hours). By way of example, if the time function and the predetermined stimulus of the stimulus indicating device are set for three hours of exposure to 1° C. or colder, respectively, the stimulus indicating devices 100 and 200 may not provide a permanent indication of exposure if that predetermined stimulus only lasted ninety minutes.

It should be appreciated, that the stimulus sensitive solutions 110 and 120 do not have to completely color or dye the portion of porous polymer membrane strip 114 underneath the viewing window 122 in order to perform the intent of the present inventions (i.e., provide the indication of exposure). Instead, if even a portion of the porous polymer membrane 114 under the window portion 122 appears colored or dyed to the end user through the window 122, it is enough to signal to the user that the product attached to the stimulus indicating device 100 had been exposed to a potentially harmful stimulus.

In regard to some embodiments of the stimulus indicating device 100 discussed herein being "irreversible" or "permanent" what is meant is that once the stimulus indicating device 100 provides an indication of exposure to an adverse stimulus extreme (which is also referred to herein as a predetermined stimulus), that indication of exposure does not change, even though the adverse stimulus extreme or predetermined stimulus might be removed in the future.

The porous polymer membrane strip 114 can be made of any of several porous materials that allow wicking of the liquid stimulus sensitive solution in its liquid state 120. The materials that can be used to construct the porous polymer membrane strip 114 may include synthetic polymer paper, cellulose paper or cellulose filters paper, and polyester filter paper. The polyester filter paper may be 50 to 150 micrometers in thickness and may have a pore size of 20 to 50 micrometers. Also, this polyester paper may be made from fibers of polyester, and as a result of the manufacturing process, the polyester fibers making up the filter paper are on average oriented along one of the axis of the sheet. In the stimulus indicating device 100, the fibers in the filter paper may be oriented parallel to the long axis of the porous polymer membrane strip 114 from the second end 134 to the first end 132 of the assembly 150 or orthogonally to the long axis or in any orientation in between these two. The wicking of the liquid stimulus sensitive solution in its liquid state 120 is fastest when the fibers of the porous polymer membrane strip 114 are oriented parallel to the long axis of the porous polymer membrane strip 114 and slowest when the fibers are oriented orthogonally to the long axis of the porous polymer membrane 114, and the rate of wicking is in between the fastest and slowest when an orientation is chosen between parallel and orthogonal orientation. In some aspects, if all other parameters of the stimulus indicating device 100 remain equal, changing the orientation of the fibers in the filter paper may result in a different wicking rate and therefore a different indication time of the stimulus indicating device 100. While the porous polymer membrane strip 114 may be constructed of several materials, the porous polymer membrane strip 114 may be made from polyester, and may be constructed similarly to polyester filter paper such as UT-300 that can be purchased from Midwest Filtration LLC (Cincinnati, Ohio).

Both the top layer 116 and the bottom layer 112 of the stimulus indicating device 100 may be constructed of a strong, resilient leak-proof material, such as plastic or other polymer material, so as to provide for the twisting or bending that might occur during transportation of or application to the stimulus sensitive device 100 without tearing, breaking or leaking. Similarly, the pouch 128 may be constructed of any of a number of materials that have a high vapor retention including polyolefins such as polyethylene and polypropylene, cyclic olefin copolymers (COCs) such as those included in the TOPAS® COC family of resins manufactured by TOPAS Inc., film laminates containing a film of poly(vinylidene chloride) such as those sold by Teknifilms, and alumina filled polyester films such as TPF-0599B sold by Oliver Tolas.

All embodiments discussed herein of the stimulus indicating device 100 containing the stimulus sensitive solution in its gel state 110 and its liquid state 120 may be based on any type of stimulus sensitive solution that undergoes a phase transition upon exposure of the stimulus sensitive solution to a predetermined stimulus. The types of stimulus sensitive solutions may include: solutions that exhibit transitions between gel state and liquid state upon both heating above a transition temperature and cooling below a transition temperature, such as solutions of poloxamers in water; solutions that exhibit transitions between gel state and liquid state upon cooling; and solutions that exhibit transitions between gel state and liquid state upon heating.

Solutions of molecules that exhibit transitions between the gel and liquid both upon heating past a transition temperature and cooling below a transition temperature include solutions of poloxamers in water and solutions of copolymers of ethylene glycol and n-isopropylacrylamide. Solutions of molecules that exhibit transitions between the gel and liquid upon cooling below a trigger temperature include solutions of alkylcelluloses in water. Also, solutions of molecules that exhibit transitions between the gel state and liquid state upon heating past a transition temperature include solutions of molecules that undergo helix to coil transitions such as solutions of carrageenan in water.

As one of ordinary skill in the art may appreciate, the mechanism behind the ability of stimulus sensitive solutions made by combining poloxamers, alkylcelluloses or block copolymers of n-isopropylacrylamide and ethylene glycol in water, is the hydrophobic effect. In general, the common feature between these different stimulus sensitive solutions that transition between its gel and liquid states as a result of the hydrophobic effect is that they are formed from amphiphilic molecules that contain both hydrophobic and hydrophilic portions. These molecules typically aggregate and form supramolecular structures such as micelles in which the hydrophobic portions are organized into the core of the micelle and the hydrophilic portions organize on the outside of the micelle and help solubilize the hydrophobic portions. The water molecules typically form cage-like structures around the hydrophobic portions that solubilize the hydrophobic portions in water. When the water cage is disrupted, the hydrophobic portions aggregate much more strongly leading to exclusion of water and the stimulus sensitive solution turning into its gel state (this is the hydrophobic effect). Typically, stimulus sensitive solutions that transition between a gel state and a liquid state as a result of the hydrophobic effect undergo a gel to liquid transition as a result of cooling the temperature of the stimulus sensitive solution below a predetermined temperature and in the case of stimulus sensitive poloxamer solutions the hydrophobic effect leads to both gel to liquid transitions as a function of heating and cooling.

One of ordinary skill in the art will understand that although the stimulus sensitive solution 110 and 120 discussed herein in regard to certain of embodiments of the stimulus indicating device 100 may be of the type that transitions from a gel state to a liquid state as a result of the hydrophobic effect, the range and scope of the embodiments includes and envisions the type that transitions from a gel state to a liquid state as a result of a transition in the molecules between coil and globule. Moreover, all the variations of the different embodiments discussed herein can be combined with the variations of other embodiments described herein and that are known in the art, as would be understood to one of ordinary skill in the art.

If the stimulus sensitive solution 110 and 120 employed in certain embodiments of the stimulus indicating device 100 discussed herein were of the type that transitions between the gel state and liquid state both upon cooling below a transition temperature and heating beyond a transition temperature, it can be any number of stimulus sensitive gels, including poloxamer solutions. Poloxamer molecules contain Poly(ethylene oxide) as the hydrophilic region and Poly(propylene oxide) as the hydrophobic region. As described in Paschalis Alexandridis and T. Alan Hatton, "Poly(ethylene oxide)-Poly(propylene oxide)-Poly(ethylene oxide) Block Copolymer Surfactants in Aqueous Solutions and at Interfaces: Thermodynamics, Structure, Dynamics, and Modeling", Colloids and Surface A: Physicochemical and Engineering Aspects, Volume 96, at Pages 1-46 (1995), in regard to stimulus sensitive poloxamer solutions, the predetermined stimuli, such as the temperatures at which a stimulus sensitive gel 110 and 120 undergoes its transition from a gel state to a liquid state, both upon heating and cooling, can be "tuned" to a particular value by changing the type and concentration of poloxamer, adding salts such as sodium chloride and buffering agents such as phosphate salts.

Alternatively, if the stimulus sensitive solution 110 and 120 employed in all the embodiments of the stimulus indicating device 100 discussed herein were of the type that transitions between a gel state to a liquid state as a result of cooling below a transition temperature, it can also include solutions of alkylcellulose polymers in water. Alkylcellulose molecules contain cellulose as the hydrophilic portion and the alkyl substituent is the hydrophobic portion. One example of an alkylcellulose molecule that transitions as a result of the hydrophobic effect is methyl cellulose. As described in Lin Li, "Thermal Gelation of Methylcellulose in Water: Scaling and Thermodynamics", Macromolecules at Volume 35, pages 5990-5998 (2002), and Kazuto Kobayashi et al., "Thermoreversible Gelation of Aqueous Methylcellulose Solutions", Macromolecules at Volume 32, pages 7070-7077 (1999), in regard to methylcellulose stimulus sensitive solutions, the predetermined stimulus, such as temperature at which a stimulus sensitive gel 110 and 120 undergoes its gel state to a liquid state transition, can be "tuned" to a particular value by changing the methylation percentage of the cellulose, the molecular weight of the methylcellulose and by adding salts such as sodium chloride or other electrolytes.

Alternatively, if the stimulus sensitive solution 110 and 120 employed in all the embodiments of the stimulus indicating device 100 discussed herein were of the type that transitions between a gel state to a liquid state as a result of cooling below a trigger temperature, it can also include solutions of a block copolymer of poly(alkylacrylamide)-block-poly(ethylene glycol) and their derivatives in water. These molecules include the poly(alkylacrylamide) block and its derivatives as the hydrophobic portion and the poly(ethylene glycol) as the hydrophilic portion. One example of this type of molecule that forms stimulus sensitive solutions that transition between its liquid state and its gel state as a result of the hydrophobic effect is poly(n-isopropylacrylamide-co-butyl methacrylate)-block-poly(ethylene glycol). As described in Hiroshi Yoshioka et al., "A Synthetic Hydrogel with Thermoreversible Gelation. I. Preparation and Rheological Properties", Journal of Macromolecules Science Part A, Volume 31, pages 113-120 (1994), in regard to poly(n-isopropylacrylamide-co-butyl methacrylate)-block-poly(ethylene glycol) stimulus sensitive solutions, the predetermined stimulus, such as temperature at which a stimulus sensitive gel 110 and 120 undergoes its gel state to a liquid state transition, can be "tuned" to a particular value by changing the molecular weight and concentration of both the poly(n-isopropylacrylamide-co-butyl methacrylate) and the poly(ethylene glycol) blocks, and by adding salts such as sodium chloride or other electrolytes.

Alternatively, the stimulus sensitive solution 110 and 120 employed in all the embodiments of the stimulus indicating device 100 discussed herein were of the type that transitions as a result of heating beyond a transition temperature, it can include solutions of carrageenan in water. As described in Sijun Liu et al., "Thermoreversible Gelation and Viscoelasticity of k-Carrageenan Hydrogels", Journal of Rheology at Volume 60, pages 203-214 (2016), in regard to carrageenan stimulus sensitive solutions, the predetermined stimulus, such as temperature at which a stimulus sensitive gel 110 and 120 undergoes its gel state to a liquid state transition, can be "tuned" to a particular value by changing the concentration of carrageenan in solution and adding salts such as calcium chloride and sodium chloride, the effect on the transition temperature being different depending on whether the salt added is monovalent or divalent.

Regardless of whether a stimulus sensitive solution exhibits transitions between its gel state and its liquid state upon both heating above a transition temperature and cooling below a transition temperature, exhibits transitions between gel state and liquid state upon cooling, or exhibits transitions between gel state and liquid state upon heating, in some embodiments, the viscosity of the liquid stimulus sensitive solution may be tailored to the application in which the stimulus sensitive indicator 100 is being used. For example, for a given porous polymer membrane strip 114 and a fixed distance between the solution reservoir 136 and window portion 122, the viscosity of the liquid stimulus sensitive solution 120 may be of a certain value such that it may wick through the porous polymer membrane strip 114 and color or dye the portion of the porous polymer membrane strip 114 that is underneath the window 122.

More particularly, in conjunction with FIG. 1A, FIG. 1B, FIG. 1C, and FIG. 1D, by coloring the stimulus sensitive solution 110 and 120 a different color than the porous polymer membrane strip 114 and the same color as the indicator spot, if used, such that when the stimulus sensitive poloxamer solution in its gel state 110 is exposed to the predetermined stimulus and turns into its liquid state 120, which then wicks through the runway 137 and results in coloring or dyeing the porous polymer membrane strip 114 under the window 122, and if an indicator spot is used, that colored or dyed stimulus sensitive poloxamer solution in its liquid state 120 hides the indicator spot from the view of the user through the window 122. By way of example, the stimulus sensitive poloxamer solution 110 and 120 may contain a suitable dye or color additive such as red. When that red colored stimulus sensitive poloxamer solution in its liquid state 120 wicks through the porous polymer membrane strip 114 and colors or dyes the porous polymer membrane strip 114 section under the window 122 and hides the indicator spot (if used) from the view of the user, it informs the user (perhaps in conjunction with a legend or color key) that the product attached to the stimulus indicating device 100 has been exposed to a potentially harmful stimulus.

V. Embodiments Having a Layered Assembly Including a Porous Polymer Membrane Strip and Plastic Layers without a Moisture Barrier Pouch In accordance with the purpose of some embodiments of the disclosure, as embodied and broadly described herein and in conjunction with FIG. 2A, FIG. 2B, FIG. 2C, and FIG. 2D, an embodiment of the stimulus indicating device 200 as described herein is an assembly consisting of a porous polymer membrane strip 214 sandwiched between a top layer 216 and a bottom layer 212. The shapes of the porous polymer membrane 214 and the top 216 and bottom layer 212 may be, for example, rectangular and may or may not be similarly sized, and it should be noted that variations in shape or size are within the scope of the embodiment. The underside 233 of the porous polymer membrane strip 214 is attached, for example in its entirety, to the upper side 239 of the bottom layer 212. The underside 235 of the top layer 216 is attached to the upper side 238 of the porous polymer membrane strip 214 but only in a middle section 231 between the first end 232 and the second end 234 of the porous polymer membrane strip 214 and the top layer 216. The construction of the top layer 216, the porous polymer membrane 214, and the bottom layer 212 as described herein is referred to as the assembly 250.

Two longitudinal seals 226 are made along each of the long edges of the assembly 250 and result in the formation of a solution reservoir 236 which may be formed and located at the second end 234 of the assembly 250 between the top layer 216 and the porous polymer membrane 214, and the formation of an air reservoir 246 formed and located at the first end 232 of the assembly 250 between the top layer 216 and the porous polymer membrane 214. This solution reservoir 236 is initially open at the second end 234 of the assembly 250, which allows stimulus sensitive poloxamer solution in its gel state 210 to be injected into the solution reservoir 236. Once the stimulus sensitive poloxamer solution in its gel state 210 is loaded into the solution reservoir 236, a third seal 241 is made on the width of the second end 234 of the assembly 250, thereby sealing the solution reservoir 236. In contrast to the first embodiment discussed above, which does not contain a seal on the first end 232 of the assembly 250, in this second embodiment a fourth seal 243 is made at the first end 232 of the assembly 250 at the width of the first end 232. A cover 218 that is opaque except for a window 222 is attached to the top layer 216. In contrast to the first embodiment, which includes a pouch, the second embodiment does not employ a pouch, and as such, the construction of the top layer 216, the bottom layer 212, the porous polymer membrane strip 214, the solution reservoir 236, the air reservoir 246, the stimulus sensitive solution in its gel state 210 placed inside the solution reservoir 236, and the cover 218 is referred to herein as the pouchless assembly 250.

The two seals 226 made along the longitudinal edges of the assembly 250 can be created in different manners. For example, if the bottom layer 212 and top layer 216 are sized identically to the porous polymer membrane strip 214, sufficient pressure and temperature are applied along the edge of the porous polymer membrane strip 214 such that the porous structure of the porous polymer membrane strip 214 is melted by the combination of temperature and pressure. In another example, if the bottom layer 212 and top layer 216 are larger than the porous polymer membrane, the two seals 226 along the long edges may be made just outside the porous polymer membrane strip 214 by applying sufficient pressure and temperature to melt the bottom layer 212 to the top layer 216

In an aspect of some embodiments, the seals 226, 241, and 243 seal the stimulus sensitive poloxamer solution in its liquid state 220, impeding the solution from wicking out of the assembly 250 through the longitudinal edges 226 or the seal at the width of the first end 243 or the seal at the width of the second end 241. Also, when creating the seals 226, 241, and 243, no gap, space, or channel is created such that the stimulus sensitive poloxamer solution in its liquid state 220 can wick through said gap, space or channel and avoid wicking through the porous polymer membrane strip 214.

The two seals along the long edges 226 of the assembly 250 in combination with the lower surface 235 of the top layer 216 at its second end 234 not being permanently adhered to the upper surface 239 of the porous polymer membrane strip 214 form an open ended solution reservoir 236 at the second end 234 of the assembly 250. A stimulus sensitive poloxamer solution in its gel state 210, which may be dyed, may then be placed inside the solution reservoir 236 by injecting it through the opening on that second end 234. After placing the stimulus sensitive poloxamer solution 210 into the solution reservoir 236, the solution reservoir 236 is sealed 241 along the width of the outer edge of the second end 234, for example by heat stamping or heat lamination. The assembly 250, once it is created as described above and resulting in the top layer 216 and the bottom layer 212 being adhered to the porous polymer membrane strip 214, and the dyed stimulus sensitive poloxamer solution in its gel state 210 being loaded into the solution reservoir 236, is referred to herein as the loaded assembly 250.

While the loaded assembly 250 is sealed 241 on the second end 234, and along both of the longitudinal edges 226, the first end 232 initially remains open and unsealed at its width 243 so as to allow the stimulus sensitive poloxamer solution in its liquid state 220 to flow through the runway 237, which requires the use of a pouch to prevent the stimulus sensitive poloxamer solution in the solution reservoir (in either its gel state 210 or its liquid state 220) from evaporating. In the second embodiment, the first end 232 of the loaded assembly is sealed 243 along its width so as to prevent circulating air from evaporating the stimulus sensitive poloxamer solution, in either its gel state 210 or its liquid state 220, and thereby eliminates the need for a pouch. However, without wishing to be bound by theory, the stimulus sensitive poloxamer solution in its liquid state 220 is only able to wick through the runway 237 if the stimulus sensitive poloxamer solution in its liquid state 220 is able to push the air that lies in front of it inside the porous polymer membrane strip 214, out of its way and into the first end 232 of the loaded assembly 250. More specifically, in some embodiments, if the stimulus sensitive poloxamer solution in its liquid state 220 is unable to push the air contained in the runway 237 out of the way as the stimulus sensitive poloxamer solution in its liquid stare 220 moves or wicks through the runway 237, the stimulus sensitive poloxamer solution in its liquid state 220 may not be able to move into the window 222 and provide the indication of exposure to a predetermined stimulus. Thus, the assembly 250 may also contain an air reservoir 246 that is, for example, located in the first end 232 of the loaded assembly 250, to absorb the volume of air being pushed out of the way of the stimulus sensitive poloxamer solution in its liquid state 220 as it moves through the runway 237 (which is a section of the porous polymer membrane strip 214 that is formed by being bounded on its outer sides by the two longitudinal edge seals 226, by being bounded on the upper side 239 of the bottom layer 212 being adhered to the underside 233 of the porous polymer membrane strip 214, and being bounded by the upper side 238 of the porous polymer membrane strip 214 at its middle section by it being adhered to just the middle section 231 of the underside 235 of middle section of the top layer 216), and so the air reservoir 246 is formed in that first end 232 of the loaded assembly 250. As one of ordinary skill in the art can appreciate, the air reservoir 246 can be formed by thermoforming the top layer 216 so that there is a bubble formed on the first side of the top layer 216, in which the top of the bubble is positioned away from the porous polymer membrane strip 214, or the air reservoir 246 can be injected with air so as to stretch the size of the air reservoir 246, or the top layer 216 can be left as described above and the air reservoir 246 is formed by the two longitudinal seals 226, the underside 235 of the middle section 231 of the top layer 216, and the upper side 239 of the middle section 231 of the micro porous polymer strip 214. The air reservoir 246 is then sealed along the width of the first end 232, in which the seal 243 is preferably made by heat stamping or heat lamination as described herein. The sealing of the air reservoir has the benefit of helping prevent the stimulus sensitive poloxamer solution from being evaporated by circulating air, and eliminating the need for the moisture retention pouch.

The cover 218 may be formed by applying an opaque layer, such as paint or ink, to most of the upper or lower surface of the top layer 216, while leaving a portion of the top layer 216 free from paint or ink, so as to form the window 222. Alternately, the cover 218 may be constructed of a separate plastic sheet that has a window 222 formed from paint or ink and that is then adhered to the top layer 216. Alternately, the cover 218 can also be formed as a label which has a portion cut out to form the window 222, in which the label can be glued to the upper side 217 of the top layer 216. The window 222 in the cover 218 may remain free from ink or coloring so that the user of the stimulus indicating device may observe or view the inside of the assembly through the window 222 as explained herein. The cover 218 is placed in such a manner that the window 222 is located above the first end 232 of the assembly 250, and since the window 222 is transparent or clear, a portion of porous polymer membrane strip 214, or more particularly the runway 237 is visible to the end user through the window 222.

The embodiment of the stimulus indicating device prior to exposure to the predetermined stimulus is illustrated by FIG. 2A and FIG. 2B. As shown in at least FIG. 2A and FIG. 2B, prior to being exposed to a predetermined trigger stimulus, the stimulus sensitive poloxamer solution in its gel state 210 has not yet undergone a phase transition to reach its liquid state 220 and wick through the runway 237 section of the porous polymer membrane strip 214, and thus the section of the runway 237 section of the porous polymer membrane 214 directly under the window 222 has not been colored or dyed by the stimulus sensitive solution 210 and 220 and so the end user sees the undyed or uncolored porous polymer membrane strip 242.

As illustrated by FIG. 2C and FIG. 2D, after exposure to the predetermined stimulus, the stimulus sensitive poloxamer solution in its gel state 210 of FIG. 2A and FIG. 2B undergoes its phase transition and turns into its liquid state 220. After exposure to the predetermined stimulus, which, by way of example only, can be the temperature of 2° C., as shown in FIG. 2C and FIG. 2D, the stimulus sensitive poloxamer solution in its gel state 210 transitions to the stimulus sensitive poloxamer solution in its liquid state 220 and wicks away from the solution reservoir 236 positioned on the second side 234 of the porous polymer membrane strip 214 towards the window portion 222 on the first end 232 of the stimulus indicating device 200. As the stimulus sensitive poloxamer solution in its liquid state 220 continues to wick through the runway 237 section of the porous polymer membrane strip 214 in response to the predetermined stimulus, it reaches and wicks into and at least partially colors, and, if required so as to achieve the predetermined amount of time to provide required indication of exposure, fully colors the porous polymer membrane strip 214 located under the window 222, so as to provide the indication of exposure to the predetermined stimulus. This indication of exposure appears to the end user as a colored or dyed porous polymer membrane strip 244 through the window 222 because the remainder of the porous polymer membrane strip 214 and the remainder of the top layer 216 are covered completely by the cover 218 of the device 200, and as described herein, except for the window 222 the cover 218 is completely opaque. Alternatively, a symbol or indicating spot may be printed on the portion of porous polymer membrane strip 214 visible through the window 222. In response to the predetermined stimulus, the stimulus sensitive poloxamer solution in its gel state 210 turns into the liquid state 220 and wicks and reaches into and at least partially colors or fully colors the porous polymer membrane strip 214 located under the window 222, thus hiding the symbol or indicator spot printed on the porous polymer membrane strip 214, so as to provide the indication of exposure to the predetermined stimulus. By way of example, the indication of exposure can take the form of the end user viewing through the window 222 a color change from white to blue, or a change from a "checkmark" or "✓" to completely colored such that the "checkmark" or "✓" can no longer be discerned.

The stimulus sensitive poloxamer solution 210 and 220, employed by the variations of this embodiment, as shown in FIG. 2A, FIG. 2B, FIG. 2C, and FIG. 2D, may be manufactured so as to contain a dye or colorant that is different from the color of the porous polymer membrane strip 214. Alternatively, if an indicator spot is printed on the porous polymer membrane strip 214 that is visible through the window 222, the stimulus sensitive solution 210 and 220 may be manufactured so as to contain a dye or colorant that is the same as or significantly darker than the indicator spot. In this way the color of the stimulus sensitive solution 210 and 220 in both its gel and liquid state is different from the color of the porous polymer membrane 214 and is the same as or darker than the indicator spot. When the stimulus sensitive poloxamer solution in its gel state 210 turns into its liquid state 220 in response to the predetermined stimulus, and after a predetermined amount of time, the wicking of the liquid 220 through the porous polymer membrane strip 214 may result in the stimulus indicating device 200 providing the indication of exposure by changing, even at least partially, from a first color to a second color, in which the color change is permanently visible to the user of the stimulus indicating device 200 through the indicator window 222.

The objective of permanently adhering the upper side 239 of the bottom layer 212 to the underside 233 of the porous polymer membrane strip 214, and of permanently adhering a portion of the lower side 235 of the top layer 216 to the upper side 235 of the porous polymer membrane strip 214 is to force the stimulus sensitive poloxamer solution in its liquid state 220 to wick through the porous polymer membrane strip 214. The stimulus sensitive poloxamer solution in its liquid state 220 readily wicks through any small gap, channel or space between the layers. For this reason, the adhesion of the top layer 216 and the adhesion of the bottom layer 212 to the porous polymer membrane strip 214 as taught herein is complete so that there are no small gaps. The wicking of the stimulus sensitive poloxamer solution in its liquid state 220, and therefore the temperature and indication time of the stimulus indicating device 200, is consistent among indicators of the same batch when it occurs through the porous polymer membrane strip 214, but may be inconsistent among indicators of the same batch when it occurs through small gaps or space between the layers, thus the desire to eliminate such gaps, channels or spaces.

As discussed herein, by manipulating and/or varying the distance between the window portion 222 and the reservoir 236, the "time function" can be calculated. More specifically, the time function determines the amount of time required for the stimulus sensitive poloxamer solution in its gel state 210 to transition to its liquid state 220 and wick far enough through the porous polymer membrane strip 214 so that it wicks into and colors the section of porous polymer membrane strip 214 beneath the viewing window 222. As discussed herein, an indicator device 200 can be manufactured so as to not provide an indication of exposure (i.e., not completely or even partially color or dye the porous polymer membrane strip 214 underneath the window portion 222) until only after a predetermined amount of time had passed, in which the predetermined amount of time equals the amount of time required for the stimulus sensitive poloxamer solution in its gel state 210 to first transition to the stimulus sensitive poloxamer solution in its liquid state 220, and then wick into and color or dye the porous polymer membrane strip 214 underneath the viewing window 222.

Such manipulation of the distance between the window portion 222 and the reservoir 236 includes moving the window portion 222 farther away from or nearer to the solution reservoir 236.

One of the many advantages of using a stimulus indicating device 200 that provides for or allows for a time function is that it eliminates the possibility for false indications of exposure. For example, a vaccine may spoil at 1° C. (the predetermined stimulus). But that vaccine may only spoil if the exposure lasts three or more hours. If an indication is presented by a given stimulus indicating device prior to that three hour mark, it is properly termed a false positive or a false indication of exposure, because the vaccine had in fact not spoiled as a result of the exposure to the temperature of 1° C. Thus, it is useful that the stimulus indicating device 200 not display to the user an indication of exposure to the predetermined stimulus unless both the exposure to the predetermined stimulus occurred (by way of example, 1° C. or less), and that exposure occurred for the predetermined amount of time (by way of example, three or more hours). By way of example, if the time function and the predetermined stimulus of the stimulus indicating device are set for three hours of exposure to 1° C. or colder, respectively, the stimulus indicating device 200 discussed herein may not provide a permanent indication of exposure if that predetermined stimulus only lasted ninety minutes.

It should be appreciated, that the stimulus sensitive solutions 210 and 220 may not have to completely color or dye the portion of porous polymer membrane strip 214 underneath the viewing window 222 in order to perform the intent of the present inventions (i.e., provide the indication of exposure). Instead, if even a portion of the porous polymer membrane 214 under the window portion 222 appears colored or dyed to the end user through the window 222, it may be enough to signal to the user that the product attached to the stimulus indicating device 200 had been exposed to a potentially harmful stimulus.

In regard to some of embodiments of the stimulus indicating device 200 discussed herein being "irreversible" or "permanent" what is meant is that once the stimulus indicating device 200 provides an indication of exposure to an adverse stimulus extreme (which is also referred to herein as a predetermined stimulus), that indication of exposure does not change, even though the adverse stimulus extreme or predetermined stimulus might be removed in the future.

The porous polymer membrane strip 214 can be made of any of several porous materials that allow wicking of the liquid stimulus sensitive solution in its liquid state 220. The materials that can be used to construct the porous polymer membrane strip 214 may include synthetic polymer paper, cellulose paper or cellulose filters paper, and polyester filter paper. The polyester filter paper may be 50 to 250 micrometers in thickness and has a pore size of 20 to 50 micrometers. Also, this polyester paper may be made from fibers of polyester and as a result of the manufacturing process the polyester fibers making up the filter paper are on average oriented along one of the axis of the sheet. In the stimulus indicating device 200, the fibers in the filter paper may be oriented parallel to the long axis of the porous polymer membrane strip 214 from the second end 234 to the first end 232 of the assembly 250 or orthogonally to the long axis or in any orientation in between these two. The wicking of the liquid stimulus sensitive solution in its liquid state 220 is fastest when the fibers of the porous polymer membrane strip 214 are oriented parallel to the long axis of the porous polymer membrane strip 214 and slowest when the fibers are oriented orthogonally to the long axis of the porous polymer membrane 214. The rate of wicking is in between the fastest and slowest when an orientation is chosen between parallel and orthogonal orientation. All other parameters of the stimulus indicating device 200 remaining equal, changing the orientation of the fibers in the filter paper may result in a different wicking rate and therefore a different indication time of the stimulus indicating device 200. While the porous polymer membrane strip 214 can be constructed of several materials, the porous polymer membrane strip 214 may be made from polyester, and may be constructed similarly to polyester filter paper such as UT-300 that can be purchased from Midwest Filtration LLC (Cincinnati, Ohio).

Both the top layer 216 and the bottom layer 212 of the stimulus indicating device 200 may be constructed of a strong, resilient leak-proof material, such as plastic or other polymer material, so as to provide for the twisting or bending that might occur during transportation of or application to the stimulus sensitive device 200 without tearing, breaking or leaking. Moreover, the top layer 216 and the bottom layer 212 may be constructed of any of a number of materials that have a high vapor retention including polyolefins such as polyethylene and polypropylene, cyclic olefin copolymers (COCs) such as those included in the TOPAS® COC family of resins manufactured by TOPAS Inc., film laminates containing a film of poly(vinylidene chloride) such as those sold by Teknifilms, and alumina filled polyester films such as TPF-0599B sold by Oliver Tolas, so as to reduce or eliminate moisture loss by the stimulus sensitive device 300 given this embodiment of the stimulus sensitive device 200 does not contain a pouch as does the first embodiment described above.

All embodiments discussed herein of the stimulus indicating device 200 containing the stimulus sensitive solution in its gel state 210 and its liquid state 220 may be based on any type of stimulus sensitive solution that undergoes a phase transition upon exposure of the stimulus sensitive solution to a predetermined stimulus. The types of stimulus sensitive solutions may include: solutions that exhibit transitions between gel state and liquid state upon both heating above a transition temperature and cooling below a transition temperature, such as solutions of poloxamers in water; solutions that exhibit transitions between gel state and liquid state upon cooling; and solutions that exhibit transitions between gel state and liquid state upon heating.

Solutions of molecules that exhibit transitions between the gel and liquid both upon heating past a transition temperature and cooling below a transition temperature include solutions of poloxamers in water and solutions of copolymers of ethylene glycol and n-isopropylacrylamide. Solutions of molecules that exhibit transitions between the gel and liquid upon cooling below a trigger temperature include solutions of alkylcelluloses in water. Also, solutions of molecules that exhibit transitions between the gel state and liquid state upon heating past a transition temperature include solutions of molecules that undergo helix to coil transitions such as solutions of carrageenan in water.

As one of ordinary skill in the art may appreciate, the mechanism behind the ability of stimulus sensitive solutions made by combining poloxamers, alkylcelluloses or block copolymers of n-isopropylacrylamide and ethylene glycol in water, is the hydrophobic effect. In general, the common feature between these different stimulus sensitive solutions that transition between its gel and liquid states as a result of the hydrophobic effect is that they are formed from amphiphilic molecules that contain both hydrophobic and hydrophilic portions. These molecules typically aggregate and form supramolecular structures such as micelles in which the hydrophobic portions are organized into the core of the micelle and the hydrophilic portions organize on the outside of the micelle and help solubilize the hydrophobic portions. The water molecules typically form cage-like structures around the hydrophobic portions that solubilize the hydrophobic portions in water. When the water cage is disrupted, the hydrophobic portions aggregate much more strongly leading to exclusion of water and the stimulus sensitive solution turning into its gel state (this is the hydrophobic effect). Typically, stimulus sensitive solutions that transition between a gel state and a liquid state as a result of the hydrophobic effect undergo a gel to liquid transition as a result of cooling the temperature of the stimulus sensitive solution below a predetermined temperature and in the case of stimulus sensitive poloxamer solutions the hydrophobic effect leads to both gel to liquid transitions as a function of heating and cooling.

One of ordinary skill in the art may understand that although the stimulus sensitive solution 210 and 220 discussed herein in regard to some of embodiments of the stimulus indicating device 200 may be of the type that transitions from a gel state to a liquid state as a result of the hydrophobic effect, the range and scope of this invention includes and envisions the type that transitions from a gel state to a liquid state as a result of a transition in the molecules between coil and globule. Moreover, all the variations of the different embodiments discussed herein can be combined with the variations of other embodiments described herein and that are known in the art, as would be understood to one of ordinary skill in the art.

If the stimulus sensitive solution 210 and 220 employed in all the embodiments of the stimulus indicating device 200 discussed herein were of the type that transitions between the gel state and liquid state both upon cooling below a transition temperature and heating beyond a transition temperature, it can be any number of stimulus sensitive gels, including poloxamer solutions. Poloxamer molecules contain Poly(ethylene oxide) as the hydrophilic region and Poly(propylene oxide) as the hydrophobic region. As described in Paschalis Alexandridis and T. Alan Hatton, "Poly(ethylene oxide)-Poly(propylene oxide)-Poly(ethylene oxide) Block Copolymer Surfactants in Aqueous Solutions and at Interfaces: Thermodynamics, Structure, Dynamics, and Modeling", Colloids and Surface A: Physicochemical and Engineering Aspects, Volume 96, at Pages 1-46 (1995), in regard to stimulus sensitive poloxamer solutions, the predetermined stimuli, such as the temperatures at which a stimulus sensitive gel 210 and 220 undergoes its transition from a gel state to a liquid state, both upon heating and cooling, can be "tuned" to a particular value by changing the type and concentration of poloxamer, adding salts such as sodium chloride and buffering agents such as phosphate salts.

Alternatively, if the stimulus sensitive solution 210 and 220 employed in all the embodiments of the stimulus indicating device 200 discussed herein were of the type that transitions between a gel state to a liquid state as a result of cooling below a transition temperature, the solution can also include solutions of alkylcellulose polymers in water. Alkylcellulose molecules contain cellulose as the hydrophilic portion and the alkyl substituent is the hydrophobic portion. One example of an alkylcellulose molecule that transitions as a result of the hydrophobic effect is methyl cellulose. As described in Lin Li, "Thermal Gelation of Methylcellulose in Water: Scaling and Thermodynamics", Macromolecules at Volume 35, pages 5990-5998 (2002), and Kazuto Kobayashi et al., "Thermoreversible Gelation of Aqueous Methylcellulose Solutions", Macromolecules at Volume 32, pages 7070-7077 (1999), in regard to methylcellulose stimulus sensitive solutions, the predetermined stimulus, such as temperature at which a stimulus sensitive gel 210 and 220 undergoes its gel state to a liquid state transition, can be "tuned" to a particular value by changing the methylation percentage of the cellulose, the molecular weight of the methylcellulose and by adding salts such as sodium chloride or other electrolytes.

Alternatively, if the stimulus sensitive solution 210 and 220 employed in all the embodiments of the stimulus indicating device 200 discussed herein were of the type that transitions between a gel state to a liquid state as a result of cooling below a trigger temperature, the solution can also include solutions of a block copolymer of poly(alkylacrylamide)-block-poly(ethylene glycol) and their derivatives in water. These molecules may include the poly(alkylacrylamide) block and its derivatives as the hydrophobic portion and the poly(ethylene glycol) as the hydrophilic portion. One example of this type of molecule that forms stimulus sensitive solutions that transition between its liquid state and its gel state as a result of the hydrophobic effect is poly(n-isopropylacrylamide-co-butyl methacrylate)-block-poly(ethylene glycol). As described in Hiroshi Yoshioka et al., "A Synthetic Hydrogel with Thermoreversible Gelation. I. Preparation and Rheological Properties", Journal of Macromolecules Science Part A, Volume 31, pages 113-220 (1994), in regard to poly(n-isopropylacrylamide-co-butyl methacrylate)-block-poly(ethylene glycol) stimulus sensitive solutions, the predetermined stimulus, such as temperature at which a stimulus sensitive gel 210 and 220 undergoes its gel state to a liquid state transition, can be "tuned" to a particular value by changing the molecular weight and concentration of both the poly(n-isopropylacrylamide-co-butyl methacrylate) and the poly(ethylene glycol) blocks, and by adding salts such as sodium chloride or other electrolytes.

Alternatively, the stimulus sensitive solution 210 and 220 employed in all the embodiments of the stimulus indicating device 200 discussed herein were of the type that transitions as a result of heating beyond a transition temperature, it can include solutions of carrageenan in water. As described in Sijun Liu et al., "Thermoreversible Gelation and Viscoelasticity of k-Carrageenan Hydrogels", Journal of Rheology at Volume 60, pages 203-214 (2016), in regard to carrageenan stimulus sensitive solutions, the predetermined stimulus, such as temperature at which a stimulus sensitive gel 210 and 220 undergoes its gel state to a liquid state transition, can be "tuned" to a particular value by changing the concentration of carrageenan in solution and adding salts such as calcium chloride and sodium chloride, the effect on the transition temperature being different depending on whether the salt added is monovalent or divalent.

Regardless of whether a stimulus sensitive solution exhibits transitions between its gel state and its liquid state upon both heating above a transition temperature and cooling below a transition temperature, exhibits transitions between gel state and liquid state upon cooling, or exhibits transitions between gel state and liquid state upon heating, in some embodiments, the viscosity of the liquid stimulus sensitive solution may be tailored to the application in which the stimulus sensitive indicator 200 is being used. For example, for a given porous polymer membrane strip 214 and a fixed distance between the solution reservoir 236 and window portion 222, it may be required that the viscosity of the liquid stimulus sensitive solution 220 be of a certain value such that it may wick through the porous polymer membrane strip 214 and color or dye the portion of the porous polymer membrane strip 214 that is underneath the window 222.

More particularly, in conjunction with FIG. 2A, FIG. 2B, FIG. 2C, and FIG. 2D, by coloring the stimulus sensitive solution 210 and 220 a different color than the porous polymer membrane strip 214 and the same color as the indicator spot, if used, such that when the stimulus sensitive poloxamer solution in its gel state 210 is exposed to the predetermined stimulus and turns into its liquid state 220, which then wicks through the runway 237 and results in coloring or dyeing the porous polymer membrane strip 214 under the window 222, and if an indicator spot is used, that colored or dyed stimulus sensitive poloxamer solution in its liquid state 220 hides the indicator spot from the view of the user through the window 222. By way of example, the stimulus sensitive poloxamer solution 210 and 220 may contain a suitable dye or color additive such as red. When that red colored stimulus sensitive poloxamer solution in its liquid state 220 wicks through the porous polymer membrane strip 214 and colors or dyes the porous polymer membrane strip 214 section under the window 222 and hides the indicator spot (if used) from the view of the user, it informs the user (perhaps in conjunction with a legend or color key) that the product attached to the stimulus indicating device 200 has been exposed to a potentially harmful stimulus.

The transition temperature of stimulus sensitive poloxamer solutions 210 can be highly dependent upon the concentration of the poloxamer in the solution. Changes in the moisture content of a given stimulus sensitive poloxamer solutions 210 can impact the temperature at which the given stimulus sensitive poloxamer solutions 210 can transition from gel 210 to liquid 220. Typically, the shift in transition temperature is toward lower temperatures. On account of this property, control of the humidity within the stimulus indicating device 200 can achieve optimal functioning of the stimulus indicating device 200. In particular, for some embodiments, as the stimulus sensitive poloxamer solution in its liquid state 220 travels through the runway 237, the solution may become more sensitive to moisture loss through the combination of: increased surface area on the air-stimulus sensitive poloxamer solution 220 interface; and the inability to replenish moisture loss at the surface due to the distance from the main pocket of stimulus sensitive poloxamer solution 220 in the device.

As a result, by not controlling the humidity within the stimulus indicating device 200, for some embodiments, the air-stimulus sensitive poloxamer solution 220 interface may lose moisture and experience a local increase in poloxamer concentration. This local concentration increase may lead to a decrease in the transition temperature of the stimulus indicating device 200, which can ultimately lead to the stimulus indicating device 200 providing the user with inaccurate indications of exposure or non-exposure. In the case that a cooling event occurs, ceases for some period of time, and is followed by a subsequent cooling event, the air-stimulus sensitive poloxamer solution 220 interface may form a film of lower melting temperature poloxamer (relative to the rest of the poloxamer solution in the device), which may impact the temperature at which the stimulus indicating poloxamer solution 210 would transition from gel to liquid 220. In such an instance, a repeated exposure to cooling events interspersed with warming events, may not be captured by the stimulus indicating device 200. To prevent this malfunction of the stimulus indicating device 200, one can supply a reservoir of moisture 267 within the stimulus indicating device 200 to maintain high enough humidity to prevent the low-melting temperature film formation mentioned above. This moisture reservoir 267 can be positioned at the end of the stimulus indicating device 200 opposite the solution reservoir 236 containing the stimulus sensitive poloxamer solution 210.

A stimulus indicating device 200 may undergo exposure to external conditions that may stimulate its transition from its gel state 210 to its liquid state 220 prior to its commercial use during transit or storage. Such false triggering, in some embodiments, makes the indicator useless and in some cases may even confuse the end user to the point of falsely concluding that a product is compromised by a temperature excursion. To avoid triggering of the stimulus indicating device 200 in advance of its commercial use, another embodiment of the disclosure, as shown in FIG. 2E, features an "inactivated state" reservoir 278 in which the stimulus sensitive poloxamer solution 210 can remain without contacting the runway 237 until the user deliberately applies force to the inactivated state reservoir 278 to break its frangible seal 279. The frangible seal 279 exists between the inactivated state reservoir 278 and the solution reservoir 236, where the stimulus sensitive poloxamer solution in its liquid state 220 makes contact with the runway 237. After breaking the frangible seal 279, the stimulus sensitive poloxamer solution in its liquid state 220 moves from the inactivated state reservoir 278 to the solution reservoir 236, and the stimulus sensitive poloxamer solution in its liquid state 220 makes contact with the runway 237 and wicking may commence upon exposure to a cooling event and the resulting transition of the stimulus sensitive poloxamer solution from its gel state 210 to its liquid state 220. There are several key parameters to achieve effective designs, in some embodiments, of the inactivated state reservoir 278 and frangible seal 279. The frangible seal 279 may be on one side of the solution reservoir 236 to facilitate flow of the stimulus sensitive poloxamer solution in its liquid state 220 in the direction of the frangible seal 279. Also, the stimulus sensitive poloxamer solution in its gel state 210 may be expelled from the inactivated state reservoir 278 so as to irreversibly collapse the inactivated state reservoir 278. Failure to fully expel the stimulus sensitive poloxamer solution in its gel state 210 may decrease the amount of stimulus sensitive poloxamer solution in its gel state 210 that can access the runway 237 and limit the final wicking distance of the stimulus sensitive poloxamer solution in its liquid state 220 through the runway 237. Likewise, failure to collapse the inactivated state reservoir 278 may induce a negative pressure in the inactivated state reservoir 278 that can cause the stimulus sensitive poloxamer solution in its liquid state 220 to resist the capillary wicking action of the runway 237 and may alter the wicking time of the stimulus indicating device 200. To achieve this full expulsion and collapse of the inactivated state reservoir 278, one may, for example, tackify one of the top or bottom walls of the inactivated state reservoir 278 so that the walls can adhere to one another irreversibly when the user applies the force to collapse the inactivated state reservoir 278. In another embodiment, one may apply an adhesive to the outside of the stimulus indicating device 200 such that the inactivated state reservoir 278 can be folded over and adhered to another part of the stimulus indicating device 200. The tension generated in the stimulus indicating device 200 may maintain the collapsed form of the inactivated state reservoir 278.

Figure 2F:
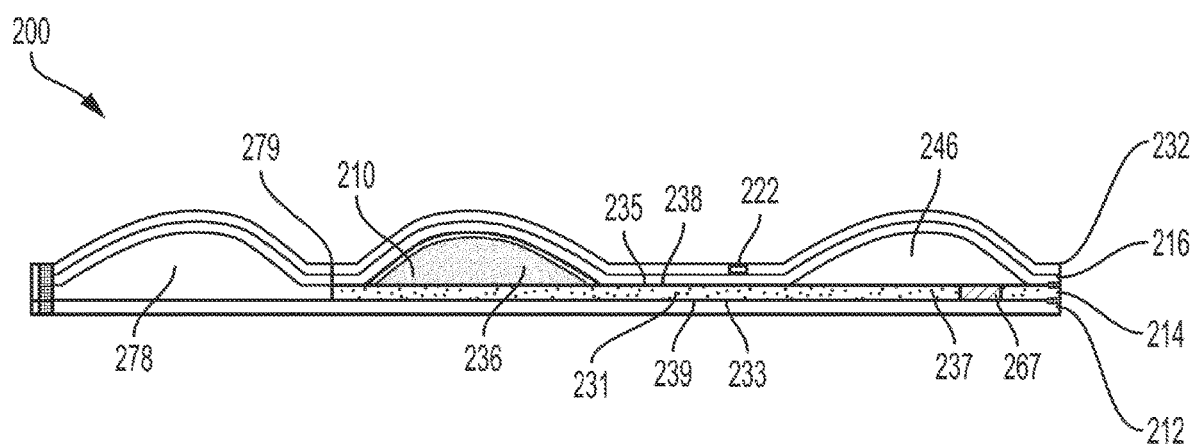

As discussed herein in regard to the air reservoir 336, the air contained in the runway 237 of the stimulus indicating device 200 may be allowed to move out of the runway 237 as the stimulus sensitive poloxamer solution in its liquid state 220 moves through the runway 237 because otherwise the stimulus sensitive poloxamer solution in its liquid state 220 can be prevented from moving through the runway 237 and providing the indication of exposure to a deleterious temperature. So as to allow the movement of the air in the runway 237 as the stimulus sensitive poloxamer solution in its liquid state 220 moves through the runway 237, another embodiment disclosed herein, by way of example, as shown in FIG. 2E, contains a channel 291 through which the air may pass back to solution reservoir 236. In an embodiment, by way of example, the membrane 214 may be of sufficient thickness such that even after heat press or lamination an open channel 291 that spans the edge of the membrane 214 exists. In this embodiment, air may pass back through this channel 291 along the edge of the membrane 214, even as the stimulus sensitive poloxamer solution in its liquid state 220 wicks through the runway 237. In another embodiment, by way of example, a spacer, shown in FIG. 2F, which may be a small tube, a plastic rod, or a sponge through which the stimulus sensitive poloxamer solution in its liquid state 220 may not wick, can be placed in the footprint of the indicator during lamination such that a continuous channel through which air may pass runs from the first end 232 of the runway 237 back to the solution reservoir 236. In each of the above embodiments, it is possible to achieve sealing on all four edges of the indicating device 200 while maintaining the wicking capability of the stimulus sensitive poloxamer solution in its liquid state 220.

VI. Embodiments Having a Layered Assembly Including a Porous Polymer Membrane Strip and Plastic Layers Forming Two Solution Reservoirs without a Moisture Vapor Barrier Pouch In accordance with some embodiments of the disclosure, as embodied and broadly described herein and in conjunction with FIG. 3A, FIG. 3B, FIG. 3C, and FIG. 3D, an embodiment of the stimulus indicating device 300 as described herein is an assembly consisting of a porous polymer membrane strip 314 sandwiched between a top layer 316 and a bottom layer 312. The shapes of the porous polymer membrane strip 314 and the top 316 and bottom layer 312 may be, for example, rectangular and may or may not be similarly sized, and it should be noted that variations in shape or size are within the scope of the embodiment. The underside 333 of the porous polymer membrane strip 314 is attached, for example in its entirety, to the upper side 339 of the bottom layer 312. The underside 335 of the top layer 316 is attached to the upper side 338 of the porous polymer membrane strip 314, in a middle section 331 between the first end 332 and the second end 334 of the porous polymer membrane strip 314 and the top layer 316. A cover 318 that is opaque except for a window 322 is attached to the top layer 316. The construction of the top layer 316 (including the window 322), the porous polymer membrane 314, and the bottom layer 312 as described herein is referred to as the assembly 350.

Two longitudinal seals 326 are made along each of the long edges of the assembly 350 and result in the formation of a solution reservoir 336, which may be formed and located at the second end 334 of the assembly 350 between the top layer 316 and the porous polymer membrane 314, and the formation of an air reservoir 346 may be formed and located at the first end 332 of the assembly 350 between the top layer 316 and the porous polymer membrane strip 314.

Although this third embodiment of the assembly 350 is similar to the assembly of the second embodiment, the two embodiments differ in that the third embodiment of the assembly 350 has an additional center seal 370 that extends longitudinally along the center line of the top layer 316, in which the center seal 370 may start at the first end 332 of the porous polymer membrane strip 314, for example at the seal 343 positioned at the width of first end 332 of the assembly 350, the center seal 370 may continue through the porous polymer membrane strip 314 and ultimately bisect the entire porous polymer membrane strip 314 into a first porous polymer membrane strip 371 and a second porous polymer membrane strip 372. The center seal 370 may extend through the single air reservoir 346 and in doing so would bisect the single air reservoir 346 into a first air reservoir 373 and a second air reservoir 374. The center seal 370 may extend through the window 322 positioned in the middle section 331 of the assembly 350 thereby bisecting the single window 322 into a first window 375 and a second window 376. The center seal 370 may continue through the solution reservoir 336 thereby bisecting the single solution reservoir 336 into a first solution reservoir 377 and a second solution reservoir 378. The center seal 370 may continue to the seal 341 at the width of the second end 334 of the assembly 350.

As with the other seals discussed herein, when applying the longitudinal center seal 370 to the assembly 350 so that it bisects the assembly 350 into two distinct mirror portions, sufficient pressure and temperature are applied so that the longitudinal portion of the top layer 316 melts into the porous polymer membrane strip 314 to such an extent that the porous structure of the porous polymer membrane strip 314 is also melted by the combination of temperature and pressure, so as to form two distinct channels within the assembly 350, in which the first channel 379 in the assembly 350 is comprised the first air reservoir 373, in fluid connection with the corresponding portion of the first porous polymer membrane strip 371, which is then in fluid connection of the corresponding first window 375, which is then in fluid connection with the first solution reservoir 377, and that first channel 379 is sealed by one of the longitudinal edge seals 326, a portion of the seal 343 at the width of the first end of the assembly 350, the single longitudinal center seal 370, and a portion of the seal 341 at the width of the second end of the assembly 350. Similarly, a second channel 380 formed in the assembly 350 is comprised the second air reservoir 374, in fluid connection with the corresponding portion of the second porous polymer membrane strip 372, which is then in fluid connection of the corresponding second window 376, which is then in fluid connection with the second solution reservoir 378, and that second channel 380 is sealed by one of the longitudinal edge seals 326, a portion of the seal 343 at the width of the first end of the assembly 350, the single longitudinal center seal 370, and a portion of the seal 341 at the width of the second end of the assembly 350.

The two solutions reservoirs 377 and 378 allow for two different stimulus sensitive poloxamer solutions in their gel state 305 and 310 to be loaded into the indicator 300, one stimulus sensitive poloxamer solution per reservoir. As a result, when the stimulus sensitive solutions transition to their liquid states 320 and 325, the two channels 370 and 380 allow two separate stimulus sensitive poloxamer solutions once each is in its liquid state 320 and 325, only travel down its corresponding channel (or its runway formed within the porous polymer membrane strip).

One of ordinary skill in the art may appreciate that if a two solution reservoir assembly is constructed, two window portions or indicator windows may be added, one for each channel, but such dual windows are not necessarily needed.

Once constructed, this two channel assembly may be able to indicate exposure to two different transition temperatures.

This first and second solution reservoirs 377 and 378 are initially open at the second end 334 of the assembly 350, which allows stimulus sensitive poloxamer solution in its gel state 305 and 310 to be injected into the each of the solution first and second solution reservoirs 377 and 378, respectively. Once the stimulus sensitive poloxamer solution in its gel state 305 and 310 have been loaded into each of the first and second solution reservoirs 377 and 378, respectively, a third seal 341 is made on the width of the second end 334 of the assembly 350, thereby sealing both of the solution reservoirs 377 and 378. In contrast to the first embodiment discussed above which does not contain a seal on the first end 332 of the assembly 350, in this third embodiment a fourth seal 343 is made at the first end 332 of the assembly 350, preferably at the width of the first end 332, so as to seal the first air reservoir 373 and the second air reservoir 374. In contrast to the first embodiment which includes a pouch, this second embodiment does not employ a pouch, and as such the construction of the top layer 316, the bottom layer 312, the porous polymer membrane strip 314, the solution reservoirs 377 and 378, the stimulus sensitive solutions in their gel states 305 and 310 placed inside the solution reservoir 377 and 378, and the cover 318 is referred to herein as the pouchless assembly 350.

The two seals 326 made along the longitudinal edges of the assembly 350 and the center seal 370 can be created in different manners. For example, if the bottom layer 312 and top layer 316 are sized identically to the porous polymer membrane strip 314, sufficient pressure and temperature are applied along the edge of the porous polymer membrane strip 314 such that the porous structure of the porous polymer membrane strip 314 is melted by the combination of temperature and pressure. In another example, if the bottom layer 312 and top layer 316 are larger than the porous polymer membrane, the two seals 326 along the long edges may be made just outside the porous polymer membrane strip 314 by applying sufficient pressure and temperature to melt the bottom layer 312 to the top layer 316

In an aspect of some embodiments, the seals 326, 341, 343, and 370 seals the stimulus sensitive poloxamer solution in its liquid state 320 and 325, in which the solution is impeded from wicking out of the assembly 350 through the longitudinal edges 326 or the seal at the width of the first end 343 or the seal at the width of the second end 334 or the center seal 370. Also, when creating these seals, in some embodiments, no gap, space, or channel is created such that the stimulus sensitive poloxamer solutions in their liquid states 320 and 325 can wick through said gap, space or channel and avoid wicking through the porous polymer membrane strip 314.

As discussed above, the two seals along the long edges 326 of the assembly 350 in combination with the lower surface 335 of the top layer 316 at its second end 334 not being permanently adhered to the upper surface 338 of the porous polymer membrane strip 314, in conjunction with the center seal 370, form the two open ended solution reservoirs 377 and 378 at the second end 334 of the assembly 350. The stimulus sensitive poloxamer solutions in their gel state 305 and 310, preferably dyed, may then be placed inside each of the solution reservoirs 377 and 378 by injecting them through the opening on that second end 334. After placing the stimulus sensitive poloxamer solutions 305 and 310 into each of the solution reservoirs 377 and 378, each of the solution reservoirs 377 and 378 are sealed 341 along the width of the outer edge of the second end 334, for example by heat stamping or heat lamination. The assembly 350, once it is created as described above and resulting in the top layer 316 (containing the cover 318) and the bottom layer 312 being adhered to the porous polymer membrane strip 314, and the dyed stimulus sensitive poloxamer solution in its gel state 310 being loaded into each of the solution reservoirs 377 and 378, is referred to herein as the loaded assembly 350.

While the loaded assembly 350 is sealed 341 on the second end 334, and along both of the longitudinal edges 326, as described above the first end 332 initially remains open and unsealed at its width 343 so as to allow the stimulus sensitive poloxamer solutions in their liquid states 320 and 325 to flow through the runway 337, that embodiment requires the use of a pouch to prevent the stimulus sensitive poloxamer solution in the solution reservoirs (in either their gel states 305 and 310 or their liquid states 320 and 325) from evaporating. In this third embodiment, the first end 332 of the loaded assembly 350 is sealed 343 along its width so as to prevent circulating air from evaporating the stimulus sensitive poloxamer solution (in either its gel state 310 or its liquid state 320), and thereby eliminating the need for a pouch. However, the stimulus sensitive poloxamer solution in its liquid state 320 may be only able to wick through each of the channels 379 and 380 if the stimulus sensitive poloxamer solution in its liquid state 320 and 325 is able to push the air that lies in front of it inside its respective porous polymer membrane strip 371 and 372, out of its way and into the first end 332 of the loaded assembly 350. More specifically, if the stimulus sensitive poloxamer solution in its liquid state 320 and 325 is unable to push the air contained in the runway 237 out of the way as the stimulus sensitive poloxamer solution in its liquid stare 320 or 325 moves or wicks through the channels 379 and 380, the stimulus sensitive poloxamer solution in its liquid state 320 or 325 may not be able to move into the corresponding first or second window 375 and 376 and provide the indication of exposure to a predetermined stimulus. The third embodiment of the assembly 350 may also contain a first and second air reservoir 373 and 374 that may be located in the first end 332 of the loaded assembly 350, to absorb the volume of air being pushed out of the way of the stimulus sensitive poloxamer solution in its liquid state 320 or 325 as it moves through the respective channels 379 and 380 or the respective runway (in which a first runway 390 is the section of the first porous polymer membrane strip 371 that is formed by being bounded on its outer sides by one of the two longitudinal edge seals 326, by being bounded on the upper side 339 of the bottom layer 312 being adhered to the underside 333 of the first porous polymer membrane strip 371, and being bounded by the upper side 338 of the first porous polymer membrane strip 371 at its middle section by it being adhered to just the middle section 331 of the underside 335 of middle section of the top layer 316), and so the first air reservoir 373 is formed in that first end 332 of the loaded assembly 350; and a second runway 391 is formed by being bounded on its outer sides by one of the two longitudinal edge seals 326, by being bounded on the upper side 338 of the bottom layer 312 being adhered to the underside 333 of the second porous polymer membrane strip 372, and being bounded by the upper side 338 of the second porous polymer membrane strip 372 at its middle section by it being adhered to just the middle section 331 of the underside 335 of middle section of the top layer 316, and so the second air reservoir 374 is formed in that first end 332 of the loaded assembly 350. As one of ordinary skill in the art can appreciate, each of the two air reservoirs 373 and 374 can be formed by thermoforming the top layer 316 so that there is a bubble formed on the first side of the top layer 316, in which the top of the bubble is positioned away from the porous polymer membrane strip 314, or the first and second air reservoir 373 and 374 can be injected with air so as to stretch the size of the air reservoirs 373 and 374, or the top layer 316 can be left as described above and the first and second air reservoirs 373 and 374 can be formed by one of the two longitudinal seals 326, the underside 335 of the middle section 331 of the top layer 316, and the upper side 338 of the middle section 331 of the corresponding first or second porous polymer membrane strip 371 and 372. The first and second air reservoirs 373 and 374 are then sealed along the width of the first end 332, in which the seal 343 is made, for example, by heat stamping or heat lamination as described herein. The sealing of the first and second air reservoirs has the benefit of helping prevent the stimulus sensitive poloxamer solution from being evaporated by circulating air, and eliminating the need for the moisture retention pouch.

The cover 318 may be formed (for example, in advance of applying the center seal 370) by applying an opaque layer, such as paint or ink, to most of the upper or lower surface of the top layer 316, while leaving a portion of the top layer 316 free from paint or ink, so as to form the window 322. Alternately, the cover 318 may be constructed of a separate plastic sheet that has a window 322 formed from paint or ink and that is then adhered to the top layer 316. Alternately, the cover 318 can also be formed as a label which has a portion cut out to form the window 322, in which the label can be glued to the upper side 317 of the top layer 316. The window 322 in the cover 318 may remain free from ink or coloring so that the user of the stimulus indicating device may observe or view the inside of the assembly through the window 322 as explained herein. The cover 318 is placed in such a manner that the window 322 is located above the first end 332 of the assembly 350, and since the window 322 is transparent or clear, a portion of porous polymer membrane strip 314, or more particularly the runway 337 is visible to the end user through the window 322.

The embodiment of the stimulus indicating device prior to exposure to the predetermined stimulus is illustrated by FIG. 3A and FIG. 3B. As shown in at least FIG. 3A and FIG. 3B, prior to being exposed to a predetermined trigger stimulus, the stimulus sensitive poloxamer solutions in their gel states 305 and 310 have not yet undergone a phase transition to reach their liquid states 320 and 325 and wick through either the first or second runway 390 or 391 sections of the first or second porous polymer membrane strip 371 and 372, and thus the section of the first or second runway 390 or 391 sections of the first or second porous polymer membranes strips 371 and 372 directly under the window 322 have not been colored or dyed by the stimulus sensitive solution 305, 310, 320 and 325 and so the end user sees the undyed or uncolored first or second porous polymer membrane strip 342.

In this embodiment as illustrated by FIG. 3C and FIG. 3D, after exposure to the predetermined stimulus, the stimulus sensitive poloxamer solution in its gel state 305 or 310 of FIG. 3A and FIG. 3B undergoes its phase transition and turns into its liquid state 320 or 325. After exposure to the predetermined stimulus, which by way of example can be the temperature of 2° C., as shown in FIG. 3C and FIG. 3D, the stimulus sensitive poloxamer solution in its gel state 305 or 310 transitions to the stimulus sensitive poloxamer solution in its liquid state 320 or 325 and wicks away from the either the first or second solution reservoir 377 or 378 positioned on the second side 334 of the corresponding first or second porous polymer membrane strip 371 and 372 towards their corresponding first or second window 375 or 376 positioned in the middle section 331 of the stimulus indicating device 300. As the stimulus sensitive poloxamer solution in its liquid state 320 continues to wick through either the first or second runway 390 or 391 section of the corresponding first or second porous polymer membrane strip 371 and 372 in response to the predetermined stimulus, it reaches and wicks into and at least partially colors, or, if required so as to achieve the predetermined amount of time to provide required indication of exposure, fully colors either the first or second porous polymer membrane strip 371 and 372 located under the corresponding first or second window 375 or 376, so as to provide the indication of exposure to the predetermined stimulus. This indication of exposure appears to the end user as a colored or dyed first or second porous polymer membrane strip 344 through the corresponding first or second window 375 or 376 because the remainder of the first or second porous polymer membrane strip 371 or 372 and the remainder of the top layer 316 are covered completely by the cover 318 of the device 300, and as described herein, except for the first or second window 375 or 376, the cover 318 is completely opaque. Alternatively, a symbol or indicating spot may be printed on the portion of first or second porous polymer membrane strip 371 or 372 visible through the corresponding first or second window 375 or 376. In response to the predetermined stimulus, the stimulus sensitive poloxamer solution in its gel state 305 or 310 turns into the liquid state 320 or 325 and wicks and reaches into and at least partially colors, or fully colors the first or second porous polymer membrane strip 371 or 372 located under the corresponding first or second window 375 or 376 thus hiding the symbol or indicator spot printed on the corresponding first or second porous polymer membrane strip 371 or 273 so as to provide the indication of exposure to the predetermined stimulus. By way of example only, the indication of exposure can take the form of the end user viewing through the first or second window 375 or 376 a color change from white to blue, or a change from a "checkmark" or "✓" to completely colored such that the "checkmark" or "✓" can no longer be discerned.

The stimulus sensitive poloxamer solution 305, 310, 320 and 325, employed by the variations of this embodiment, as shown in FIG. 3A, FIG. 3B, FIG. 3C, and FIG. 3D, may be manufactured so as to contain a dye or colorant that is different from the color of the first or second porous polymer membrane strip 371 or 372. Alternatively, if an indicator spot is printed on the first or second porous polymer membrane strip 371 or 372 that is visible through the corresponding first or second window 375 or 376, the stimulus sensitive solution 310 and 320 may be manufactured so as to contain a dye or colorant that is the same as or significantly darker than the indicator spot. In this way the color of the stimulus sensitive solution 305, 310, 320, and 325 in both its gel and liquid state is different from the color of the first or second porous polymer membrane strip 371 or 372 and is the same as or darker than the indicator spot. When the stimulus sensitive poloxamer solution in its gel state 305 and 310 turns into its liquid state 320 and 325 in response to the predetermined stimulus, and for example after a predetermined amount of time, the wicking of the liquid 320 through the first or second porous polymer membrane strip 371 or 372 may result in the stimulus indicating device 300 providing the indication of exposure by changing, even at least partially, from a first color to a second color, in which the color change is permanently visible to the user of the stimulus indicating device 300 through the corresponding first or second window 375 or 376.

The objective of permanently adhering the upper side 339 of the bottom layer 312 to the underside 333 of the first and second porous polymer membrane strip 371 and 372, and of permanently adhering a portion of the middle section 331 of the top layer 316 to the upper side 338 of the first or second porous polymer membrane strip 371 and 372 is to force the stimulus sensitive poloxamer solution in its liquid state 320 or 325 to wick through the first or second porous polymer membrane strip 371 or 372. The stimulus sensitive poloxamer solution in its liquid state 320 or 325 readily wicks through any small gap, channel, or space between the layers. For this reason, the adhesion of the top layer 316 and the adhesion of the bottom layer 312 to the first or second porous polymer membrane strip 371 and 372 as taught herein is complete so that there are no small gaps. The wicking of the stimulus sensitive poloxamer solution in its liquid state 320 or 325, and therefore the temperature and indication time of the stimulus indicating device 300, is consistent among indicators of the same batch when it occurs through the first or second porous polymer membrane strip 371 and 372, but may be inconsistent among indicators of the same batch when it occurs through small gaps or space between the layers, thus the desire to eliminate such gaps, channels, or spaces.

As discussed herein, by manipulating and/or varying the distance between the first or second window portion 375 or 376 and the corresponding first or second solution reservoir 377 or 378, the "time function" can be calculated. More specifically, the time function determines the amount of time required for the stimulus sensitive poloxamer solution in its gel state 305 or 310 to transition to its liquid state 320 or 325 and wick far enough through the first or second porous polymer membrane strip 371 or 372 so that it wicks into and colors the section of the corresponding first or second porous polymer membrane strip 371 or 372 beneath the corresponding first or second window 375 or 376. As discussed herein, an indicator device 300 can be manufactured so as to not provide an indication of exposure (i.e., not completely or even partially color or dye the first or second porous polymer membrane strip 371 or 372 underneath the corresponding first or second window 375 or 376) until only after a predetermined amount of time had passed, in which that predetermined amount of time equaled the amount of time required for the stimulus sensitive poloxamer solution in its gel state 305 and 310 to first transition to the stimulus sensitive poloxamer solution in its liquid state 320 and 325, and then wick into and color or dye the first or second porous polymer membrane strip 371 or 372 underneath the corresponding first or second window 375 or 376. Such manipulation of the distance between the first or second window 375 or 376 and the corresponding first or second solution reservoir 377 or 378 includes moving the corresponding first or second window 375 or 376 farther away from or nearer to the corresponding first or second solution reservoir 377 or 378.

One of the many advantages of using a stimulus indicating device 300 that provides for or allows for a time function is that it eliminates the possibility for false indications of exposure. For example, a vaccine may spoil at 1° C. (the predetermined stimulus). But that vaccine may only spoil if the exposure lasts three or more hours. If an indication is presented by a given stimulus indicating device prior to that three hour mark, it is properly termed a false positive or a false indication of exposure, because the vaccine had in fact not spoiled as a result of the exposure to the temperature of 1° C. Thus, it is useful that the stimulus indicating device 300 may not display to the user an indication of exposure to the predetermined stimulus unless both the exposure to the predetermined stimulus occurred (by way of example, 1° C. or less), and that exposure occurred for the predetermined amount of time (by way of example, three or more hours). By way of example, if the time function and the predetermined stimulus of the stimulus indicating device are set for three hours of exposure to 1° C. or colder, respectively, the stimulus indicating device 300 may not provide a permanent indication of exposure if that predetermined stimulus only lasted ninety minutes.

It should be appreciated, that the stimulus sensitive solutions 305, 310, 320, and 325 do not have to completely color or dye the portion of the first or second porous polymer membrane strip 371 or 372 underneath the corresponding first or second window 375 or 376 in order to perform the intent of the present inventions (i.e., provide the indication of exposure). Instead, if even a portion of the first or second porous polymer membrane 371 or 372 under the corresponding first or second window 375 or 376 appears colored or dyed to the end user through the corresponding first or second window 375 or 376, it is enough to signal to the user that the product attached to the stimulus indicating device 300 had been exposed to a potentially harmful stimulus.

In regard to some embodiments of the stimulus indicating device 300 discussed herein being "irreversible" or "permanent" what is meant is that once the stimulus indicating device 300 provides an indication of exposure to an adverse stimulus extreme (which is also referred to herein as a predetermined stimulus), that indication of exposure does not change, even though the adverse stimulus extreme or predetermined stimulus might be removed in the future.

The first and second porous polymer membrane strip 371 and 372 can be made of any of several porous materials that allow wicking of the liquid stimulus sensitive solution in its liquid state 320 or 325. The materials that can be used to construct the first or second porous polymer membrane strip 371 or 372 may include synthetic polymer paper, cellulose paper or cellulose filters paper, and polyester filter paper. The polyester filter paper may be 50 to 350 micrometers in thickness and has a pore size of 20 to 50 micrometers. Also, this polyester paper may be made from fibers of polyester and as a result of the manufacturing process the polyester fibers making up the filter paper are on average oriented along one of the axis of the sheet. In the stimulus indicating device 300, the fibers in the filter paper may be oriented parallel to the long axis of the first or second porous polymer membrane strip 371 or 372 from the second end 334 to the first end 332 of the assembly 350 or orthogonally to the long axis or in any orientation in between these two. The wicking of the liquid stimulus sensitive solution in its liquid state 320 or 325 is fastest when the fibers of the first or second porous polymer membrane strip 371 or 372 are oriented parallel to the long axis of the first or second porous polymer membrane strip 371 or 372 and slowest when the fibers are oriented orthogonally to the long axis of the first or second porous polymer membrane strip 371 or 372 and the rate of wicking is in between the fastest and slowest when an orientation is chosen between parallel and orthogonal orientation. All other parameters of the stimulus indicating device 300 remaining equal, changing the orientation of the fibers in the filter paper may result in a different wicking rate and therefore a different indication time of the stimulus indicating device 300. While the first or second porous polymer membrane strip 371 or 372 can be constructed of several materials, the first or second porous polymer membrane strip 371 or 372 may be made from polyester, and may be constructed similarly to polyester filter paper such as UT-300 that can be purchased from Midwest Filtration LLC (Cincinnati, Ohio).

Both the top layer 316 and the bottom layer 312 of the stimulus indicating device 300 may be constructed of a strong, resilient leak-proof material, such as plastic or other polymer material, so as to provide for the twisting or bending that might occur during transportation of or application to the stimulus sensitive device 300 without tearing, breaking or leaking. Moreover, the top layer 316 and the bottom layer 312 may be constructed of any of a number of materials that have a high vapor retention including polyolefins such as polyethylene and polypropylene, cyclic olefin copolymers (COCs) such as those included in the TOPAS® COC family of resins manufactured by TOPAS Inc., film laminates containing a film of poly(vinylidene chloride) such as those sold by Teknifilms, and alumina filled polyester films such as TPF-0599B sold by Oliver Tolas, so as to reduce or eliminate moisture loss by the stimulus sensitive device 300.

All embodiments discussed herein of the stimulus indicating device 300 containing the stimulus sensitive solution in its gel state 305 or 310 and its liquid state 320 or 325 may be based on any type of stimulus sensitive solution that undergoes a phase transition upon exposure of the stimulus sensitive solution to a predetermined stimulus. The types of stimulus sensitive solutions may include: solutions that exhibit transitions between gel state and liquid state upon both heating above a transition temperature and cooling below a transition temperature, such as solutions of poloxamers in water; solutions that exhibit transitions between gel state and liquid state upon cooling; and solutions that exhibit transitions between gel state and liquid state upon heating.

Solutions of molecules that exhibit transitions between the gel and liquid both upon heating past a transition temperature and cooling below a transition temperature include solutions of poloxamers in water and solutions of copolymers of ethylene glycol and n-isopropylacrylamide. Solutions of molecules that exhibit transitions between the gel and liquid upon cooling below a trigger temperature include solutions of alkylcelluloses in water. Also, solutions of molecules that exhibit transitions between the gel state and liquid state upon heating past a transition temperature include solutions of molecules that undergo helix to coil transitions such as solutions of carrageenan in water.

As one of ordinary skill in the art will appreciate, in some embodiments, the mechanism behind the ability of stimulus sensitive solutions made by combining poloxamers, alkylcelluloses or block copolymers of n-isopropylacrylamide and ethylene glycol in water, is the hydrophobic effect. In general, the common feature between these different stimulus sensitive solutions that transition between its gel and liquid states as a result of the hydrophobic effect is that they are formed from amphiphilic molecules that contain both hydrophobic and hydrophilic portions. These molecules typically aggregate and form supramolecular structures such as micelles in which the hydrophobic portions are organized into the core of the micelle and the hydrophilic portions organize on the outside of the micelle and help solubilize the hydrophobic portions. The water molecules typically form cage-like structures around the hydrophobic portions that solubilize the hydrophobic portions in water. When the water cage is disrupted, the hydrophobic portions aggregate much more strongly leading to exclusion of water and the stimulus sensitive solution turning into its gel state (this is the hydrophobic effect). Typically, stimulus sensitive solutions that transition between a gel state and a liquid state as a result of the hydrophobic effect undergo a gel to liquid transition as a result of cooling the temperature of the stimulus sensitive solution below a predetermined temperature and in the case of stimulus sensitive poloxamer solutions the hydrophobic effect leads to both gel to liquid transitions as a function of heating and cooling.

One of ordinary skill in the art may understand that although the stimulus sensitive solution 305, 310, 320, and 325 discussed herein in regard to some embodiments of the stimulus indicating device 300 may be of the type that transitions from a gel state to a liquid state as a result of the hydrophobic effect, the range and scope of the embodiments may include the type that transitions from a gel state to a liquid state as a result of a transition in the molecules between coil and globule. Moreover, all the variations of the different embodiments discussed herein can be combined with the variations of other embodiments described herein and that are known in the art, as would be understood to one of ordinary skill in the art.

If the stimulus sensitive solution 305, 310, 320, and 325 employed in all the embodiments of the stimulus indicating device 300 discussed herein were of the type that transitions between the gel state and liquid state both upon cooling below a transition temperature and heating beyond a transition temperature, it can be any number of stimulus sensitive gels, including poloxamer solutions. Poloxamer molecules contain Poly(ethylene oxide) as the hydrophilic region and Poly(propylene oxide) as the hydrophobic region. As described in Paschalis Alexandridis and T. Alan Hatton, "Poly(ethylene oxide)-Poly(propylene oxide)-Poly (ethylene oxide) Block Copolymer Surfactants in Aqueous Solutions and at Interfaces: Thermodynamics, Structure, Dynamics, and Modeling", Colloids and Surface A: Physicochemical and Engineering Aspects, Volume 96, at Pages 1-46 (1995), in regard to stimulus sensitive poloxamer solutions, the predetermined stimuli, such as the temperatures at which a stimulus sensitive gel 305 or 310, undergoes its transition from a gel state to a liquid state, both upon heating and cooling, can be "tuned" to a particular value by changing the type and concentration of poloxamer, adding salts such as sodium chloride and buffering agents such as phosphate salts.

Alternatively, if the stimulus sensitive solution 305, 310, 320, and 325 employed in all the embodiments of the stimulus indicating device 300 discussed herein were of the type that transitions between a gel state to a liquid state as a result of cooling below a transition temperature, it can also include solutions of alkylcellulose polymers in water. Alkylcellulose molecules contain cellulose as the hydrophilic portion and the alkyl substituent is the hydrophobic portion. One example of an alkylcellulose molecule that transitions as a result of the hydrophobic effect is methyl cellulose. As described in Lin Li, "Thermal Gelation of Methylcellulose in Water: Scaling and Thermodynamics", Macromolecules at Volume 35, pages 5990-5998 (3002), and Kazuto Kobayashi et al., "Thermoreversible Gelation of Aqueous Methylcellulose Solutions", Macromolecules at Volume 32, pages 7070-7077 (1999), in regard to methylcellulose stimulus sensitive solutions, the predetermined stimulus, such as temperature at which a stimulus sensitive gel 305 or 310 undergoes its gel state to a liquid state transition, can be "tuned" to a particular value by changing the methylation percentage of the cellulose, the molecular weight of the methylcellulose and by adding salts such as sodium chloride or other electrolytes.

Alternatively, if the stimulus sensitive solution 305, 310, 320, and 325 employed in all the embodiments of the stimulus indicating device 300 discussed herein were of the type that transitions between a gel state to a liquid state as a result of cooling below a trigger temperature, it can also include solutions of a block copolymer of poly(alkylacrylamide)-block-poly(ethylene glycol) and their derivatives in water. These molecules include the poly(alkylacrylamide) block and its derivatives as the hydrophobic portion and the poly(ethylene glycol) as the hydrophilic portion. One example of this type of molecule that forms stimulus sensitive solutions that transition between its liquid state and its gel state as a result of the hydrophobic effect is poly(n-isopropylacrylamide-co-butyl methacrylate)-block-poly (ethylene glycol). As described in Hiroshi Yoshioka et al., "A Synthetic Hydrogel with Thermoreversible Gelation. I. Preparation and Rheological Properties", Journal of Macromolecules Science Part A, Volume 31, pages 113-320 (1994), in regard to poly(n-isopropylacrylamide-co-butyl methacrylate)-block-poly(ethylene glycol) stimulus sensitive solutions, the predetermined stimulus, such as temperature at which a stimulus sensitive gel 305 or 310 undergoes its gel state to a liquid state transition, can be "tuned" to a particular value by changing the molecular weight and concentration of both the poly(n-isopropylacrylamide-co-butyl methacrylate) and the poly(ethylene glycol) blocks, and by adding salts such as sodium chloride or other electrolytes.

Alternatively, the stimulus sensitive solution 305, 310, 320, and 325 employed in all the embodiments of the stimulus indicating device 300 discussed herein were of the type that transitions as a result of heating beyond a transition temperature, it can include solutions of carrageenan in water. As described in Sijun Liu et al., "Thermoreversible Gelation and Viscoelasticity of k-Carrageenan Hydrogels", Journal of Rheology at Volume 60, pages 203-314 (2016), in regard to carrageenan stimulus sensitive solutions, the predetermined stimulus, such as temperature at which a stimulus sensitive gel 305 and 310 undergoes its gel state to a liquid state transition, can be "tuned" to a particular value by changing the concentration of carrageenan in solution and adding salts such as calcium chloride and sodium chloride, the effect on the transition temperature being different depending on whether the salt added is monovalent or divalent.

Regardless of whether a stimulus sensitive solution exhibits transitions between its gel state and its liquid state upon both heating above a transition temperature and cooling below a transition temperature, exhibits transitions between gel state and liquid state upon cooling, or exhibits transitions between gel state and liquid state upon heating, in some embodiments the viscosity of the liquid stimulus sensitive solution may be tailored to the application in which the stimulus sensitive indicator 300 is being used. For example, for a given first or second porous polymer membrane strip 371 or 372 and a fixed distance between the corresponding first or second solution reservoir 377 or 378 and corresponding first or second window 375 or 376, the viscosity of the liquid stimulus sensitive solution 320 may be of a certain value such that it may wick through the first or second porous polymer membrane strip 371 or 372 and color or dye the portion of the first or second porous polymer membrane strip 371 or 372 that is underneath the corresponding first or second window 375 or 376.

More particularly, in conjunction with FIG. 3A, FIG. 3B, FIG. 3C, and FIG. 3D, by coloring the stimulus sensitive solution 305, 310, 320, and 325 a different color than the corresponding first or second and the same color as the indicator spot, if used, such that when the stimulus sensitive poloxamer solution in its gel state 305 or 310 is exposed to the predetermined stimulus and turns into its liquid state 320 or 325, which then wicks through the first or second runway 390 or 391 and results in coloring or dyeing the corresponding first or second porous polymer membrane strip 371 or 372 under the corresponding first or second window 375 or 376, and if an indicator spot is used, that colored or dyed stimulus sensitive poloxamer solution in its liquid state 320 hides the indicator spot from the view of the user through the corresponding first or second window 375 or 376. By way of example, the stimulus sensitive poloxamer solution 310 and 320 may contain a suitable dye or color additive such as red. When that red colored stimulus sensitive poloxamer solution in its liquid state 320 or 325 wicks through the porous polymer membrane strip 314 and colors or dyes the corresponding first or second porous polymer membrane strip 371 or 372 under the corresponding first or second window 375 or 376 and hides the indicator spot (if used) from the view of the user, it informs the user (perhaps in conjunction with a legend or color key) that the product attached to the stimulus indicating device 300 has been exposed to a potentially harmful stimulus.

VII. Methods for Manufacturing and Setting the Trigger Temperature of a Stimulus Sensitive Poloxamer Solution For the embodiments of the stimulus sensitive poloxamer solution discussed herein, the stimulus sensitive poloxamer solution can be manufactured to undergo its phase transition at any predetermined stimulus. By way of example only, the stimulus sensitive gel discussed herein can be made to trigger or undergo its phase transition (i.e., change from the gel state to the liquid state) upon exposure to a temperature of less than 2° C. It may be understood by one of ordinary skill in the art that other temperatures and/or stimuli can be set as the predetermined stimulus by varying the method and/or ingredients disclosed herein.

By way of example, the discussion below will disclose examples of stimulus sensitive poloxamer solutions: one of these examples changes from a gel to a liquid state upon being exposed to a temperature cooler than 14.5° C. and 1.5° C.

The method of manufacturing such a stimulus sensitive poloxamer solution comprises a single step in which the poloxamer and dye are dissolved completely in water. The dissolution of the components is performed at a temperature 5° C. below the anticipated transition temperature or lower. Optionally, it may be desirable to include a buffering agent or an electrolyte in the poloxamer solution. One skilled in the art may realize that by varying the concentration of poloxamer, electrolyte, and buffering agent in the stimulus sensitive poloxamer solution, one may achieve stimulus sensitive poloxamer solutions with different transition temperatures.

This single mixing step including any variations in the abovementioned components and level of components comprise the process of preparing a stimulus sensitive poloxamer that may undergo its phase transition upon being exposed to a predetermined stimulus as well as provide foolproof, permanent and irreversible indication of the stimulus sensitive product's exposure to such stimulus.

A. Preparation of Poloxamer Solution.

By way of example, the stimulus sensitive poloxamer solution is prepared by dissolving the poloxamer and dye in water and optionally a buffering agent or electrolyte. This stimulus sensitive poloxamer solution is accomplished by employing the following ingredients, although one of ordinary skill in the art may recognize that certain of the following ingredients can be replaced by other similar types of ingredients, and recognizes/understands that the amounts of the ingredients are exemplary only. Accordingly, the amounts of the ingredients can be varied by any amount so long as the desired gel is created. Moreover, the amounts can be increased or decreased proportionally so that larger or smaller amounts of swollen stimulus sensitive gel can be created.

The ingredients include:
i) between 5 and 60 grams of Pluronic F-127 (preferably suitable for cell culture, <0.75% moisture, pH of a 2.5% solution between 6.0 and 7.0);
ii) between 0 and 20 grams of Sodium Chloride;
iii) between 0 and 0.1 grams of a FD&C Blue dye;
iv) between 20 and 95 grams of distilled water or optionally between 20 and 95 grams of 0.1 molar sodium or potassium phosphate buffer at a pH of 7; and
v) between 0 and 0.01 grams of ascorbic acid as a preservative.

In order to manufacture a stimulus sensitive poloxamer solution, the method is as follows, although one of ordinary skill in the art may recognize that certain steps can be performed in varying order, and the amounts can be varied as described herein or as known to one of ordinary skill in the art:
i) between 5 and 60 grams of Pluronic F-127, between 0 and 20 grams of sodium chloride, between 0 and 0.1 grams of FD&C Blue dye, and between 0 and 0.01 grams of ascorbic acid are dissolved in 20 to 95 grams of distilled water or optionally 20 to 95 grams of 0.1 molar sodium or potassium phosphate buffer at a pH of 7.

The solution above is then dissolved by continuously mixing at a temperature 5° C. or more below the anticipated transition temperature of the resulting solution for a period of 12 hours. The purpose of using the ascorbic acid and/or the sodium or potassium phosphate buffer is to prevent the degradation of the poloxamer molecules when stored for prolonged periods of time in solution. In some embodiments, if the stimulus sensitive solutions are stored for prolonged periods of time, the transition temperature of the stimulus sensitive poloxamer solutions may change. Typically, for the lower transition temperature, the lower transition temperature may shift upwards. Depending on the requirements for the stimulus indicating device, some degradation and change of the transition temperature may be allowed. However, in preparing the stimulus sensitive poloxamer solution, one may verify that the resulting stimulus sensitive poloxamer solution has the storage stability required for the stimulus indicating device. The use of Ascorbic Acid and/or buffering agents may be used by the formulator to extend the storage stability of the stimulus sensitive poloxamer solutions if required. One skilled in the art may realize that Ascorbic Acid may be replaced with other molecules that are known in the art as preservatives. Aside from Ascorbic Acid, other compounds may be used to enhance the stability and shelf-life of the transition temperature of the stimulus sensitive poloxamer solution. These compounds and mixtures include but are not limited to: standard blue food coloring (McCormickBRAND), which contains propylene glycol and propylparaben, erioglaucine and RD&C red 40; Erioglaucine alone; and Oil Red O. Both propylene glycol and Oil Red O may have an affinity for the polypropylene oxide block of the pluronic copolymer. By associating with this portion of the polymer, some of these compounds (such as propylene glycol, propylparaben, and Oil Red O) may shield that section of the polymer from water and thereby reduce the rate of hydrolysis. Degradation of the polypropylene block of the copolymer can lead to changes in the transition temperature to a greater degree than degradation of the polyethylene oxide portion of the copolymer.

One skilled in the art may recognize that other poloxamer molecules may be used. Poloxamer molecules are triblock copolymers consisting of two PEO blocks joined by one PPO block. By changing the number of ethylene oxide units in the PEO block or the number of polypropylene oxide units in the PPO block, solutions containing these poloxamer molecules can be obtained that have different properties. These properties include viscosity, surface tension and wetting properties as well as the transition temperature of the stimulus sensitive solution. While the use of Pluronic F-127 is described in detail, the embodiments of the disclosure are not limited to using this type of poloxamer but one skilled in the art may recognize that other poloxamer molecules may be used albeit modifications in the concentration of the poloxamer molecule and other ingredients may be needed. Examples of other poloxamer molecules that may be used include Pluronics F-68, F-88, F-98, F-105, and P-84.

One skilled in the art may recognize that the stimulus sensitive poloxamer solution can be dyed in different colors. For instance, instead of using Erioglaucine disodium salt, other colors may be used to impart a yellow, green or red color to the stimulus sensitive poloxamer solution. The mass of colorant added may vary depending upon the final application and selection of color (as the solubility and intensity of dyes varies widely from color to color).

B. Tuning the Transition Temperature of the Stimulus Sensitive Poloxamer Solutions to the Predetermined Stimulus.

The transition temperature of the stimulus sensitive poloxamer solutions may depend on the type and concentration of poloxamer molecule used, as well as on the quantities of sodium chloride, dye and ascorbic acid used and on whether pH 7 phosphate buffer or ascorbic acid or water are used to prepare the stimulus sensitive solution.

The predetermined stimulus may be altered, however, so as to cause the stimulus sensitive poloxamer solution in the gel state to undergo a transition to the liquid state upon cooling below different temperatures. This altering of the predetermined stimulus can be accomplished because of the underlying physical interactions that govern the transition from the gel state to the liquid state in the stimulus sensitive poloxamer solutions. In regard to the stimulus sensitive poloxamer solutions, see for example Paschalis Alexandridis and T. Alan Hatton, "Poly(ethylene oxide)-Poly(propylene oxide)-Poly(ethylene oxide) Block Copolymer Surfactants in Aqueous Solutions and at Interfaces: Thermodynamics, Structure, Dynamics, and Modeling", Colloids and Surface A: Physicochemical and Engineering Aspects, Volume 96, pages 1-46 (1995). The main interaction recognized as responsible for the transition between a gel state and liquid state in a stimulus sensitive poloxamer solution is the interaction between the polyproplyene oxide units in the PPO block of the poloxamer molecule and surrounding water molecules. To gain more insight into how this interaction governs the transition temperature, the poloxamer molecules may be defined using two parameters: the length of the PPO block and the ratio of PEO to PPO content. The PEO block may be more hydrophilic than the PPO block and as a result the PEO block helps solubilize the PPO block in water. When poloxamer molecules are dissolved in water at temperatures below the transition temperature, they aggregate to form micelles, or spherical structures in which the relatively hydrophobic PPO blocks can be found at the center of the micelle and the relatively hydrophilic PEO molecules are found at the edges of the micelle. Water may not be excluded from the core of the micelle, however, and water molecules may remain in contact with the PPO units. The interaction between water and PPO may be relatively unfavorable and water molecules organize around the propylene oxide units in the PPO block in an organized water cage structure at low temperatures. At higher temperatures, the thermal mobility of both water and the PPO increases, breaking down the organization of the water cage structure around the PPO at higher temperatures. As a result, the propylene oxide units in the PPO aggregate amongst themselves and in doing so exclude water from inside the micelle. By excluding water, these micelles form rigid spheres and these rigid spheres organize in a manner reminiscent of a crystal forming a crystalline micellar phase. This crystalline micellar phase is the origin of the gel state of the stimulus sensitive poloxamer solution. The transition temperature of the stimulus sensitive poloxamer solutions may be strongly dependent on the length of the PPO block. For two types of poloxamer dissolved in water at the same concentration, one having a larger length of PPO compared to the other, the poloxamer molecule with the largest length of PPO may have a lower transition temperature. This is a result of the water cage effect: as the length of the PPO block increases, the stability of the water cage around the propylene oxide units is lowered. As the stability of the water cage is lowered, the temperature required for water and propylene oxide to gain sufficient motion and therefore destabilize the water cage is lower.

Certain additives may be used in combination with the stimulus sensitive poloxamer solutions to alter the water cage structure around the propylene oxide units in the PPO block and can therefore affect the transition temperature of the stimulus sensitive poloxamer solutions. See for example Paschalis Alexandridis and T. Alan Hatton, "Poly(ethylene oxide)-Poly(propylene oxide)-Poly(ethylene oxide) Block Copolymer Surfactants in Aqueous Solutions and at Interfaces: Thermodynamics, Structure, Dynamics, and Modeling", Colloids and Surface A: Physicochemical and Engineering Aspects, Volume 96, pages 1-46 (1995) for a detailed discussion of these additives. For instance the transition temperature of stimulus sensitive poloxamer solutions can be altered by using a salt. Depending on the type of salt, both a "salting out" or destabilization of the water cage or a "salting in" or stabilization of the water cage can be obtained. "Salting out" additives lower the transition temperature of the gel to liquid state of the stimulus sensitive poloxamer solution whereas a "salting in" additive has the opposite effect. Sodium chloride is an example of a "salting out" additive whereas sodium thiocyanate is an example of a "salting in" additive. The salt used in these solutions can be, by way of example, sodium chloride or sodium thiocyanate although one of ordinary skill in the art may recognize that these salts may be substituted with other salts to tune the transition temperature of the stimulus sensitive poloxamer solution. Other additives that may be used to alter the transition temperature of the stimulus sensitive poloxamer solution include PPO or PEO homopolymers. The addition of PEO acts to increase the transition temperature whereas the addition of PPO has the opposite effect.

Temperature and the concentrations of poloxamer or salt play a similar role in dictating whether the stimulus sensitive poloxamer solution is gelled or not. By way of example, if the salt used is sodium chloride, if the concentrations of both poloxamer and salt are fixed, and the stimulus sensitive solution is kept above a certain temperature, the stimulus sensitive solution may remain gelled. When the gelled stimulus sensitive poloxamer solution is exposed to a stimulus that equals or exceeds its predetermined stimulus, for example a lower temperature, the gelled stimulus sensitive solution may undergo its phase transition and become a liquid.

Alternatively, by keeping the temperature and the concentration of sodium chloride fixed in the stimulus sensitive solution, if the stimulus sensitive solution is kept at constant poloxamer concentration, the poloxamer solution may remain in the liquid state as long as the poloxamer concentration does not exceed the predetermined stimulus. When the poloxamer concentration in the stimulus sensitive solution changes to such a degree that it equals the predetermined stimulus for that liquid stimulus sensitive solution, for example, the poloxamer concentration in the stimulus sensitive solution rises to a predetermined level, at that point the concentration of micelles in the stimulus sensitive solution is sufficiently high that the micelles can organize into a micellar crystal and the solution thus becomes a gel.

Alternatively, by keeping the temperature and the concentration of poloxamer fixed in the stimulus sensitive solution, if the stimulus sensitive solution is kept at constant sodium chloride concentration, the poloxamer solution may remain in the liquid state as long as the sodium chloride concentration does not exceed the predetermined stimulus. When the sodium chloride concentration in the stimulus sensitive solution changes to such a degree that it equals the predetermined stimulus for that liquid stimulus sensitive solution, for example, the salt concentration in the stimulus sensitive solution rises to a predetermined level, at that point the PPO is salted out and the liquid stimulus sensitive solution becomes a gel. This relationship between certain types of stimuli, such as salt concentration and transition temperature, allows for the control of the phase transition of the stimulus sensitive gel at its predetermined stimulus, by way of example, its transition temperature.

One embodiment of the disclosure includes a stimulus sensitive poloxamer solution that goes through its phase transition at a predetermined level of stimulus. By way of example, malaria vaccine spoils after exposure to a temperature lower than 2° C. Therefore, a stimulus sensitive poloxamer solution used in conjunction with any embodiment of the stimulus indicating device described herein, can be set to trigger at 2° C. or cooler. By way of example, a gelled stimulus sensitive solution can be manufactured so that the phase transition of the stimulus sensitive solution from the gel state to the liquid state occurs at approximately 2° C. As one of ordinary skill in the art can appreciate, the concentration of poloxamer and sodium chloride that causes a gelled stimulus sensitive solution to trigger or undergo its phase transition at a predetermined level of stimulus, can be determined for any stimulus, and more particularly at any level of stimulus.

To determine the poloxamer or sodium chloride concentration that is needed to cause a given gelled stimulus sensitive solution to trigger or undergo its phase transition at a predetermined stimulus such as temperature, one needs to first start with gross variations of sodium chloride or poloxamer concentration and then determine from those gross variations the level of stimulus that causes the stimulus sensitive solution to trigger or go through its phase transition. By narrowing the variation of poloxamer or sodium chloride concentration and again noting the level of stimulus that caused the stimulus sensitive solution to trigger or undergo its phase transition, the stimulus sensitive solution with the proper or desired trigger of phase transition characteristics may become evident. Once the salt concentration required to obtain stimulus sensitive solutions that trigger at the desired transition temperature are established, this procedure may not need to be repeated for all manufactured stimulus sensitive solutions.

C. Further Tuning the Transition Temperature of the Stimulus Sensitive Poloxamer Solutions to the Predetermined Stimulus.

Further to the embodiments discloses herein which state that a stimulus sensitive poloxamer solution may have a particular transition temperature of one or two degrees Celsius, in practice commercially available polomaxer solutions can generally, for some embodiments, undergo a gel to liquid transition that spans several degrees of temperature. For example, a stimulus sensitive poloxamer solution identified as transforming from gel to liquid at 2° C., may start its transformation anywhere from 2° C. plus-or-minus one degree Celsius to plus-or-minus five degrees Celsius. One reason a stimulus sensitive poloxamer solution can have such a wide transition temperature range is the presence of particular by-products that are generated by the synthesis of the polymer (i.e., the stimulus sensitive poloxamer solution). These byproducts typically consist, in some embodiments, of polyethylene oxide homopolymer ("PEO") and/or polyethylene oxide/polypropylene oxide diblock copolymers ("PPO") that result from synthesizing the desired triblock copolymer. These byproducts may account for approximately 15% to 50% of the total mass of the stimulus sensitive poloxamer solution obtained from commercial vendors. Likewise, the wide transition temperature range may also result from variations of the length of the PEO and/or PPO blocks that make up the triblock copolymer. The block co-polymer synthesis process for poloxamers can be the result of many sequential reactions. Thus, the final length of the resulting polymers, and/or the final molecular weight of the resulting polymers, can form a statistical distribution in some embodiments around an average length of the polymer, which then can result in an average molecular value for that polymer.

In the case of a temperature indicating device that contains a stimulus responsive poloxamer solution as the component that provides the indication of exposure to the transition temperature, a poloxamer solution may be used that undergoes its change in viscosity over as narrow a range of transition temperatures as possible, compared to a poloxamer solution that undergoes its change in viscosity over a broad range of transition temperatures. This preference for a narrow transition temperature range arises, for example, from several factors. For example, because commercially available poloxamers can contain several different molecular weights, they exhibit a heterogeneity in transition temperatures. Thus, they exhibit a heterogeneity in their corresponding local viscosity (i.e. small portions of the gel will become liquid while other portions remain gelled, or small portions of the solution remain gelled even after most of it has become liquid). In some cases, the viscosity change from one point of the gel to another point may be very small; local viscosity might be higher in some portions of the gel than in other portions. In any of these cases, the heterogeneity in solution viscosity may induce variability in the transition temperature and/or wicking time of the solution through the porous membrane, thus decreasing the overall time-temperature measurement accuracy of the device.

Thus, it may be useful to both limit the distribution of poloxamer molecular weights in the gel and eliminate the aforementioned byproduct species in order to limit the heterogeneity of the solution. In order to achieve this, a variety of filtration methods exist. U.S. Pat. No. 5,800,711 uses the addition of salt to separate their desired poloxamers from the byproducts. However, this method can require substantial washing steps and produces very low yields. Likewise, WO/9216484 suggests the use of a gel permeation chromatography. In some embodiments, each of these fractionation methods, while very selective, can produce low yields, require some specialized laboratory equipment, and lack the scalability to produce high quality poloxamer at a low cost.

The embodiments of the present disclosure improve upon the prior art cited above by achieving, for example, the fractionation of a poloxamer via a simple physical filtration method that is low-cost, do not require the use of organic solvents (which can be toxic and difficult to dispose of), scalable, and for some embodiments may only require the control of ambient temperature. To fractionate the stimulus sensitive poloxamer solution, a certain amount of poloxamer that has a desired transition temperature of 2° C. can be dissolved in water to form a solution at a high enough concentration that may not flow through a pre-selected porous membrane via the force its own weight at the initial temperature of 4° C. and normal pressure. This can be set up in an environmental chamber, refrigerator, cold room or oven with humidity control. The porous membrane can be secured under the solution and positioned such that the stimulus sensitive poloxamer solution flows through the paper if its viscosity is lowered to a sufficient level. One way of achieving this positioning is to use a conical porous membrane placed inside of a cone shaped funnel with the stimulus sensitive poloxamer solution in its gel state resting inside of the porous membrane cone. Likewise, the stimulus sensitive poloxamer solution being fractionated can be covered in a plastic membrane, for example Parafilm, so as to minimize evaporation of the sample, which may impact the transition temperature of the stimulus sensitive poloxamer solution during either the fractionation step or during its use in the temperature indication device. Once this system is set, the temperature of the system can, for some embodiments, be lowered slowly and in small increments from 4.0° C. until the stimulus sensitive poloxamer solution reaches 3.0° C. Once the system drops below 4.0° C., the stimulus sensitive poloxamer solution can begin to partially transition from its gel state to its liquid state, and the first amount of liquid passes through the bottom of the porous membrane and into a collection vial. The temperature of the system is held at 3.0° C. until there is no more stimulus sensitive poloxamer solution in its liquid state flowing through the porous membrane. The portion of the stimulus sensitive poloxamer solution contained in the vial can have a transition temperature of between 4.0° C. and 3.0° C.

In order to reduce the width of the transition temperature range of the solution remaining in the conical filter, the temperature of the system can again be lowered slowly and in small increments from 3.0° C. until the stimulus sensitive poloxamer solution reaches 2.0° C. so that all portions of the stimulus sensitive poloxamer solution that transitioned prior to reaching 2.0° C. turn to its liquid state and flow through the porous membrane and into a second vial. At the point where the system has been held at 2.0° C. for a long enough period that the liquid portion of the stimulus sensitive poloxamer solution stops flowing, the fraction of the stimulus sensitive poloxamer solution remaining in the conical filter has a transition temperature of less than 2.0° C., and the fraction of the stimulus sensitive poloxamer solution captured by the second vial has a transition temperature of between 3.0° C. and 2.0° C.

In addition to the benchtop embodiment described here, this process may be scaled up to a much larger scale through making the cone funnel and filter larger. In another embodiment, by way of example, this fraction may also be accomplished through the use of common industrial equipment, such as a filter press. Briefly, the filter press operates in the same fashion as the invention above, except that the user may apply a specific pressure gradient to drive the solution through the filter media instead of gravity. The process may be performed in a controlled environment, such an environmental chamber, refrigerator, cold room, or oven etc. so that temperature may be varied in controlled fashion.

Once the different fractions of the stimulus sensitive poloxamer solution are generated, the fraction specific to the desired transition temperature can be inserted into reservoir of the stimulus indicating device as taught herein.

VIII. Examples

By way of illustration, to determine the proper concentration of poloxamer and sodium chloride for a stimulus sensitive poloxamer solution to trigger at different lower transition temperatures, identical volumes of stimulus sensitive solution were placed in glass vials whereby the concentrations of both poloxamer and sodium chloride were varied. As described above, stimulus sensitive poloxamer solutions may exhibit multiple transitions between the gel and liquid states at different temperatures. Typically, the stimulus sensitive poloxamer solution was in its liquid state below a lower transition temperature but when heated above the lower transition temperature, it transitions into its gel state. When the gel was heated past its upper transition temperature, the gel once again transitions into its liquid state. The discussion below focuses on the lower transition temperature. However, as may be evident to one skilled in the art, a similar procedure to that described below can be followed in order to determine the upper transition temperature. Since the poloxamer and sodium chloride concentration are two factors that can determine the transition temperature of the stimulus sensitive solution, in order to determine the transition temperature, a factorial experiment was designed wherein one factor was kept constant while a second factor was varied. The effect of changing the level of a single factor on the transition temperature can therefore be isolated easily. The procedure to determine the lower transition temperature as a function of factor concentration was to place the vials containing the different stimulus sensitive solutions in a controlled temperature environment at a temperature above the lower transition temperature of all the solutions such that all solutions were in the gel state. Once all the stimulus sensitive solutions were gelled, the vials were inverted such that the gelled stimulus sensitive solutions can be found at the top of the vials. The temperature was then decreased at a slow rate of approximately 0.5° C. per minute. As the temperature decreases below the lower transition temperature of the stimulus sensitive solutions, the gelled solutions liquefy and as a result flow downwards from the top of the vial to the bottom. The temperature at which the samples flow was recorded. However, in order to verify the transition temperature with greater precision, the experiment was repeated but with an even slower cooling rate of 0.1° C. in the vicinity of the transition temperature measured at a rate of 0.5° C.

By following a similar procedure, the lower transition temperatures of several samples can be determined as shown in the table below.

TABLE 1

Lower Transition Temperatures of Stimulus Sensitive Poloxamer Solutions Containing Select Levels of Sodium Chloride and Poloxamer (Pluronic F-127).

| Poloxamer Concentration, weight % | Salt Concentration, weight % | | |
|---|---|---|---|
| | 0 | 5 | 10 |
| 20 | 22.7 | 11.3 | 0.4 |
| 30 | 12.6 | 0.9 | −9.8 |
| 40 | 0.5 | −11.8 | −22.2 |

As an example, a stimulus sensitive solution with a lower transition temperature of 1.5° C. was prepared by combining 39 grams of Pluronic F127, 0.05 grams Erioglaucine disodium salt (FD&C Blue dye) and 0.001 grams of ascorbic acid in 60.95 grams of distilled water by mechanically stirring at −5° C. or lower temperature until solution becomes dark transparent. This process takes approximately 24 hours. By employing a procedure as described above, the transition temperature of this stimulus sensitive poloxamer solution was found to be 1.5° C.

As another example, a stimulus sensitive solution with a lower transition temperature of 14.5° C. is prepared by combining 29 grams of Pluronic F127, 0.05 grams Erioglaucine disodium salt (FD&C Blue dye) and 0.001 grams of ascorbic acid in 70.95 grams of distilled water by mechanically stirring at −9.5° C. or lower temperature until solution becomes dark transparent. This process takes approximately 24 hours. By employing a procedure as described above, the transition temperature of this stimulus sensitive poloxamer solution was found to be 14.5° C.

Although the embodiments of the disclosure contained herein have been particularly shown and described, it will be understood by those skilled in the art that various changes in form and detail may be made to those embodiments without departing from the spirit and scope of the disclosure.

The disclosure relates to an apparatus for evidencing when a stimulus sensitive product has been exposed to a predetermined stimulus of too high of a temperature or too low of a temperature for a certain period of time, and may further include a method for manufacturing aspects of that apparatus.

What is claimed is:
1. A stimulus indicating device comprising:
 a stimulus sensitive amphiphilic gel contained in a first reservoir; and
 an assembly having a first end and a second end and extending in a first direction defining a length of the assembly between the first end and the second end and extending in second direction opposite the first direction defining a width of the assembly, the assembly including:
  a top layer,
  a middle layer including a porous polymer membrane, and
  a bottom layer,
 a second reservoir formed between said top layer and said middle layer and being positioned away from said second end, the second reservoir being configured to accept air displaced from said middle layer by movement of said stimulus sensitive amphiphilic gel through said middle layer, wherein:

said top layer and said bottom layer are sealed together on opposing sides of said assembly, and said top layer and said bottom layer are sealed in the second direction at a widthwise side of the second end of said assembly, said top layer contains a cover comprising a window, said stimulus sensitive amphiphilic gel is in fluid communication with said middle layer.

2. The stimulus indicating device of claim 1, wherein: said top layer and said bottom layer are sealed in the second direction at a widthwise side of the first end of said assembly.

3. The stimulus indicating device of claim 2, wherein said first reservoir is positioned in a first end of said assembly, and said window is positioned away from said first reservoir and toward said second end of said assembly.

4. The stimulus indicating device of claim 3, further comprising an inactive state reservoir positioned adjacent to said first reservoir, wherein said inactive state reservoir is separated from said first reservoir by a frangible seal.

5. The stimulus indicating device of claim 3, further comprising an indicator spot located on said middle layer and positioned beneath said window.

6. The stimulus indicating device of claim 3, further comprising a moisture reservoir positioned opposite said first reservoir and in fluid communication with said first reservoir.

7. The stimulus indicating device of claim 3, wherein only a fractionated portion of said stimulus sensitive amphiphilic gel is present in said first reservoir.

8. The stimulus indicating device of claim 3, further comprising a pouch that contains said assembly.

9. The stimulus indicating device of claim 3, wherein said stimulus sensitive amphiphilic gel is configured to transition between a liquid state and a gel state, in response to two different stimuli.

10. The stimulus indicating device of claim 2, further comprising one or more ventilation channels that are in fluid communication with said first reservoir and said middle layer.

11. The stimulus indicating device of claim 10, further comprising an indicator spot located on said middle layer and positioned beneath said window.

12. The stimulus indicating device of claim 1, wherein said first reservoir is positioned adjacent said first end of said assembly, and said window is positioned between said first reservoir and said second reservoir.

13. The stimulus indicating device of claim 1, wherein said stimulus sensitive amphiphilic gel is configured to transition between a liquid state and a gel state, in response to two different stimuli.

14. The stimulus indicating device of claim 1, further comprising:

a first stimulus sensitive amphiphilic gel in said first reservoir that is configured to transition between a liquid state and a gel state in response to a first stimulus; and a second stimulus sensitive amphiphilic gel in said second reservoir that is configured to transition between a liquid state and a gel state in response to a second stimulus.

15. A stimulus indicating device comprising:

a stimulus sensitive amphiphilic gel; and an assembly having a first end and a second end and extending in a first direction defining a length of the assembly between the first end and the second end and extending in a second direction opposite the first direction defining a width of the assembly, the assembly including:

a top layer comprising a cover having a first window and a second window, a middle layer including a porous polymer membrane, and a bottom layer, wherein:

said top layer and said bottom layer are sealed together by a first longitudinal seal and a second longitudinal seal, respectively, on opposing lengthwise sides of said assembly extending in the first direction and by a widthwise seal at a widthwise side of the second end of said assembly extending in the second direction, said top layer and said middle layer are joined together, along a center longitudinal seal extending in the first direction along a length of said assembly, and passing through a center of said assembly, at least two solution reservoirs formed at the second end of said assembly between said top layer and said middle layer and between said first and second longitudinal seals and along said center longitudinal seal, said stimulus sensitive amphiphilic gel is contained in both solution reservoirs, said stimulus sensitive amphiphilic gel is in fluid communication with a corresponding said middle layer, at least two air reservoirs are formed adjacent the second end of said assembly between said top layer and said middle layer, said air reservoirs are positioned away from said second end, and said air reservoirs are configured to accept air displaced from said middle layer by movement of said stimulus sensitive amphiphilic gel through said middle layer.

16. The stimulus indicating device of claim 15, further comprising:

a first indicator spot located on said middle layer and positioned beneath said first window;

a second indicator spot located on said middle layer and positioned beneath said second window.

\* \* \* \* \*